United States Patent
Kaehler

(10) Patent No.: US 11,044,101 B2
(45) Date of Patent: Jun. 22, 2021

(54) SECURE EXCHANGE OF CRYPTOGRAPHICALLY SIGNED RECORDS

(71) Applicant: Magic Leap, Inc., Plantation, FL (US)

(72) Inventor: Adrian Kaehler, Los Angeles, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/597,437

(22) Filed: Oct. 9, 2019

(65) Prior Publication Data

US 2020/0044864 A1 Feb. 6, 2020

Related U.S. Application Data

(63) Continuation of application No. 15/661,990, filed on Jul. 27, 2017, now Pat. No. 10,491,402.

(Continued)

(51) Int. Cl.
*H04L 9/32* (2006.01)
*H04L 9/14* (2006.01)
(Continued)

(52) U.S. Cl.
CPC .............. *H04L 9/3247* (2013.01); *H04L 9/14* (2013.01); *H04L 9/30* (2013.01); *H04L 63/0428* (2013.01);
(Continued)

(58) Field of Classification Search
CPC ................. G06F 21/64; G06F 21/6218; G06F 2221/2107; G06F 21/71; G06F 21/10;
(Continued)

(56) References Cited

U.S. PATENT DOCUMENTS

| 6,067,620 A | 5/2000 | Holden et al. |
| 6,237,786 B1 | 5/2001 | Ginter et al. |

(Continued)

FOREIGN PATENT DOCUMENTS

| WO | WO 2016/048177 | 3/2016 |
| WO | WO 2018/022891 | 2/2018 |

OTHER PUBLICATIONS

International Search Report and Written Opinion for PCT Application No. PCT/US2017/044186, dated Oct. 5. 2017.

(Continued)

*Primary Examiner* — Badri Champakesan
(74) *Attorney, Agent, or Firm* — Knobbe, Martens, Olson & Bear, LLP

(57) ABSTRACT

Systems and methods for securely exchanging cryptographically signed records are disclosed. In one aspect, after receiving a content request, a sender device can send a record to a receiver device (e.g., an agent device) making the request. The record can be sent via a short range link in a decentralized (e.g., peer-to-peer) manner while the devices may not be in communication with a centralized processing platform. The record can comprise a sender signature created using the sender device's private key. The receiver device can verify the authenticity of the sender signature using the sender device's public key. After adding a cryptography-based receiver signature, the receiver device can redeem the record with the platform. Upon successful verification of the record, the platform can perform as instructed by a content of the record (e.g., modifying or updating a user account).

18 Claims, 38 Drawing Sheets

Related U.S. Application Data

(60) Provisional application No. 62/368,408, filed on Jul. 29, 2016.

(51) Int. Cl.
  *H04L 9/30* (2006.01)
  *H04L 29/06* (2006.01)

(52) U.S. Cl.
  CPC ........ *H04L 63/101* (2013.01); *H04L 63/1408* (2013.01); *H04L 63/1483* (2013.01); *H04L 2209/60* (2013.01)

(58) Field of Classification Search
  CPC ............. G06F 21/6209; G06F 21/6245; G06F 21/645; G06F 21/62; G06F 21/60; H04L 2209/72; H04L 63/0464
  USPC ........................................................ 713/176
  See application file for complete search history.

(56) References Cited

U.S. PATENT DOCUMENTS

| | | | |
|---|---|---|---|
| 6,367,013 B1* | 4/2002 | Bisbee | G06Q 20/00 713/158 |
| 6,850,221 B1 | 2/2005 | Tickle | |
| 7,069,443 B2* | 6/2006 | Berringer | G06F 21/64 713/175 |
| 7,089,208 B1 | 8/2006 | Levchin et al. | |
| 7,490,065 B1* | 2/2009 | Ogg | G06Q 20/382 705/50 |
| 8,050,997 B1 | 11/2011 | Nosek et al. | |
| 8,950,867 B2 | 2/2015 | Macnamara | |
| 9,009,805 B1 | 4/2015 | Kirkby et al. | |
| 9,047,600 B2 | 6/2015 | Zhou et al. | |
| 9,071,444 B2 | 6/2015 | Everett | |
| 9,081,426 B2 | 7/2015 | Armstrong | |
| 9,092,796 B2 | 7/2015 | Eversoli et al. | |
| 9,153,088 B2 | 10/2015 | Spencer | |
| 9,171,299 B1 | 10/2015 | Schwartz | |
| 9,202,211 B2 | 12/2015 | Davis et al. | |
| 9,215,293 B2 | 12/2015 | Miller | |
| 9,310,559 B2 | 4/2016 | Macnamara | |
| 9,325,508 B2* | 4/2016 | Oswalt | H04L 63/0823 |
| 9,348,143 B2 | 5/2016 | Gao et al. | |
| D758,367 S | 6/2016 | Natsume | |
| 9,417,452 B2 | 8/2016 | Schowengerdt et al. | |
| 9,470,906 B2 | 10/2016 | Kaji et al. | |
| 9,537,865 B1* | 1/2017 | Borovoy | H04L 63/108 |
| 9,547,174 B2 | 1/2017 | Gao et al. | |
| 9,628,281 B2* | 4/2017 | Murao | H04L 9/3263 |
| 9,671,566 B2 | 6/2017 | Abovitz et al. | |
| 9,740,006 B2 | 8/2017 | Gao | |
| 9,791,700 B2 | 10/2017 | Schowengerdt et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 10,491,402 B2 | 11/2019 | Kaehler | |
| 2001/0037256 A1* | 11/2001 | Yazawa | G06Q 30/0601 705/26.1 |
| 2003/0172297 A1* | 9/2003 | Gunter | G06F 21/6218 713/156 |
| 2003/0182552 A1* | 9/2003 | Tanimoto | H04L 9/3265 713/170 |
| 2004/0006692 A1* | 1/2004 | Honda | G06Q 20/401 713/157 |
| 2005/0246533 A1* | 11/2005 | Gentry | H04L 9/0847 713/170 |
| 2005/0278534 A1* | 12/2005 | Nadalin | H04L 9/3263 713/175 |
| 2006/0028436 A1* | 2/2006 | Armstrong | A63F 13/06 345/156 |
| 2006/0031301 A1 | 2/2006 | Herz et al. | |
| 2006/0053289 A1 | 3/2006 | Singh | |
| 2007/0055881 A1 | 3/2007 | Fuchs et al. | |
| 2007/0081123 A1* | 4/2007 | Lewis | H04R 5/0335 351/159.39 |
| 2007/0208944 A1* | 9/2007 | Pavlicic | G06F 21/645 713/176 |
| 2008/0016356 A1* | 1/2008 | Filreis | H04L 9/3247 713/176 |
| 2008/0040794 A1 | 2/2008 | Larson | |
| 2008/0069347 A1* | 3/2008 | Brown | H04L 9/3252 380/45 |
| 2008/0195865 A1* | 8/2008 | Nikander | H04L 63/0442 713/170 |
| 2009/0010438 A1 | 1/2009 | Gilb | |
| 2009/0119407 A1* | 5/2009 | Krishnan | H04L 63/126 709/228 |
| 2010/0037062 A1* | 2/2010 | Carney | H04L 9/3247 713/176 |
| 2010/0235286 A1 | 9/2010 | Moore | |
| 2012/0054494 A1* | 3/2012 | Hiribarren | G06F 21/51 713/176 |
| 2012/0127062 A1 | 5/2012 | Bar-Zeev et al. | |
| 2012/0162549 A1* | 6/2012 | Gao | G02B 27/0172 349/11 |
| 2012/0179913 A1* | 7/2012 | Kirk | H04L 9/3247 713/176 |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1* | 8/2013 | Lewis | G02C 11/10 351/158 |
| 2013/0242262 A1* | 9/2013 | Lewis | G02B 27/0093 351/209 |
| 2014/0032913 A1* | 1/2014 | Tenenboym | H04L 9/3247 713/176 |
| 2014/0040611 A1* | 2/2014 | Tenenboym | H04L 9/3236 713/157 |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2014/0289532 A1* | 9/2014 | Kako | H04L 9/3247 713/176 |
| 2014/0306866 A1 | 10/2014 | Miller et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0192194 A1* | 6/2016 | Yang | H04W 12/082 713/171 |
| 2016/0196248 A1* | 7/2016 | Alrahaili | G06F 21/64 715/234 |
| 2016/0300234 A1* | 10/2016 | Moss-Pultz | H04L 9/3263 |
| 2016/0364787 A1* | 12/2016 | Walker | H04L 9/3247 |
| 2017/0364908 A1* | 12/2017 | Smith | G06Q 20/023 |
| 2018/0034642 A1 | 2/2018 | Kaehler | |
| 2018/0205555 A1* | 7/2018 | Watanabe | H04L 9/3247 |

OTHER PUBLICATIONS

International Preliminary Report on Patentability for PCT Application No. PCT/US2017/044186, dated Jan. 29, 2019.
Bitcoin—Bitcoin Developer Guide—Downloaded Dec. 9, 2015 in 55 pages. URL: https://bitcoin.org/en/developer-guide#detecting-forks.
Ethereum—"Accessing Contracts and Transactions", downloaded Mar. 16, 2016 in 6 pages. URL: https://ethereum-homestead.readthedocs.org/en/latest/contracts-and-trans . . . .

(56) References Cited

OTHER PUBLICATIONS

Ethereum—"A Next-Generation Smart Contract and Decentralized Application Platform", White Paper downloaded Dec. 17, 2015 in 25 pages. URL: https://github.com/ehtereum/wiki/wiki/White-Paper.
Ethereum—"Create your own crypto-currency", downloaded Mar. 16, 2016 in 29 pages. URL: https://ethereum.org/token.
Globalplatform—GlobalPlatform made simple guide: Trusted E ecution Environment (TEE) Guide—Dec. 17, 2015—in 5 pages. URL: http://globalplatform.org/mediaguidetee.asp.
Kraft B. et al., "Security Research of a Social Payment App", (May 2014) in 16 pages; accessible through courses.csail.mit.edu.
Nakamoto S., "Bitcoin: A Peer-to-Peer Electronic Cash System", (Oct. 2008) in 9 pages.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

SECURE EXCHANGE OF CRYPTOGRAPHICALLY SIGNED RECORDS

CROSS-REFERENCE TO RELATED APPLICATIONS

This application is a continuation of U.S. application Ser. No. 15/661,990, filed Jul. 27, 2017, titled "SECURE EXCHANGE OF CRYPTOGRAPHICALLY SIGNED RECORDS", which claims the benefit of priority to U.S. Provisional Application No. 62/368,408, filed Jul. 29, 2016, entitled "SECURE EXCHANGE OF CRYPTOGRAPHICALLY SIGNED RECORDS", the contents of which are hereby incorporated by reference herein in their entirety.

BACKGROUND

Field

The present disclosure relates generally to systems and methods for cryptography and more particularly to securely exchanging cryptographically signed records over computer networks.

Description of the Related Art

Conventional systems such as digital transmissions are useful for exchanging contents and records over a computer network. Such digital transmissions may replace the need for traditional physical exchanges of records. Parties utilizing such conventional systems need to be connected to a network such as the Internet at the time of the exchange. These conventional systems require parties to exchanges have continuous access to central data centers for authenticating exchanges

SUMMARY

Systems and methods for securely exchanging cryptographically signed records are disclosed. The systems and methods may utilize public key and private key encryption techniques. In one aspect, after receiving a content request, a sender device can send a record to a first receiver device making the request. The record can be sent via a short range link in a decentralized (e.g., peer-to-peer) manner while the devices may not be in communication with a centralized processing platform. The record can comprise a sender signature created using the sender device's private key. The first receiver device can verify the authenticity of the sender signature using the sender device's public key. After adding a "for processing only endorsement" and a receiver signature, the first receiver device can redeem the record with the processing platform. Upon successful verification of the sender signature and the receiver signature, the processing platform can perform as instructed by a content of the record.

In another aspect, the first receiver device can send the record to a second receiver device after adding a first receiver signature to the record. The second receiver device can verify the authenticity of the signatures using the public keys of the sender device and the first receiver device. After adding a "for processing only endorsement" and a second receiver signature, the second receiver device can redeem the record with the processing platform.

In another aspect, after receiving a content request, a sender device can send a record to an agent device making the request on behalf of a principal. The agent device can verify the authenticity of the sender signature in the record using the sender device's public key. The agent device can add a "handled by endorsement" to the record before the principal redeems the record with the processing platform.

In one aspect, a sender device can send a record to a receiver device. The receiver device can validate the received record by detecting a malicious behavior such as sender cloning with a single receiver, mousing, ghosting, sender cloning with multiple receivers, or forking. After detecting a malicious behavior, the receiver device can add a malicious endorsement to the record prior to sending the endorsed record to a processing platform. The processing platform can add the sender device to a blacklist after performing fuzzy ruling or Boolean analysis. In another aspect, the processing platform can validate a record received from a device by detecting a malicious behavior such as receiver cloning or ghosting.

Embodiments of systems and methods for securely exchanging cryptographically signed records are disclosed. In one aspect, after receiving a content request, a sender device can send a record to a receiver device making the request. The record can be sent via a short range link in a decentralized (e.g., peer-to-peer) manner while the devices may not be in communication with a centralized processing platform. The record can comprise a sender signature created using the sender device's private key. The receiver device can verify the authenticity of the sender signature using the sender device's public key. After adding a "for processing only endorsement" and a receiver signature, the receiver device can redeem the record with the processing platform. Upon successful verification of the sender signature and the receiver signature, the processing platform can perform as instructed by a content of the record.

Embodiments of systems and methods for securely exchanging cryptographically signed records are disclosed. In one aspect, after receiving a content request, a sender device can send a record to an agent device making the request on behalf of a principal. The record can be sent via a short range link in a decentralized (e.g., peer-to-peer) manner while the devices may not be in communication with a centralized processing platform. The record can comprise a sender signature created using the sender device's private key. The agent device can verify the authenticity of the sender signature using the sender device's public key. The agent device can add a "handled by endorsement" to the record before the principal redeems the record with the processing platform. Upon successful verification of the sender signature and the receiver signature, the processing platform can perform as instructed by a content of the record.

Embodiments of systems and methods for securely exchanging chains of cryptographically signed records involving multiple receivers are disclosed. In one aspect, a sender device can send a record to a first receiver device. The record can comprise a sender signature created using the sender device's private key. The first receiver device can verify the authenticity of the signature using the sender device's public key. The first receiver device can send the record to a second receiver device after adding a first receiver signature to the record. The second receiver device can verify the authenticity of the signatures using the public keys of the sender device and the first receiver device. After adding a "for processing only endorsement" and a second receiver signature, the second receiver device can redeem the record with the processing platform. Upon successful verification of the signatures, the processing platform can perform as instructed by a content of the record.

Embodiments of systems and methods for validating cryptographically signed records are disclosed. In one aspect, a sender device can send a record to a receiver device. The receiver device can validate the received record by detecting a malicious behavior such as sender cloning with a single receiver, mousing, ghosting, sender cloning with multiple receivers, or forking. After detecting a malicious behavior, the receiver device can add a malicious endorsement to the record prior to sending the endorsed record to a processing platform. The processing platform can add the sender device to a blacklist after performing fuzzy ruling or Boolean analysis. In another aspect, the processing platform can validate a record received from a device by detecting a malicious behavior such as receiver cloning or ghosting.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Systems and methods disclosed herein address various challenges related to digital transmissions and physical exchanges. For example, contents and records can be securely transferred and exchanged over a network using a hybrid system. The hybrid system provides for meaningful or satisfactory centralized and peer-to-peer exchanges of contents or records. Other advantages include ease of use, speed of exchange, capability of verification, security, anonymity, irreversibility, and non-deniability. [0050] The systems and methods disclosed herein may face similar problems that can occur for physical exchanges. Because of the differences in virtual and physical environments, various challenges related to digital transmissions, such as the triviality with which transaction instruments can be copied, are addressed. Features based on digital tools and techniques available on digital platforms are disclosed, for example using digital cryptography, the much more powerful cryptographic analog of the traditional hand written signatures, for endorsements of documents.

Example of Securely Exchanging Cryptographically Signed Records

Figure 1A:
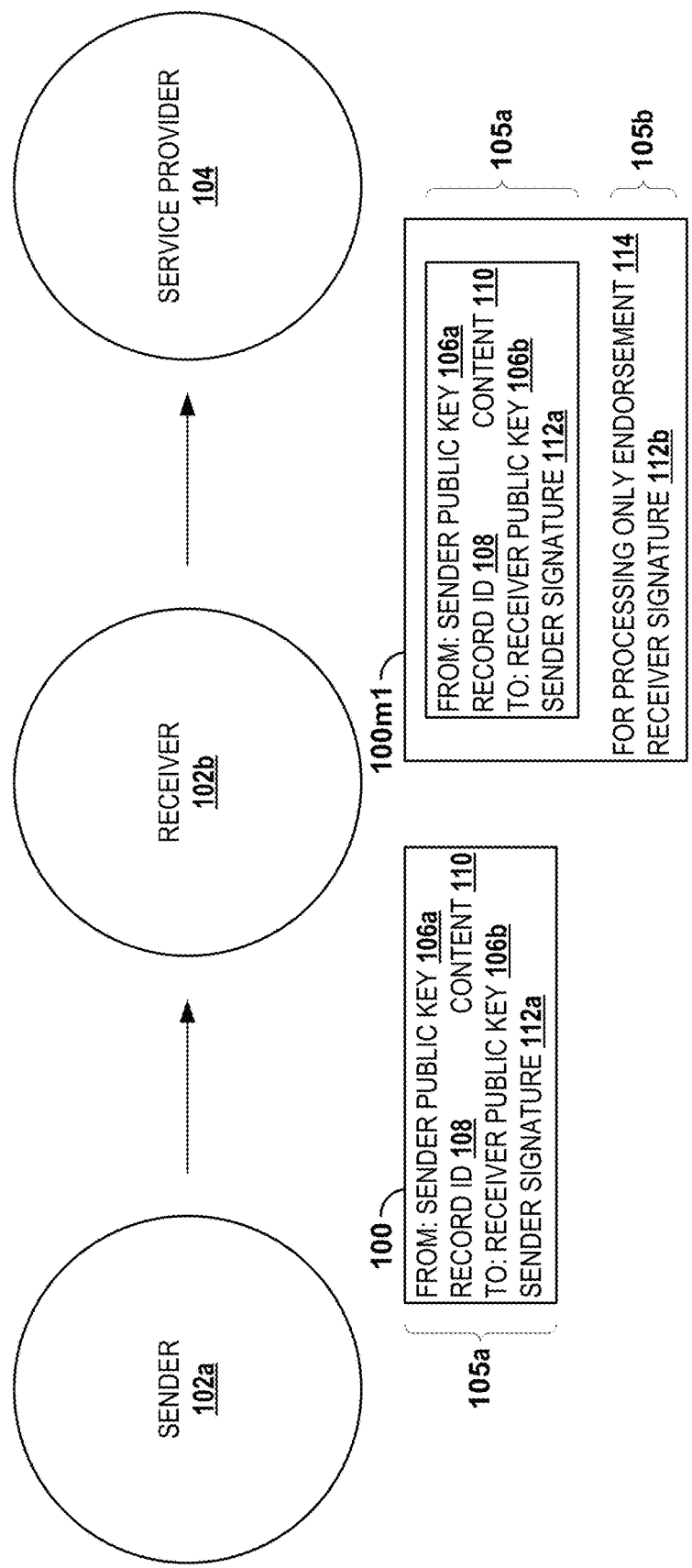
FIGS. 1A and 1B schematically illustrate one embodiment of securely exchanging cryptographically signed contents and records over a wireless network.

FIG. 1A schematically illustrates one embodiment of securely exchanging cryptographically signed contents and records, for example a cryptographically signed individual record 100. A record sender 102a, using a record sender device, can create and send the individual record 100 to a record receiver 102b. The record sender 102a can be a person who wishes to transfer contents or records to the record receiver 102b. The record receiver 102b can be a person who wishes to receive contents or records from the record sender 102a.

The record receiver 102b, using a record receiver device, can then modify the individual record 100 to create a modified individual record 100m1, where m indicates the individual record 100 has been modified and m1 indicates the first modification of the individual record 100. The record receiver 102b can redeem the modified individual record 100m1 with a service provider 104. After the service provider 104, operating a secure electronic processing platform, successfully processes the individual record 100m1, the service provider 104 can provide the record receiver 102b with, for example, a document as instructed by the modified individual record 100m1. The record sender 102a and the record receiver 102b can exchange the individual record 100 in a distributed or a decentralized (e.g., peer-to-peer) manner.

For purpose of illustration, the following examples will describe exchange of electronic records between a sender 102a and a receiver 102b. It is to be understood that the sender 102a and the receiver 102b use physical, electronic devices to perform the exchange of the electronic records. For example, the sender and receiver electronic devices may include a cellular telephone, a portable computing device (e.g., laptop, tablet, e-reader), a desktop computing device, an augmented reality device (e.g., a head-mounted augmented, virtual, or mixed reality display), and so forth. It is to be understood that the service provider 104 can use physical, electronic devices to process the exchanged electronic records. For example, the service provider electronic device may include one or more centralized or distributed server computers.

The record sender 102a, using his user device, can send the individual record 100 directly to the record receiver 102b or directly through another user of the system using a short range link, for example a Bluetooth link, in a peer-to-peer manner, for example. When sending the individual record 100, the user devices of the record sender 102a and the record receiver 102b can be online or offline. For example, both the user devices of the record sender 102a and the record receiver 102b can be online and connected to a network such as the internet. As another example, one or both of the user devices of the record sender 102a and the record receiver 102b can be offline and not connected to a network. The record receiver 102b can redeem the modified individual record 100m1 with the service provider 104 when the user device of the record receiver 102b is in communication with the service provider 104.

The individual record 100 can be a digital object comprising a plurality of blocks that can be transmitted from the record sender 102a to the record receiver 102b. In some embodiments, the individual record 100 can comprise a block 105a. The block 105a can comprise a number of constituent parts.

To provide security for the exchange, cryptographic techniques can be used in the electronic record. For example, public key cryptographic techniques can be used in which each party to the transaction (the sender 102a and the receiver 102b) or each device to the transaction (the sender device and the receiver device) is associated with both a public key (that can be disseminated widely) and a private key (that is kept secure and known only to the party). Any sender can encrypt a message to a receiver using the public key of the receiver but the encrypted message can only be decrypted by the receiver, using the receiver's private key. The receiver of the message can securely reply back to the sender by encrypting a reply message with the senders public key so that only the sender can decrypt the reply message, using the sender's private key. As will be further described below, the electronic devices of the sender and receiver may include hardware or software that can securely store the respective party's private key and perform the encryption and decryption using the disseminated public keys. Public key cryptography is an example of asymmetric cryptography in which the key for encryption (e.g., the receiver's public key) is different from the key for decryption (e.g., the receiver's private key). In other embodiments, other asymmetric cryptographic techniques can be used.

For example, the block 105a can comprise a public key 106a of the record sender device in the "from field," a public key 106b of the record receiver device in the "to field," a record identifier (ID) 108, a content 110, and a record sender signature 112a of the block 105a. The public key 106a of the record sender device can identify the originator of the individual record 100, the record sender 102a. The public key 106b of the record receiver device can identify the recipient of the individual record 100, the record receiver 102b.

The record ID 108 can be increasing, for example monotonically increasing, such that two individual records 100 created by the record sender device do not have the same record ID 108. The content 110 can identify, for example, a document that the record receiver 102b can receive when redeeming the modified individual record 100m1 with the service provider 104. The service provider 104 can perform as instructed by the content 100 by itself or indirectly through a third party.

Users can sign individual records 100 by creating secure, cryptographic signatures of the individual records. The record sender 102a can use his user device to sign the individual record 100 by creating a record sender signature 112a. To sign the individual record 100, the record sender device can require authentication of the record sender 102a. Non-limiting examples of authentication include passphrase authentication, biometric authentication such as fingerprint authentication or iris authentication, or biological data authentication. The record sender signature 112a can be a digital signature created using cryptography. For example, the record sender device can use public-key cryptography such as Rivest-Shamir-Adleman (RSA) encryption to encrypt a hash such as secure hash algorithm (SHA)-2 of the individual record 100. For example, any of the SHA-2 hash functions with record digests of 224, 245, 384, or 512 bits can be used (e.g., SHA-256). The record sender signature 112a can be created using the private key of the record sender device public-key cryptography pair. The record sender device can securely store the private key. The record sender signature 112a can be verified by others as authentically signed by the sender 102a, for example by the record receiver 102b, in the possession of the public key 106a of the record sender device. The record receiver 102b can obtain the public key 106a of the record sender device from the individual record 100. Once created, the record sender signature 112a signs the block 105a. The public key 106a of the record sender device, the public key 106b of the record receiver device, the record ID 108, the content 110, and the record sender signature 112a can complete the block 105a of the individual record 100.

Once in the possession of the record receiver 102b, the record receiver 102b can add an endorsement in an endorsement block 105b to the individual record 100 to create a modified individual record 100m1. For example, an endorsement can be a "for processing only endorsement" 114 that specifies that the modified individual record 100m1 can only be redeemed by the recipient of the individual record in the block 105a, the record receiver 102b. Once an endorsement, for example the "for processing only endorsement" 114 is added, the record receiver 102b can repeat the process of generating a record receiver signature 112b for the endorsement block 105b to create the modified individual record 100. The record receiver signature 112b can be based on one or more parts of the modified individual record 100m1. For example, the record receiver signature 112b can be based on the endorsement block 105b. As another example, the record receiver signature 112b can be based on the block 105a, the endorsement block 105b, or any combination thereof. The modified individual record 100m1 can be electronically communicated to the service provider 104 or to another party's electronic device.

Accordingly, an individual record can comprise a chain of blocks, with each block identifying its originator. At each block, the entire prior portion of the chain can be signed by the user handling the blocks at the time. The user can use a private key associated with his user device to sign the entire prior portion of the chain. For example, the modified individual record 100m1 can be a chain comprising two blocks 105a and 105b. The block 105a of the individual record 100 can contain the public key 106a of the record sender device that, together with the public key 106a of the record sender device, can identify the record sender 102a. The record sender signature 112a can be signed by the record sender device using the private key of the record sender device public-key cryptography pair. The endorsement block 105b can contain the record receiver signature 112b that, together with the public key 106b of the record receiver device, can identify the record receiver device. The record receiver signature 112b can be signed by the record receiver device using the private key of the record receiver device public-key cryptography pair. The record receiver signature 112b can be based on the endorsement block 105b, or can be based on the endorsement block 105b, the one or more blocks prior to the endorsement block 105b, for example the block 105a, or any combination thereof.

An individual record, for example the modified individual record 100m1, with its last block containing a "for processing only endorsement" (FPOE) 114 can be electronically communicated to and redeemed with the service provider 104. On redemption, the service provider 104 can process the modified individual record 100m1 by verifying the authenticity of one or more signatures in the chain of blocks 105a and 105b. For example, the service provider 104 can verify the authenticity of all the signatures in the modified individual record 100m1, including the record sender signature 112a and the record receiver signature 112b. Authenticity of a signature can refer to the signature being created using a particular private key. For example, for the record sender signature 112a to be authentic, the record sender signature 112a can be verified using the record sender device's public key and determined to have been created using the private key of the record sender device. Thus, the individual record 100, digitally signed by the record sender device, cannot be repudiated by the record sender 102a as long as the record sender 102a claims his private key has remained private.

If the content 110 comprises an instruction that the record receiver 102b should be given access to, for example, a document with a particular ID and all of the signatures in the chain are verified to be authentic, then the document can be given to the record receiver 102b or the user device of the record receiver 102b at the end point of the chain in the modified individual record 100m1. For example, if the record sender signature 112a and the record receiver signature 112b in the modified original record 100m1 are verified to be authentic, then the service provider 104 can provide the record receiver 102b with, for example, the document as instructed by the content 110. The time at which the record receiver 102b becomes connected to the service provider 104 and redeems the modified individual record 100m1 constitutes a redemption event.

The content 110 of the record 100 can include, for example, a message, data, instructions to provide a document or other information to an entity, instructions to execute a computer program, contractual obligations or rights (e.g., a smart contract), instructions to transfer consideration (e.g., currency, cryptocurrency, securities, real or intangible assets, etc.), and so forth. An advantage of certain embodiments is that, by utilizing individual records that are not bearer documents, large amounts of consideration can be exchanged without both parties appearing at a central depository.

In one non-limiting example, the sender 102a is a buyer of an asset from a seller, who is the receiver 102b. The content 110 comprises instructions for the service provider 104 to transfer an amount of cryptocurrency from the account of the sender 102a to the account of the receiver 102b. The sender's device digitally signs the record 100 using the sender device's private key and electronically communicates the record 100 to the receiver's device. The receiver device endorses the record with an endorsement 114 (e.g., in this context, the endorsement may be a "For Deposit Only endorsement") and digitally signs the record using the receiver device's private key to create the modified record 100m1. The receiver device communicates the modified record 100m1 to the service provider 104, which redeems the modified record 100m1. The service provider 104 can verify the modified record 100m1 was authentically signed by both the sender 102a and the receiver 102b (using their respective public keys) and can transfer the amount of cryptocurrency (in the content 110) from the sender's account to the receiver's account.

Accordingly, in this non-limiting example, the record functions as a cheque in a digital cheque system and can be used by a buyer (the sender 102a) to pay a seller (the receiver 102b) for the asset. In some such cases, the asset is an electronic asset (e.g., computer code that provides desired functionality for the buyer). The seller (the receiver 102b) can create and digitally sign a record (analogous to the record 100) having the electronic asset as the content and electronically communicate the record to the buyer (the sender 102a). Thus, the buyer and the seller can mutually exchange cryptographically secure records to transfer an asset from the seller to the buyer in return for consideration (e.g., an amount of cryptocurrency). The service provider 104 can act as a clearinghouse for at least some of this exchange (e.g., to debit the buyer's cryptocurrency account and credit the seller's cryptocurrency account).

Example System for Exchanging Cryptographically Signed Individual Records

Example User Devices

The methods and systems for securely exchanging contents and records of the present disclosure can be implemented by one or more user devices and one or more processing platforms. In the non-limiting example system shown in FIG. 1B, users can operate user devices to create, send, receive, modify, or redeem individual records 100. For example, the record sender 102a can operate a record sender device 116a, and the record receiver 102b can operate a record receiver device 116b.

The user devices, for example the record sender device 116a and the record receiver device 116b, can be identical or can be different. The user devices can include cellular telephones, tablet computers, e-readers, smart watches, head mounted augmented, virtual, or mixed reality display systems, wearable display systems, or computers. The user devices 116a, 116b can comprise embodiments of the wearable display system 3500 described below with reference to FIG. 35. The user device 116a or 116b can be in communication with other devices on a network 118 using a communication link 120a, 120b, for example a cellular communication link. The network 118 can be a local area network (LAN), wide area network (WAN), or the Internet, accessible by wired or wireless communication links, e.g., implementing the Institute of Electrical and Electronics Engineers (IEEE) 802.11 standards.

When sending the individual record 100, one or both of the record sender device 116a and the record receiver device 116b can be offline and not connected to the network 118. The record sender 102a, using the record sender device 116a, can send the individual record 100 to the record receiver 102b using a short range link (SRL) 122. The short range link (SRL) 122 can be a peer-to-peer radio or other links through which the user device 116a or 116b can communicate with one another. The short range link (SRL) 122 can be based on the Infrared Data Association (IrDA)/ Infrared Physical Layer Specification (IrPHY), Bluetooth®, Near Field Communication (NFC), ad hoc 802.11, or any other wired or wireless communication methods or systems.

A processing platform 124, operated by the service provider 104, can be in communication with other devices on the network 118, for example the user devices 116a and 116b, using a communication link 126. The communication link 120a, 120b, or 126 can be wired or wireless communications, cellular communication, Bluetooth®, local area network (LAN), wide local area network (WLAN), radio frequency (RF), infrared (IR), or any other communication methods or systems. Users 102a or 102b can redeem individual records with the processing platform 124. For example, the record receiver 102b, using the record receiver device 116b, can redeem the modified individual record 100m1 with the processing platform 124.

Figure 2:
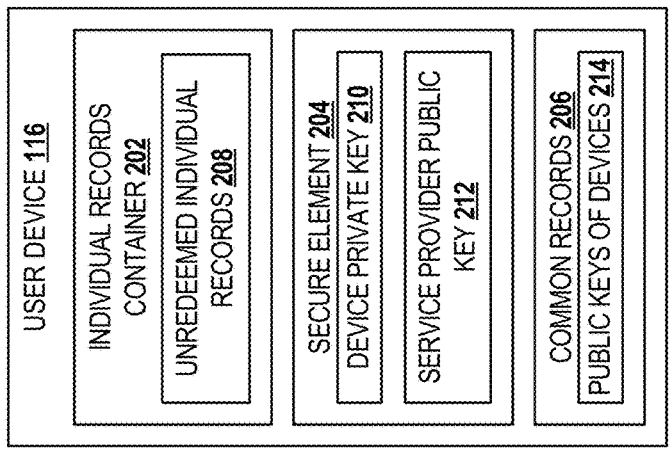
FIG. 2 is a block diagram of an example user device configured to store public and private cryptographic keys.

FIG. 2 is a block diagram of an example user device 116 configured to store public and private cryptographic keys. The user device 116 can include an individual records container 202, a secure element (SE) 204, and common records 206. The individual records container 202 can be a digital data structure configured to contain unredeemed individual records 208. For example, the individual records container 202b of the record receiver device 116b can contain the modified individual record 100m1 before the modified individual record 100m1 is electronically communicated to and redeemed with the processing platform 124.

The secure element (SE) 204 can securely store a private key 210 of the user device and a service provider public key 212. The secure element (SE) 204 can use the private key 212 of the user device to sign individual records 100 and modified individual records 100m1. For example, the secure element (SE) 204a of the record sender device 116a can create the record sender signature 112a of the individual record 100. As another example, the secure element (SE) 204b of the record receiver device 116b can create the record receiver signature 112b of the modified individual record 100m1. In some embodiments, the secure element (SE) 204a of the record sender device 116a can add one or more of the public key 106a of the record sender device, the public key 106b of the record receiver device, the record ID 108, and the content 110 to the individual record 100.

The secure element (SE) 204 can use the service provider public key 212 to verify the authenticity of information received from the service provider 104. For example, the service provider 104, using the processing platform 124, can send updated public keys of devices 214 to the user device 116a or 116b. The processing platform 124 can sign the public keys of devices 214 with the private key of the service provider public-key cryptography pair. In some embodiments, the service provider private key is the service provider's exclusive possession. The secure element (SE) 204 can verify the authenticity of the updated public keys of devices 214. Verifying the authenticity of the updated public keys of devices 214 can comprise determining, using the service provider public key 212, whether the signature of the public keys of devices 214 has been created with the service provider public key. In some embodiments, there can be two or more processing platforms 124 operating independently. And a user device 116 can include one or more service provider public keys 212 for the two or more processing platforms 124.

Figure 1B:
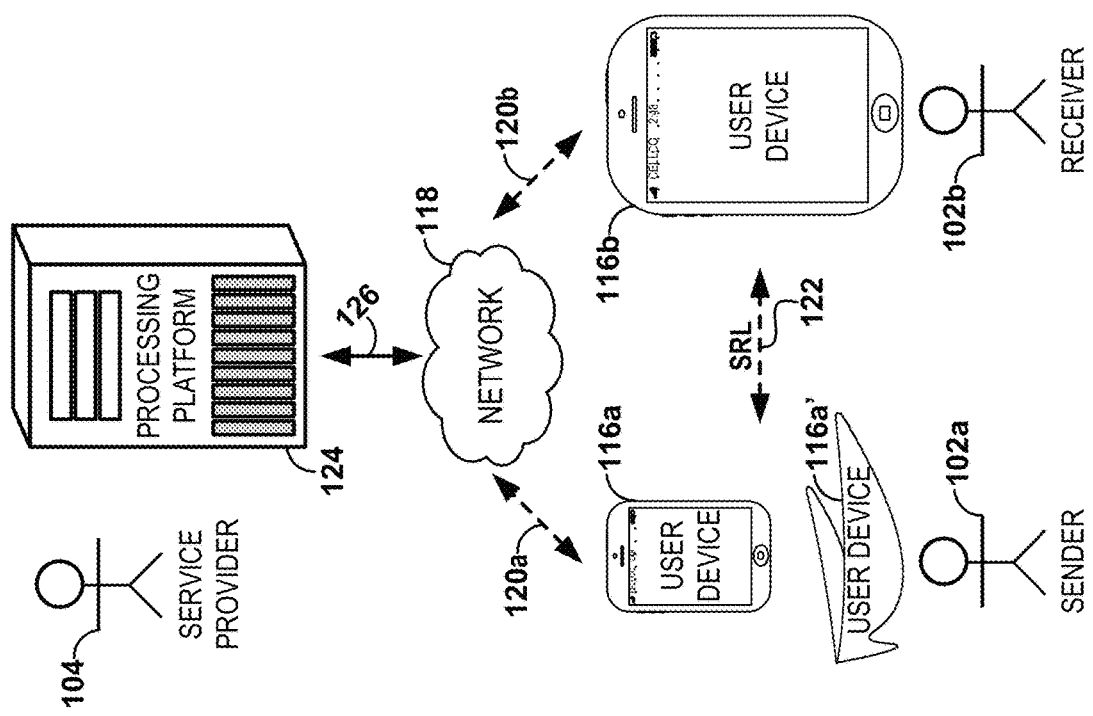

The common records 206 can include valid user identities and additional information about the users of the service provider processing platform 124. The common records 206 are publicly disseminated and shared among users of the processing platform 124. For example, the common records 206 can include the public keys of user devices 214 which are disseminated by the system so that other users can cryptographically verify digital signatures. The public keys of user devices 214a in the common records 206a of the record sender device 116a and the public keys of user devices 214b in the common records 206b of the record receiver device 116b can be the same or can be different. Referring to FIG. 1B, for the record sender 116a to use a new user device 116a2, the processing platform 104 may have to notify other user devices 116 of the system of the public key of the user device 116'. The processing platform 124 can send an updated common record 206 comprising updated public keys of devices 214, including the public key of the user device 116', to other user devices 116 when they are connected to the network 118. If the user device 116a is connected to the network 118 and the user device 116b is not, the user device 116a can receive the updated public keys of devices 214a. Thus, the public keys of devices 214b in the common records 206b of the user device 116b can be a subset of the updated public keys of devices 214a in the common records 206a of the user device 116a.

In some embodiments, some public keys may be no longer in use and can be removed from the public keys of devices 214 by the processing platform 124. For example, if the record sender 102a is no longer using the record sender device 116a, the processing platform 124 can remove the public key 106a of the record sender device from the processing platform's record. The processing platform 124 can send updated public keys of devices 214, which exclude the public key 106a of the record sender device, to other user devices 116. To maintain cryptographic security, if the record sender device 116a is no longer being used, the device private key 210 should be permanently deleted or the device destroyed.

User devices can verify the authenticity of received individual records using the public keys of user devices 214. For example, the public keys of user devices 214b in the common records 206b of the record receiver device 116b can include the public key 106a of the record sender device. And the record receiver device 116b can verify the authenticity of the individual record 100 by determining, using the public key 106a of the record sender device, whether the record signature 112a of the individual record 112a has been created using the private key of the record sender device 116a.

Example Processing Platform

Figure 3:
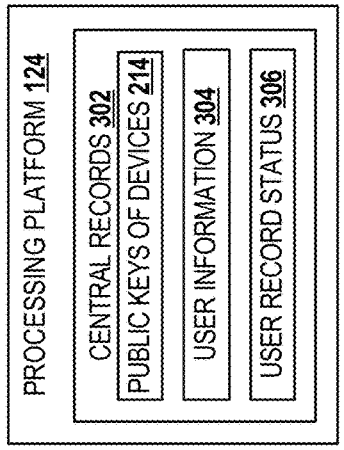
FIG. 3 is a block diagram of an example processing platform configured to store public cryptographic keys of user devices.

FIG. 3 is a block diagram of an example processing platform 124 configured to store public cryptographic keys of user devices. The processing platform 124 can comprise a server or a collection of servers that can be infrastructural to the system. The processing platform 124 can be connected directly to the network 118 and indirectly and possibly only intermittently to the user devices 116 over the network 118. The processing platform 124 can contain and maintain central records 302 to keep track of users, user devices 116, and access to contents identified in the records. The processing platform 124 can process instructions contained in the contents 110 of the records 100. For example, as described above, if the content 110 of a record 100 contains an instruction to transfer cryptocurrency between accounts of users, the platform 124 may perform the transfer upon redemption of the record.

The processing platform 124 can maintain the common records 206 or can generate the common records 206 from the central records 302. The central records 302 can contain the public keys of devices 214. The public keys of devices 214 in the common records 206 of the user device 116 can be a subset of the public keys of user devices 214 in the central records 302. For example, the public keys of user devices 214 may have been updated, and the user device 116 may not have received the updated public keys of user devices 214.

The central records 302 can include identifying information and ancillary information of the users 102a or 102b or the user devices 116a or 116b. The central records 302 can include user information 304 that can identify the association of users with user devices. For example, the central records 302 can include the association of the record sender 102a with the two record sender devices 116a and 116a'. In some embodiments, one user with multiple devices can be considered multiple users. In some embodiments, one user with multiple devices can be considered one user. The common records 206 may not contain the user information 304.

The central records 302 can include user record status 306 for tracking information of the users. For example, the content 110 of the individual record 100 can instruct the processing platform 124 to provide access to the document with its document ID stored in the content 110 to the record receiver 102b. However, the user record status 306 can indicate that only the record sender 102a himself has access to the document; and the record sender 102a cannot grant other users access to the document. As another example, the user record status 306 can indicate that the record sender 102a can give access of the document to other users. As yet another example, the user record status 306 can indicate that the record sender 102a can give access of the document to users only a number of times, such as once; and the user record status 306 can keep track of whether the individual record 100 has been redeemed and accessed by any user, for example the record receiver 102b.

As a non-limiting example, the user record status 306 can keep track of the record sender's account balance in, for example, a cryptocurrency. The record sender's account can be a payer account. If the content 110 of the individual record 100 instructs the processing platform 124 to pay the record receiver 102b an amount less than or equal to the record sender's account balance, the processing platform 124 can debit the record sender's account by the specified amount and credit the record receiver's account by the same amount. The record receiver's account can be a payee account. If the content 110 of the individual record 100 instructs the processing platform 124 to pay the record receiver 102b an amount greater than the record sender's account balance, the processing platform 124 can refuse to credit the record receiver's account by the specified amount. However, the record sender's account may be debited with an overdraft charge. The common records 206 may not contain the user record status 306.

The exchange of cryptographically signed individual records disclosed herein can include a number of benefits. The benefits can include, for example, ease of use or speed of exchange. As illustrated in FIG. 1, the record sender device 116a can send the individual record 100 to the record receiver device 116b via the short range link (SRL) 122 without either party being in communication with the service provider 104 through the network 118. Additional or alternative benefits can include, for example, capability of verification or authentication of digital signatures. As illustrated in FIG. 2, the public keys 214 of user devices are disseminated in the common records 206. Thus, the record receiver device 116b can verify the authenticity of the record sender signature 112a in the individual record 100 and the record sender device 116a has sent the individual record 100. Another benefit can be, for example, cryptographic security. As illustrated in FIG. 1A, the record sender device 116a can sign the individual record 100 with the record sender signature 112a, and the record receiver device 116b can sign the modified individual record 100m1 with the record receiver signature 112b. Malicious user devices which are not the record receiver device 116b cannot forge the record receiver signature 112b, because they do not know the record receiver private key. A malicious user device cannot redeem the modified individual record 100m1 with the processing platform 124, because the individual record 100 shows that its recipient is the record receiver device 116b and not the malicious user device. Additional or alternative benefits can include, for example, anonymity (actual legal names need not be used, merely user identifying information associated with the public keys is required), or non-deniability (digital signatures can be authenticated using public keys and the signer cannot deny a signature while also claiming his private key remains private). A further benefit can be, for example, irreversibility. Once the record sender device 116a sends the individual record 100 to the record receiver device 116b, the processing platform 124 can deny a request by the record sender device 116a that the processing platform 124 not to perform as instructed by the content 110 of the individual record 100. Another benefit can be, for example, the individual records 100 can include different contents 110. Furthermore, the record sender 102*a* can give the record receiver 102*b* access to a voluminous amount of information, for example documents with IDs stored in the content 110 of the individual records 100, without directly sending the record receiver 102*b* the information.

Example One Receiver

Figure 4:
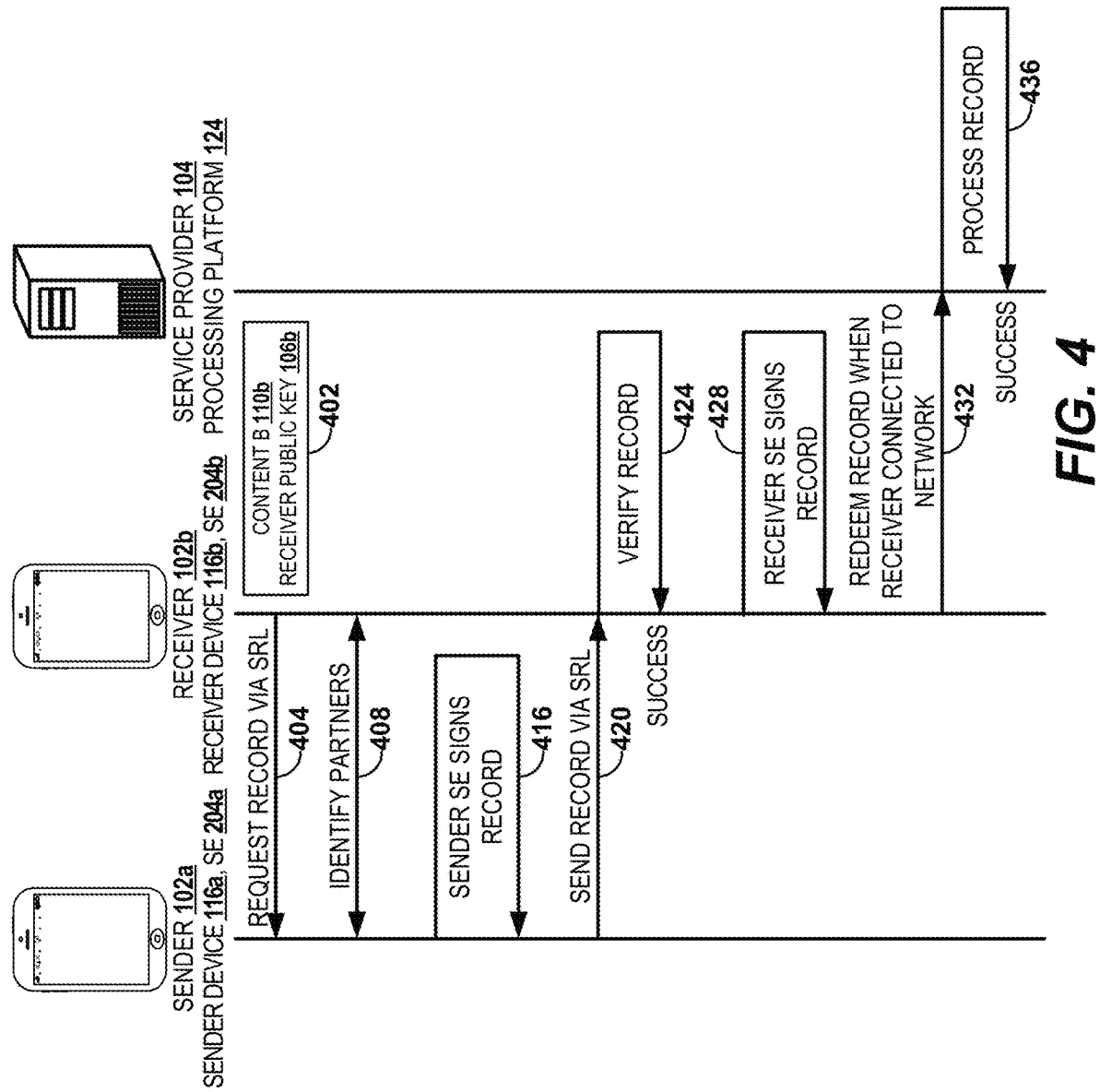
FIG. 4 is an interaction diagram illustrating one embodiment of securely exchanging and redeeming an individual record created for one record receiver.

In some embodiments, a record receiver can receive an individual record from a record sender. FIG. 4 is an interaction diagram illustrating one embodiment of securely exchanging and redeeming an individual record created for one record receiver. A record receiver 102*b*, using a record receiver device 116*b*, can request an individual record 100 from a record sender 102*a* by sending a content request 402 to a record sender device 116*a*. The record receiver 102*b* can send the record sender 102*a* the content request 402 using a short range link (SRL) 122 at interaction 404. The content request 402 can comprise a content, for example a content B 110*b* and a public key 106*b* of the record receiver device. The content B 110*b* can comprise a request for, for example, a document with its document ID stored in the content B 110*b*. In some embodiments, the public key 106*b* of the record receiver device can uniquely identify the record receiver device 116*b*. In some embodiments, the public key 106*b* of the record receiver device can uniquely identify the record receiver 102*b*. The public key 106*b* can be in the common records which can be stored in the secure element (SE) 204*b* in some embodiments.

Example Partner Identification

With reference to FIG. 4, at interaction 408, the record sender device 116*a*, using its transaction partner identifier, can confirm the identity of the record receiver device 116*b* by partner identification. Because the content request 402 may have been transmitted electronically to the record sender device 116*a*, the record sender device 116*a* may be unsure about the identity of the user device sending the content request 402. Partner identification can be advantageous. For example, with partner identification, the record sender device 116*a* can distinguish content requests 402 from the record receiver device 116*b* and from malicious users. As another example, with partner identification, a malicious user cannot receive an individual record not intended for it. As yet another example, with partner identification, a malicious user, even after receiving an individual record not intended for it, cannot redeem the individual record.

Example Individual Record Creation

Figure 5:
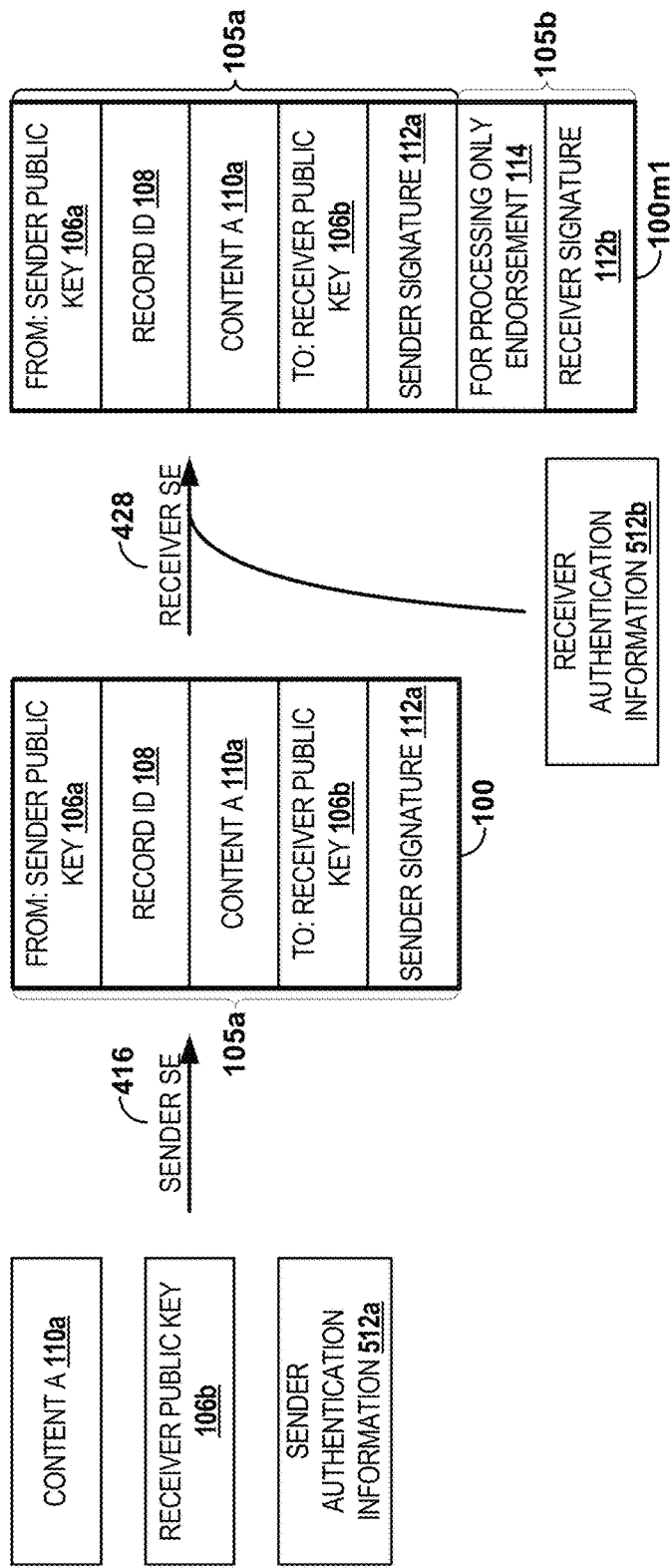
FIG. 5 schematically illustrates one example of an individual record created for one record receiver.

FIG. 5 schematically illustrates one example individual record created for one record receiver. As illustrated in FIGS. 4-5, after the secure element (SE) 204*a* of the record sender device 116*a* verifies authentication information 512*a* of the record sender, the secure element (SE) 204*a* can sign an individual record 100 at interaction 416. Prior to signing the individual record 100 at interaction 416, the secure element (SE) 204*a* can require both the provision of a block to be digitally signed, for example a block 105*a* of the individual record 100, and the authentication of the record sender 102*a*. Non-limiting examples of authentication can include passphrase authentication, biometric authentication such as fingerprint authentication or iris authentication, biological data authentication, or any combination thereof. Biometric authentication can utilize a biometric template based on, for example, fingerprints or eye images. The secure element (SE) 204*a* can implement a biometric fuzzy vault for recognizing the biometric template.

The individual record 100 can be a digital object comprising one or more blocks. The individual record 100 can comprise a block 105*a*, and the block 105*a* can comprise a public key 106*a* of the record sender device in the "from field," a public key 106*b* of the record receiver device in the "to field," a record ID 108, a content A 110*a*, and a record sender signature 112*a* of the block 105*a*. The public key 106*a* of the record sender device can identify the originator of the individual record 100, the record sender device 116*a*. The public key 106*b* of the record receiver device can identify the original recipient of the individual record 100, the record receiver device 116*b*. The content of the content A 110*a* can vary. The content A 110*a* and the content B A 110*b* can be the same, similar, related, or different The content A 110*a* can be the same as the content B 110*b*, for example a particular document. The content A 110*a* can be similar or related to the content B 110*b*. For example, the content B 110*b* can request access to a document, and the content A 110*a* can grant access to the document. As another example, the content B 110*b* can request access to two documents, and the content A 110*a* can grant access to only of the two documents. As described above, in the context of cryptocurrency, the content A 110*a* and the content B 110*b* can be the same amount of a cryptocurrency. The content A 110*a* and the content B 110*b* can be similar or related. For example, the content B 110*b* can be a pre-tax amount, and the content A 110*a* can be an after-tax amount. As another example, the content B 110*b* can be a pre-tip amount, and the content A 110*a* can be an after-tip amount.

With reference to FIG. 4, at interaction 420, the record sender 102*a* can send the individual record 100 to the record receiver 102*b*, for example, in a peer-to-peer manner using a short range link (SRL). Once in the possession of the record receiver 102*b*, the record receiver 102*b* can verify the individual record 100 at interaction 424. Verifying the individual record 100 can comprise authenticating the record sender signature 112*a*. Authenticating the record sender signature 112*a* can comprise determining, using the public key 106*a* of the record sender device, whether the record sender signature 112*a* has been created using the private key 210 of the record sender device. The public key 106*a* of the record sender device can be obtained by a number of ways. For example, the public key 106*a* of the record sender device can be obtained from the individual record 100. As another example, the public key 106*a* of the record sender device can be obtained from the common records 206 of the record receiver device 116*b*.

Example Individual Record Redemption

With reference to FIG. 4, after successfully verifying the individual record 100, the record receiver device 116*b* can, using its secure element 204*b*, create and sign the modified individual record 100*m*1 at interaction 428. Prior to signing the modified individual record 100*m*1 at interaction 428, the secure element (SE) 204*b* can require both the provision of a block to be digitally signed, for example a block 105*b* of the modified individual record 100*m*1, and authentication information 512*b* of the record receiver. The modified individual record 100*m*1 can comprise the block 105*a* of the individual record 100 and an endorsement block 105*b*. For example, the endorsement can be a "for processing only endorsement" (FPOE) 114 that, together with the public key 106*b* of the record receiver, specifies that the modified individual record 100*m*1 can only be redeemed by the record receiver 102*b*. As described above, in the context of cryptocurrency, an example of an FPOE endorsement includes a "for deposit only endorsement" (FDOE), in which the processing platform 124 will deposit an amount of cryptocurrency to the account of the record receiver 102b but will not recognize a further endorsement to another party.

After signing the modified individual record 100m1, the record receiver 102b can redeem the modified individual record 100m1 with the processing platform 124 at interaction 432 when the record receiver 102b is in communication with the processing platform 124 through, for example, the network 118. On redemption, a service provider 104 operating the processing platform 124 can process at interaction 436 the modified individual record 100m1 by verifying the authenticity of one or more signatures in the chain of blocks 105a and 105b in the modified individual record 100m1, for example the record sender signature 112a and the record receiver signature 112b. After successful verification, the processing platform 124 can perform as instructed by the content A 110a of the modified individual record 100m1.

The sender device 116a can receive an indication that the processing platform 124 has or has not performed as instructed by the content A 110a of the modified individual record 100m1. For example, the processing platform 124 can send the sender device 116a an email stating that the processing platform 124 has performed as instructed by the content A 110a of the modified individual record 100m1. As another example, the processing platform 124 can send the sender device 116a an electronic message stating that the processing platform 124 has not performed as instructed by the content A 110a of the modified individual record 100m1 because the content A 110a instructs the processing platform 124 to provide a document stored in a repository to the record receiver device 116b and repository is temporarily or permanently unavailable. As yet another example, the processing platform 124 can provide the sender device 116a with its user record status 306 periodically, such as hourly, daily, weekly, monthly, or yearly. The processing platform 124 can provide the sender device 116a with its user record status 306 when one or more conditions, such as the record sender device 116 can no longer give another user device access to a document, are satisfied.

Example Partner Identification

Partner identification can be based on various methods. Non-limiting examples of methods for partner identification include content authorization, knocking, physical indication, beam forming, prior arrangement, cursory validation, or any combination thereof.

Example Content Authorization

In some embodiments, partner identification can comprise content authorization. Utilizing content authorization, the record sender 102a can issue an intent to exchange an individual record to the record receiver device 116b based on the public key 106b in the content request 402. The content of the intent to exchange an individual record can vary. For example, the content of the intent to exchange an individual record can be empty or can contain one or more zero values. After the record receiver device 116b receives the intent to exchange an individual record, the record receiver 102b can confirm by non-electronic means that he is the recipient of the intent to exchange an individual record. For example, the record receiver 102b can verbally inform the record sender 102a that he has received the intent to exchange an individual record. As another example, the record receiver 102b can inform the record sender 102a that he has received the intent to exchange an individual record electronically. After confirmation, the content request 402 from the record receiver 102b can be validated, and the record sender 102a can send the record receiver device 116b an individual record 100 with an appropriate content.

Example Knocking

In some embodiments, partner identification can comprise knocking. The record sender device 116a and the record receiver device 116b each can comprise motion sensors. Utilizing knocking, the record sender device 116a and the record receiver device 116b can come into physical contact. Such contact can be measured by the motion sensors of the record sender device 116a and the record receiver device 116b. The relative timing of the contact and of sending and receiving the content request 402 can vary. For example, the record receiver device 116b can send the content request 402 at the time of the contact (e.g., at the time of the "knock"). As another example, the record receiver device 116b can send the content request 402 shortly after the contact (e.g., within a threshold time of 10 s, 20 s, 30 s, 1 min, 10 min, etc.). If the content request is not sent within the threshold time, the partner identification may require that the devices be knocked again.

The record sender device 116a can accept the content request 402 based on the temporal concurrency of the contact and the receipt of the content request 402. In some embodiments, the record receiver device 116b can send to the record sender device 116a a signature of the contact. The signature of the contact can be created using the private key of the record receiver device public-key cryptography pair. The signature of the contact can be based on the contact measured by the motion sensor of the record receiver device 116b and the timing of the contact measured. The signature of the contact can be part of the content request 402 or can be a separate communication from the record receiver device 116b to the record sender device 116a. Because the contact can produce an equal and opposite reaction in the record sender device 116a, the record sender device 116a can verify the signature of the contact.

Example Physical Indication

In some embodiments, partner identification can comprise physical indication. The record sender device 116a and the record receiver device 116b can comprise imaging sensors (e.g., digital cameras). The record sender device 116a and the record receiver device 116b can be oriented so as to "see" each other using their imaging sensors. The record receiver device 116b can send an image of the record sender device 116a it captures to the record sender device 116a. The image can be part of the content request 402 or can be a separate communication from the record receiver device 116b to the record sender device 116a. Because the image of the record sender device 116a and the image of the record receiver device 116b can be opposite of each other, the record sender device 116a can confirm the identity of the record receiver device 116b by qualitative or quantitative comparisons of the images. For example, if the record sender device 116a "sees" the record receiver device 116b to be up and to the left, then the record receiver device 116b should appear to be down and to the right in the image of the record sender device 116a captured by record receiver device 116b.

In some embodiments, physical indication can be based on the simultaneous observations of the environments of the record sender device 116a and the record receiver device 116b. The record sender device 116a and the record receiver device 116b can comprise microphones. The physical indication can be based on the simultaneous audio recordings of the environments by the microphones of the record sender device 116a and the record receiver device 116b. Both the record sender device 116a and the record receiver device 116b can simultaneously "hear" their environments using the microphones. The record receiver device 116b can send an audio recording of its environment it captures and the time of the recording to the record sender device 116a. The audio recording can be part of the content request 402 or can be a separate communication from the record receiver device 116b to the record sender device 116a. Because the sound recording sent by the record receiver device 116b can be the same as or similar to what the record sender device 116a "hears" at the same time, the record sender device 116a can confirm the identity of the record receiver device 116b by qualitative or quantitative comparisons of the sound recording and what it "hears". As another example, physical indication can be based on the simultaneous audio observations of each other by the record sender device 116a and the record receiver device 116b. As yet another example, physical indication can be based on the simultaneous visual observations of the environments by the record sender device 116a and the record receiver device 116b.

Example Beam Forming

In some embodiments, partner identification can comprise beam forming. The user device 116 can comprise a short range link (SRL) interface that is directional (e.g., using a beam-forming or directional antenna). The record sender device 116a and the record receiver device 116b can have their short range link (SRL) interfaces pointed at each other. Utilizing beam forming, the record sender device 116a can receive the content request 402 from the record receiver device 116b and not other content requests sent from other directions from, for example, malicious users. Utilizing beam forming, only the record sender device 116a, not other users, can receive the content request 402 from the record receiver device 116b.

Example Prior Arrangement

In some embodiments, partner identification can comprise prior arrangement. For example, the record sender device 116a may have prior knowledge of the public key 106b of the record receiver device prior to receiving the content request 402 from the record receiver device 116b. As another example, the record sender device 116a may have prior knowledge that a record receiver device with the public key 106b will send it a content request, for example the content request 402. For example, the sender 102a may have previously told the receiver 102b that a record is going to be sent. The receiver 102b can utilize a user interface (UI) on the receiver device 116b to provide an indication that the record is expected to come from the sender device 116a (e.g., within a threshold time period).

Example Cursory Validation

In some embodiments, partner identification can comprise cursory validation. For example, the common records 206 can contain identifying strings, for example BigBoxStore, that can be used for cursory validation of a content request 402. As an example, in which the receiver 102b is a merchant, the record receiver 102b can be identified as the merchant in the common records 206. The identification can be associated with an indication, for example a bit, in the common records 206 that the identity has been validated by the processing platform 124. Such a validated identity can be distinguished from identities assigned or provided by the users themselves.

Example Contents and Exchanges

The contents 110 of the individual records 100 can vary. For example, the contents 110 can include instructions for providing record receivers 102b with documents having their document IDs stored in the contents 110. As another example, the contents 110 can include instructions for paying the record receivers 102b a certain number of monetary units, for example U.S. Dollars. Payments can be in the form of, e.g., a national currency, a fiat currency, a commodity or a commodity currency, a cryptocurrency, a financial product or security (e.g., stocks or bonds), or any combination thereof.

The contents 110 of the individual records 100 can contain software code. The processing platform 124 can execute the software code when certain conditions are satisfied. The conditions can be time based, such as the time when the record receiver 102b redeems an individual record 100 containing the software code. The contents 110 can include self-executing software code. The self-executing code can automatically execute when certain conditions are satisfied. In some embodiments, the users can prevent or delay the execution of the software codes, for example, when certain conditions such as fraud are detected. In some embodiments, the users may be unable to prevent or delay the execution of the software codes.

The contents 110 of the individual records 100 can include contractual obligations or rights between the sender and the receiver (e.g., smart contracts). For example, the record receiver 102b may be under a contractual obligation to perform a service such as backing up the record sender's computer infrastructure and may have a contractual right to receive payment for the service; and the record sender 102a may be under a contractual obligation to pay the record receiver 102b for the service and may have a contractual right to receive the record receiver's performance. The smart contracts can be between individual users, partnerships, companies, or corporations. The smart contract can involve recurrent execution of software code. The software code can comprise software code that can be executed when certain conditions are satisfied. As an example, the software code can comprise software code for a backup or security scan of the receiver's computer infrastructure. The software code might be executed upon the occurrence of a condition (e.g., transfer of a monthly payment of cryptocurrency to the sender). In some embodiments, the smart contracts can involve recurring payments when certain conditions are satisfied. For example, a smart contract may require the record receiver 102b to backup the record sender's computer infrastructure periodically such as weekly. When the condition of the periodic performance is satisfied, the record sender 102a has a contractual obligation under the smart contract to pay the record receiver 102b periodically.

The contents 110 can involve escrow. For example, the record sender 102a and the record receiver 102b would like to exchange codes such as software codes. After providing first software codes to a repository, for example the processing platform 124, the record sender 102a can provide the record receiver 102b with a first individual record 100 instructing the repository to provide the record receiver 102b with the first software codes if first conditions are satisfied. Similarly, the original record receiver 102b can provide the original record sender 102a with a second individual record 100m1 instructing the repository to provide the original record sender 102a with second software codes if second conditions are satisfied. The first conditions and the second conditions can be time based. The first conditions and the second conditions can be the same or different.

In some embodiments, the record sender 102a can provide the record receiver 102b with the individual record 100 as a part of an exchange. For example, the content 110 of the individual record can instruct the processing platform 124 to debit the record sender's account with a first amount and to credit the record receiver's account with a second amount. The account debiting and crediting can be accompanied by the record receiver 102b providing the record sender 102a with, for example, a product or some codes.

Example Two Receivers

Example First Content Request

Figure 6:
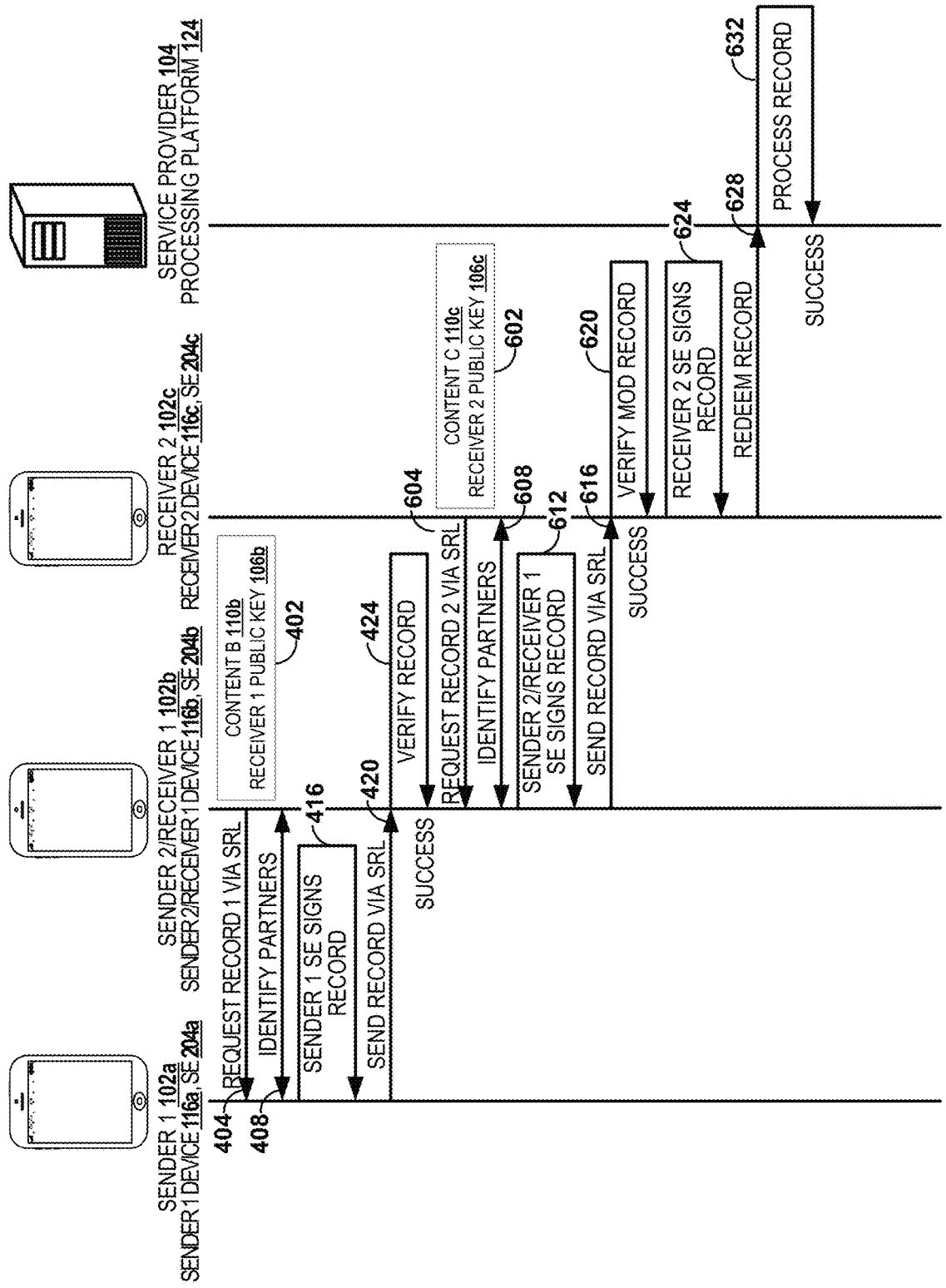
FIG. 6 is an interaction diagram illustrating one embodiment of securely exchanging and redeeming individual records created for two record receivers.

In some embodiments, after receiving an individual record from a record sender, a record receiver can send the received individual record to a subsequent record receiver. FIG. 6 is an interaction diagram illustrating one embodiment of securely exchanging and redeeming individual records created for two record receivers. As illustrated in FIGS. 4-5, a first record receiver 102b, using a first record receiver device 116b, can request an individual record from a first record sender 102a by sending a first content request 402, to a first record sender device 116a at interaction 404. The first content request 402 can comprise a content B 110b and a first public key 106b of the first record receiver device.

At interaction 408, the first record sender device 116a can confirm the identity of the first record receiver device 116b by partner identification. After the secure element (SE) 204a of the first record sender device 116a verifies authentication information 512a of the first record sender, the secure element (SE) 204a can sign an individual record 100 at interaction 416.

Figure 7:
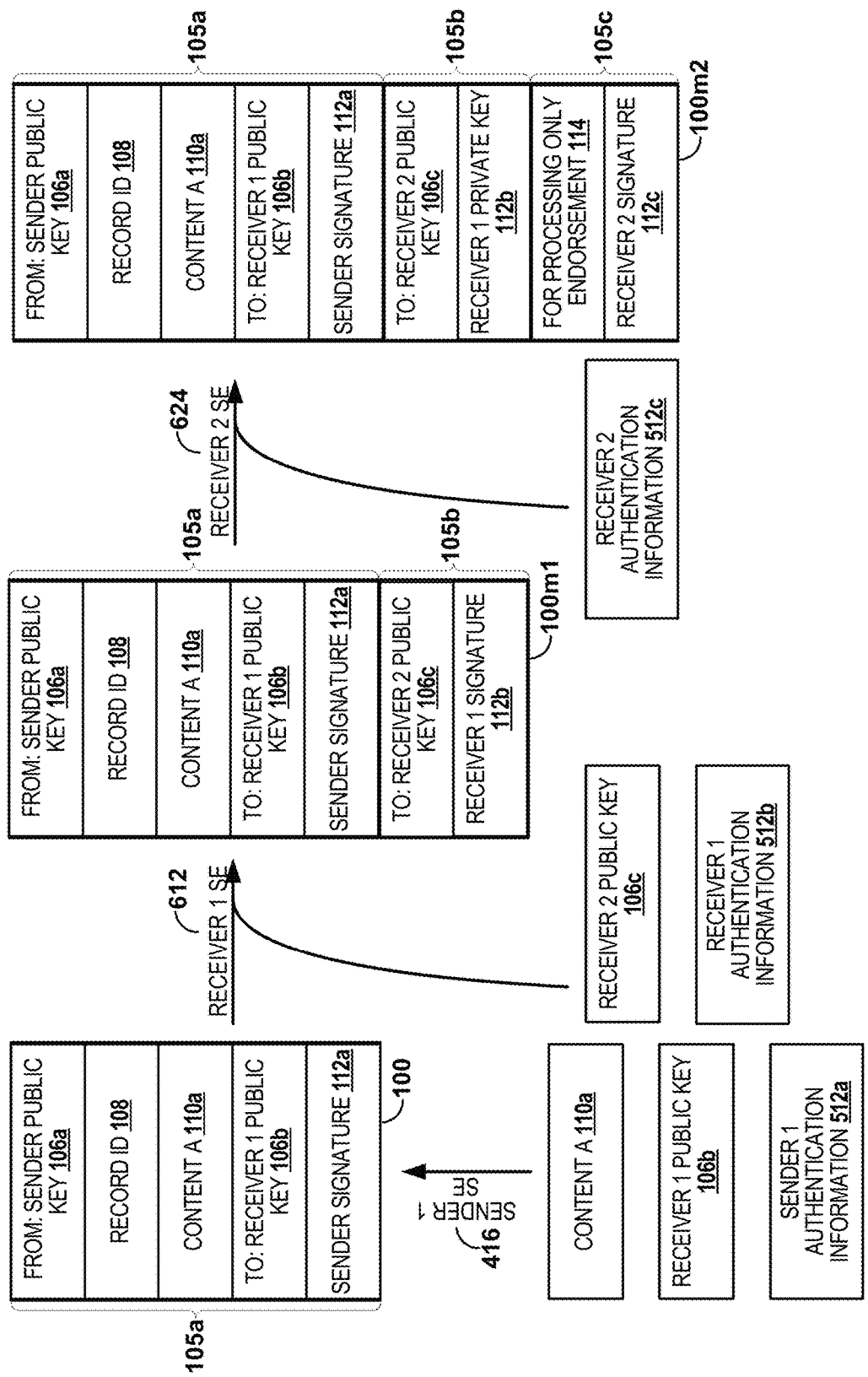
FIG. 7 schematically illustrates example individual records created for two record receivers.

FIG. 7 schematically illustrates example individual records created for two record receivers. As illustrated in FIGS. 6-7, the individual record 100 can be a digital object comprising a block 105a. The block 105a can comprise a first public key 106a of the first record sender device in the "from field," a first public key 106b of the first record receiver device in the "to field," a record ID 108, a content A 110a, and a first record sender signature 112a of the block 105a.

At interaction 420, the first record sender 102a can send the individual record 100 to the first record receiver 102b in, for example, a peer-to-peer manner using a short range link (SRL) 122. Once in the possession of the first record receiver 102b, the first record receiver 102b can verify the individual record 100 at interaction 424.

Example Second Content Request

With reference to FIG. 6, a second record receiver, using a record receiver device, can request an individual record from a record sender by sending a content request to a record sender device using a short range link (SRL) 122 at interaction 604. For example, a second record receiver 102c, using a second record receiver device 116c, can request an individual record from the first record receiver 102b by sending a second content request 602 to the first record receiver device 116b. The first record receiver 102b can be a second record sender, and the first record receiver device 116b can be referred to as a second record sender device. The second content request 602 can comprise a content, for example a content C 110c and a public key 106c of the second record receiver device.

At interaction 608, the second record sender device 116b can confirm the identity of the second record receiver device 116c by partner identification. After the secure element (SE) 204b of the second record sender device/first record receiver device 116b verifies authentication information 512b of the second record sender, the second record sender device 116b can decide to send the first modified record 100m1, after signing it, to the second record receiver device 116c for a variety of reasons and purposes. For example, the second record receiver 102c can be an assignee of the second record sender 102b. Instead of the processing platform 124 performing for the first record receiver/second record sender 102b as instructed by the content A 110a, the processing platform 124 can perform for the second record receiver 102c. The content A 110a, the content B 110b, and the content C 110c can be the same, similar, related, or different.

The secure element (SE) 204b can sign the first modified individual record 100m1 at interaction 612. Signing the first modified individual record 100m1 can comprise adding a block, for example a block 105b, to the individual record 100 to create a first modified individual record 100m1. The block 105b of the first modified individual record 100m1 can comprise a second public key 106c of the second record receiver device and a second record sender signature/first record receiver signature 112b of the block 105b.

At interaction 616, the second record sender 102b can send the first modified individual record 100m1 to the second record receiver 102c, e.g., in a peer-to-peer manner using a short range link (SRL) 122. Once in the possession of the second record receiver 102c, the second record receiver 102c can verify the first modified individual record 100m1 at interaction 620. Verifying the first modified individual record 100m1 can comprise authenticating the first record sender signature 112a and the second record sender signature 112b using, for example, the public key 106a of the first record sender device and the public key 106b of the second record sender device in the first modified individual record 100m1.

Example Individual Record Redemption

With reference to FIG. 6, after successfully verifying the first modified individual record 100m1, the second record receiver device 116c can, using its secure element (SE) 204c, create and sign a second modified individual record 100m2 at interaction 624, where m indicates the individual record 100 has been modified and m2 indicates the individual record 100 has been modified at least twice. Prior to signing the second modified individual record 100m2, the secure element (SE) 204c can require both the provision of a block to be digitally signed, for example a block 105c of the second modified individual record 100m2, and authentication information 512c of the second record receiver. The second modified individual record 100m2 can comprise the block 105a of the individual record 100, the block 105b of the first modified individual record, and an endorsement block 105c. For example, the endorsement can be a "for processing only endorsement" (FPOE) 114 that, together with the public key 106c of the record receiver device, specifies that the second modified individual record 100m2 can only be redeemed by the second record receiver 102c.

After signing the second modified individual record 100m2, the second record receiver 102c can redeem the second modified individual record 100m2 with the processing platform 124 at interaction 628. On redemption, a service provider 104 operating the processing platform 124 can process at interaction 632 the second modified individual record 100m2 by verifying the authenticity of one or more signatures in the chain of blocks 105a, 105b, and 105c in the second modified individual record 100m2. Signatures verified can include the first record sender signature 112a, the second record sender signature/first record receiver signature 112b, and second record receiver signature 112c. After successful verification, the processing platform 124 can perform as instructed by the content A 110a of the second modified individual record 100m1.

Example N Receivers

In some embodiments, after receiving an individual record from a record sender, a record receiver can send the received individual record to a subsequent record receiver. The subsequent record receiver can in turn send the individual record it has received to another record receiver. A last record receiver can redeem the individual record it has received with a processing platform. The number N of senders/receivers in the chain of records can be 2, 3, 4, 5, 6, 10, 20, 100, or more.

Example First Content Request

Figure 8:
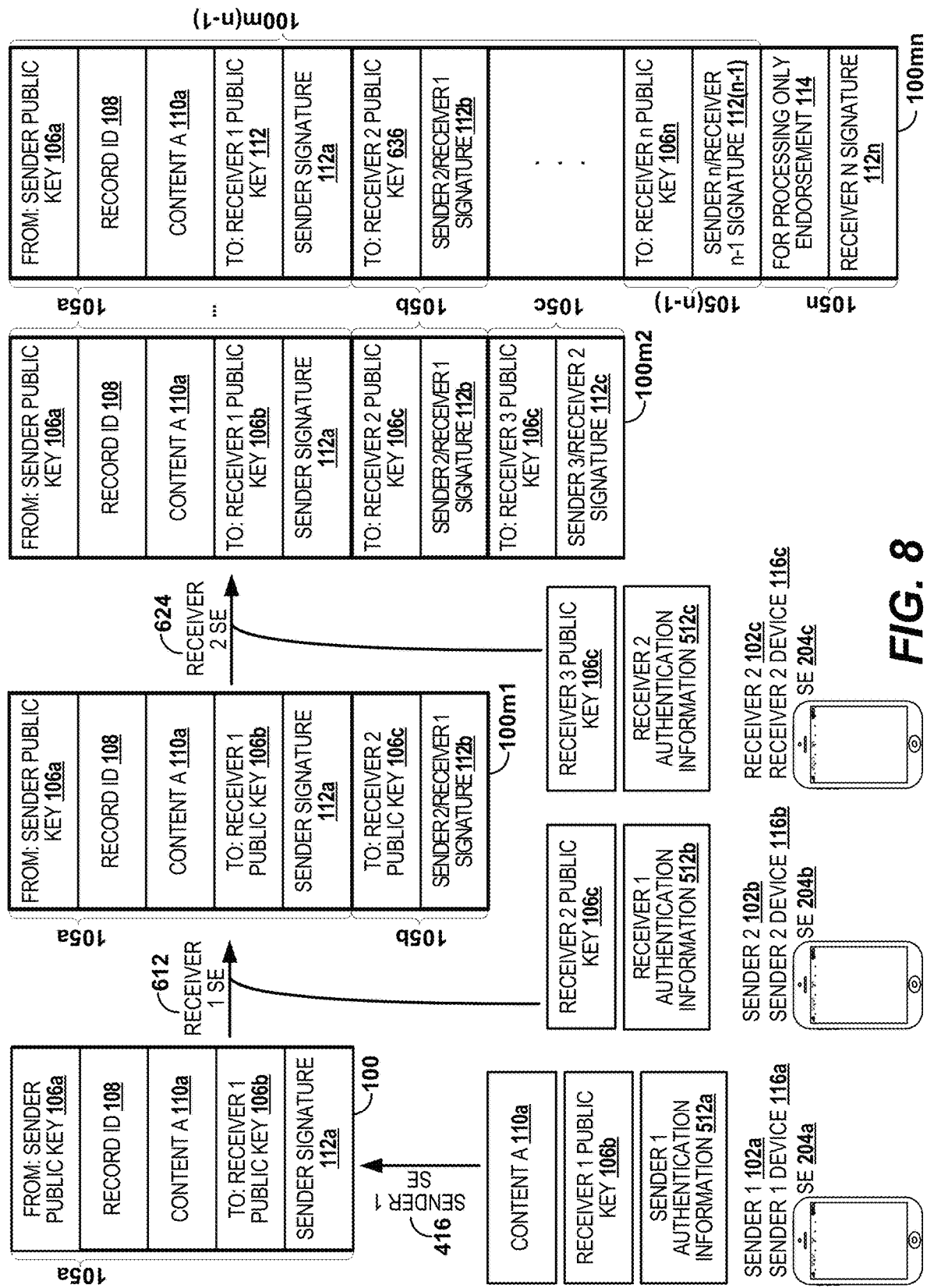
FIG. 8 schematically illustrates example individual records created for a plurality of record receivers.

FIG. 8 schematically illustrates example individual records created for with a plurality of record receivers. As illustrated in FIGS. 4-7, a first record receiver 102*b*, using a first record receiver device 116*b*, can request an individual record from a first record sender 102*a* by sending a first content request to a first record sender device 116*a* using a short range link (SRL) 122. The first content request can comprise a content B and a first public key 106*b* of the first record receiver device.

The first record sender device 116*a* can confirm the identity of the first record receiver device 116*b* by partner identification. After the secure element (SE) 204*a* of the first record sender device 116*a* verifies authentication information 512*a* of the first record sender, the secure element (SE) 204*a* can sign an individual record 100 at interaction 416.

The individual record 100 can be a digital object comprising a block 105*a*. The block 105*a* can comprise a first public key 106*a* of the first record sender device in the "from field," a first public key 106*b* of the first record receiver device in the "to field," a record ID 108, a content A 110*a*, and a first record sender signature 112*a* of the block 105*a*.

The first record sender 102*a* can send the individual record 100 to the first record receiver 102*b* in, for example, a peer-to-peer manner using a short range link (SRL) 122. Once in the possession of the first record receiver 102*b*, the first record receiver 102*b* can verify the individual record 100.

Example Second Content Request

With reference to FIG. 8, a second record receiver, using a record receiver device, can request an individual record from a record sender by sending a content request to a record sender device using a short range link (SRL) 122. For example, a second record receiver 102*c*, using a second record receiver device 116*c*, can request an individual record from a second record sender 102*b* by sending a second content request to a second record sender device 116*b* using a short range link (SRL) 122. The first record receiver 102*b* can be a second record sender, and the first record receiver device 116*b* can be referred to as a second record sender device. The second content request can comprise a content C and a public key 106*c* of the second record receiver device.

The second record sender device/first record receiver device 116*b* can confirm the identity of the second record receiver device 116*c* by partner identification. After the secure element (SE) 204*b* of the second record sender device/first record receiver device 116*b* verifies authentication information 512*b* of the second record sender, the second record sender device 116*b* can decide to send a first modified record 100*m*1, after signing it, to the second record receiver device 116*c*.

The secure element (SE) 204*b* of the second record sender device 116*b* can sign the first modified individual record 100*m*1 at interaction 612. Signing the first modified individual record 100*m*1 can comprise adding a block, for example a block 105*b*, to the individual record 100 to create the first modified individual record 100*m*1. The block 105*b* of the first modified individual record 100*m*1 can comprise a second public key 106*c* of the second record receiver device and a second record sender signature/first record receiver signature 112*b* of the block 105*b*.

The second record sender 102*b* can send the first modified individual record 100*m*1 to the second record receiver 102*c* in, for example, a peer-to-peer manner using a short range link (SRL) 122. Once in the possession of the second record receiver 102*c*, the second record receiver 102*c* can verify the first modified individual record 100*m*1. Verifying the first modified individual record 100*m*1 can comprise authenticating the first record sender signature 112*a* and the second record sender signature 112*b* using, for example, the public key 106*a* of the first record sender device and the public key 106*b* of the second record sender device in the first modified individual record 100*m*1.

Example Third Content Request

With reference to FIG. 8, a third record receiver, using a third record receiver device, can request an individual record from a record sender by sending a content request to a record sender device using a short range link (SRL) 122. For example, a third record receiver, using a third record receiver device, can request an individual record from a third record sender, by sending a third content request to a third record sender device 116*c* using a short range link (SRL) 122. The second record receiver 102*b* can be a third record sender, and the second record receiver device 116*b* can be referred to as a third record sender device. The third content request can comprise a content and a public key of the third record receiver device.

The third record sender device 116*c* can confirm the identity of the third record receiver device by partner identification. After the secure element (SE) 204*c* of the third record sender device/second record receiver device 116*c* verifies authentication information 512*c* of the third record sender, the third record sender device can send a second modified record 100*m*2, after signing it, to the third record receiver device.

The secure element (SE) 204*c* can sign the second modified individual record 100*m*2 at interaction 624. Signing the second modified individual record 100*m*2 can comprise adding a block, for example a block 105*c*, to the first modified individual record 100*m*1 to create the second modified individual record 100*m*2. The block 105*c* of the second modified individual record 100*m*2 can comprise a third public key 106*c* of the second record receiver device and a third record sender signature/second record receiver signature 112*c* of the block 105*c*.

The third record sender 102*c* can send the second modified individual record 100*m*2 to the third record receiver in, for example, a peer-to-peer manner using a short range link (SRL) 122. Once in the possession of the third record receiver, the third record receiver can verify the second modified individual record 100*m*2. Verifying the second modified individual record 100*m*2 can comprise authenticating the first record sender signature 112*a*, the second record sender signature/first record receiver signature 112*b*, and the third record sender signature/second record receiver signature 112*c* using, for example, the public keys 106*a*, 106*b*, and 106*c* of the first record sender device, the second record sender device, and the third record sender device in the second modified individual record 100*m*2.

Example nth Content Request

With reference to FIG. 8, an nth record receiver, using an nth record receiver device, can request an individual record from an nth record sender, by sending an nth content request to an nth record sender device using a short range link (SRL) 122. The nth record sender can be an (n−1)th record receiver, and the (n−1)th record receiver device can be referred to as an nth record sender device. The nth content request can comprise a content and a public key of the nth record receiver device.

The nth record sender device can confirm the identity of the nth record receiver device by partner identification. After the secure element (SE) of the nth record sender device/(n−1)th record receiver device verifies authentication information of the nth record sender, the nth record sender device can send a (n−1)th modified record 100m(n−1), after signing it, to the nth record receiver device, where m indicates the individual record 100 has been modified and m(n−1) indicates the individual record 100 has been modified at least (n−1) times.

The secure element (SE) of the nth record sender device can sign the (n−1)th modified individual record 100m(n−1). Signing the (n−1)th modified individual record 100m(n−1) can comprise adding a block 105(n−1), to the (n−2)th modified individual record to create a (n−1)th modified individual record 100m(n−1). The block 105(n−1) of the (n−1)th modified individual record 100m(n−1) can comprise an nth public key 106n of the nth record receiver device and an nth record sender signature/(n−1)th record receiver signature 112(n−1) of the block 105(n−1).

The nth record sender can send the (n−1)th modified individual record 100m(n−1) to the nth record receiver in, for example, a peer-to-peer manner using a short range link (SRL) 122. Once in the possession of the nth record receiver, the nth record receiver can verify the (n−1)th modified individual record 100m(n−1). Verifying the (n−1)th modified individual record 100m(n−1) can comprise authenticating the first record sender signature 112a, the second record sender signature 112b, . . . , and the (n−1)th record sender signature 112(n−1) using, for example, the public keys of the first record sender device 112a, the second record sender device 112b, the third record sender device 112c, . . . , and the nth record sender device in the (n−1)th modified individual record 100m(n−1).

Example Individual Record Redemption

With reference to FIG. 8, after successfully verifying the (n−1)th modified individual record 100m(n−1), the nth record receiver device can, using its secure element, create and sign an nth modified individual record 100mn, where m indicates the individual record 100 has been modified and mn indicates the individual record 100 has been modified at least N times. Prior to signing the nth modified individual record 100MM, the secure element (SE) can require both the provision of a block to be digitally signed, for example a block 105n of the nth modified individual record 100mn, and authentication information of the nth record receiver. The nth modified individual record 100mn can comprise an endorsement block 105n. For example, the endorsement can be a "for processing only endorsement" (FPOE) 114 that, together with the public keys in the nth modified individual record 100mn, specifies that the nth modified individual record 100mn can only be redeemed by the nth record receiver.

After signing the nth modified individual record 100mn, the nth record receiver can redeem the nth modified individual record 100mn with a processing platform. On redemption, a service provider operating the processing platform can process the nth modified individual record 100mn by verifying the authenticity of the signatures in the chain of blocks 105a, 105b, 105c, . . . , 105(n−1), and 105n in the nth modified individual record 100mn. After successful verification, the processing platform 124 can perform as instructed by the content A 110a of the nth modified individual record 100mn.

Example Interactions Between Agent and Record Receiver

Example from Record Sender to Agent

In some embodiments, an agent can act on behalf of a record receiver. In an example context of a merchant or a principal, the merchant or the principal may be the record receiver, and the agent may be an attendant at a checkout lane or payment booth. In another example context, the agent may be a self-checkout machine or kiosk that allows customers to process their own purchases from a merchant. The attendant accepts payments on behalf of the merchant upon customer checkout, typically using a point-of-sale (POS) device such as a cash register to receive a payment sent from the customer's electronic device 116a.

Figure 9:
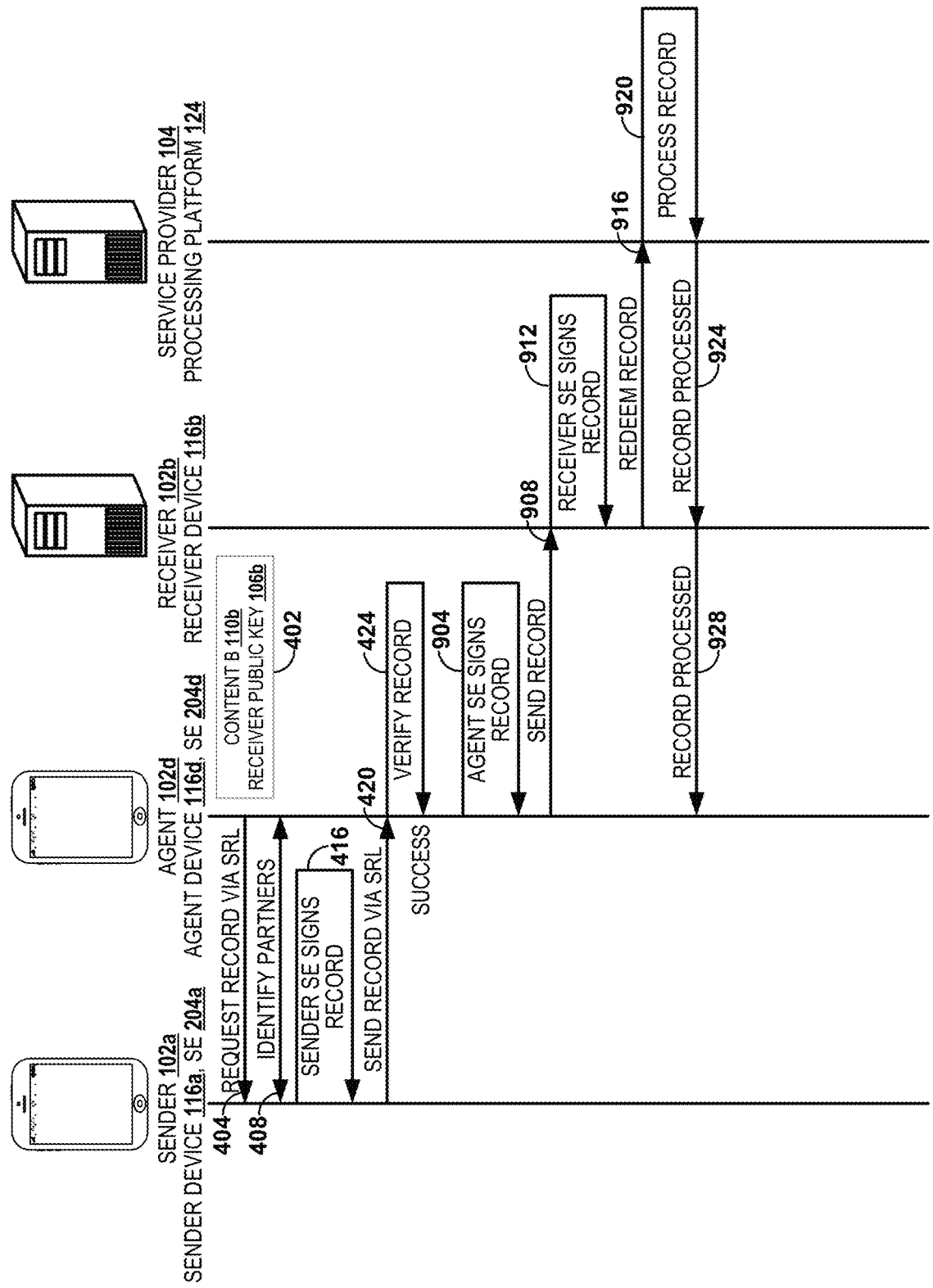
FIG. 9 is an interaction diagram illustrating one embodiment of securely exchanging and redeeming individual records involving an agent and a receiver.

FIG. 9 is an interaction diagram illustrating one embodiment of securely exchanging and redeeming individual records involving an agent and a receiver. An agent 102d of a record receiver 102b, using an agent device 116d, can request an individual record from a record sender 102a by sending a content request 402, to a record sender device 116a using a short range link (SRL) 122 at interaction 404. The content request 402 can comprise a content B 110b and a public key 106b of the record receiver.

The record receiver 102b, for example a merchant, can have or can be associated with one or more agents 102d, for example ten agents (e.g., checkers). The relationships between the agents 102d and the agent devices 116d can vary. For example, some agents 102d can share one agent device 116d, and agent devices 116d can support multiple logins by authorized agents 102d. As another example, some agents 102d do not share agent devices 116d. As yet another example, some agents 102d each can have more than one agent device 116d. Some agents 102d can own their own agent devices 116d.

The record receiver 102b can have or can be associated with one or more public keys 106b. For example, the record receiver 102b can have one public key 106b. As another example, the record receiver 102b can have one public key 106b per location, for example a physical location or a virtual location. A physical location can be a store location or a location of exchange. As yet another example, the record receiver 102b can have one public key 106b per external device.

Agents 102d can advantageously interact with external devices that are not part of the systems and methods of the present disclosure. Non-limiting examples of external devices include cellular telephones, tablet computers, e-readers, smart watches, head mounted augmented, virtual, or mixed reality display systems, wearable display systems, computers, server computers, point of sale systems, or cash registers. External devices can be fixed in locations, for example a physical location such as a store location. External devices can be part of an infrastructure, for example an existing infrastructure.

The management of the public keys 106b can vary. For example, the record receiver 102b can manage the public keys 106b itself using the record receiver device 116b or one or more other computers it operates. As another example, a service provider 104 can manage the public keys 106b of the record receiver as a service similar to "software as a service" (Saas).

Advantageously, the agent 102d cannot redeem the individual record 100 or a first modified individual record 100m1 with a processing platform 124 because the block 105a contains the public key 106b of the record receiver device 116b, and not the public key 106d of the agent device 116d.

At interaction 408, the record sender device 116a can confirm the identity of the agent device 116d or the identity of the record receiver device 116b by partner identification.

After the secure element (SE) 204a of the record sender device 116a verifies authentication information 512a of the record sender, the secure element (SE) 204a can sign an individual record 100 at interaction 416.

Figure 10:
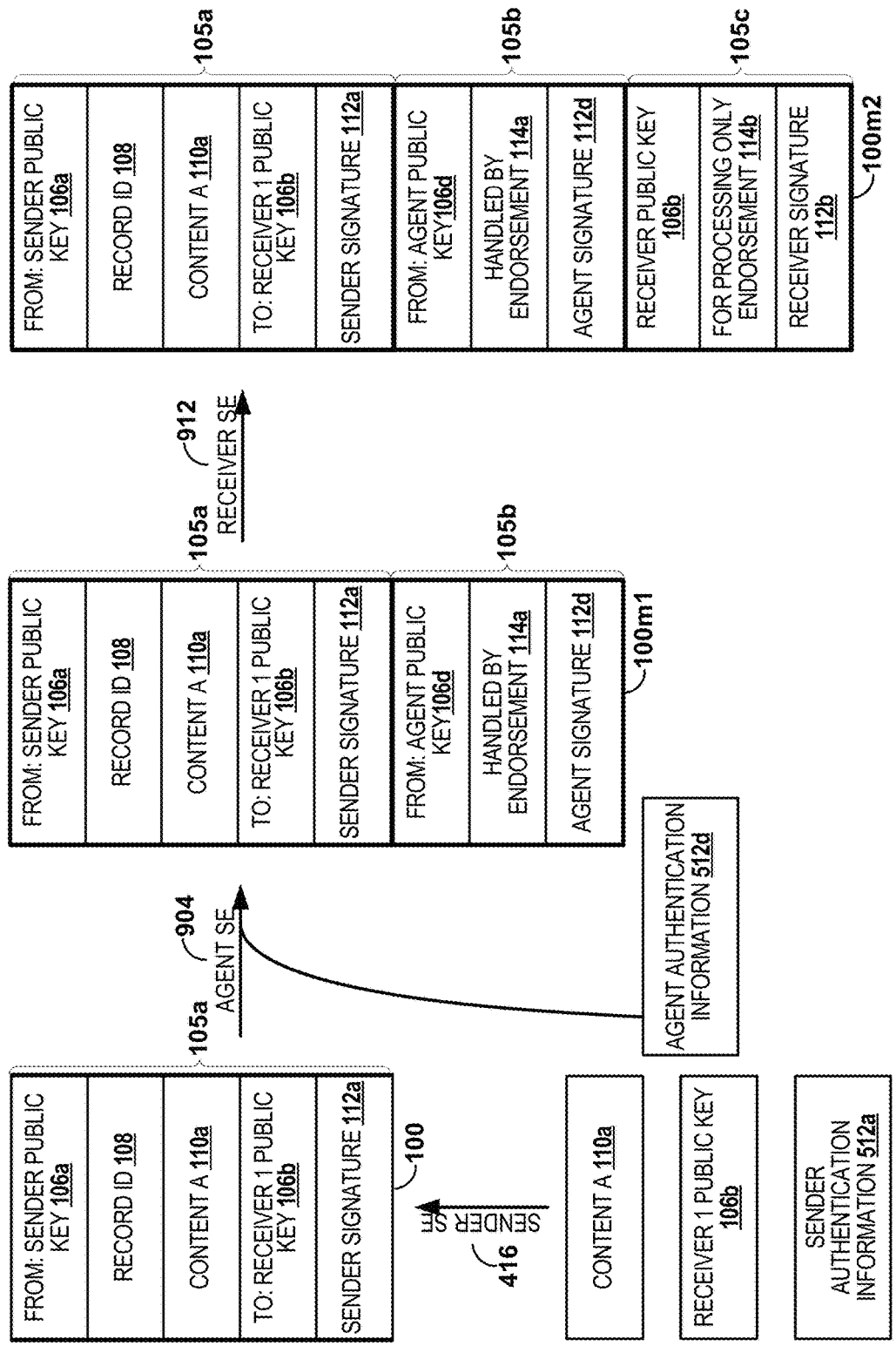
FIG. 10 schematically illustrates example individual records involving an agent and a record receiver.

FIG. 10 schematically illustrates example individual records involving an agent and a record receiver. As illustrated in FIGS. 9-10, the individual record 100 can be a digital object comprising a block 105a. The block 105a can comprise a public key 106a of the record sender device in the "from field," a public key 106b of the record receiver device in the "to field," a record ID 108, a content A 110a, and a record sender signature 112a of the block 105a.

At interaction 420, the record sender 102a can send the individual record 100 to the agent 102d in, for example, a peer-to-peer manner using a short range link (SRL) 122. Once in the possession of the agent 102d, the agent 102d can verify the individual record 100 at interaction 424. In some embodiments, the agent device 116d can be connected to a network, for example the network 118, through a private network of the record receiver 102b. Using this connectivity to the network 118, the agent device 116d can verify the individual record 100 with the processing platform 124. In some embodiments, the agent device 116d, not the record sender device 116a, can have access to the network.

Example from Agent to Record Receiver

With reference to FIG. 9, in some embodiments, the secure element (SE) 204d of the agent device 116d can create and sign the first modified individual record 100m1 at interaction 904, prior to sending the first modified individual record 100m1 to the record receiver 102b at interaction 908. Signing the first modified individual record 100m1 can comprise adding a block 105b to the first individual record 100 to create the first modified individual record 100m1. The block 105b of the first modified individual record 100m1 can comprise a public key 106d of the agent device, an endorsement, and an agent signature 112d of the block 105b. The endorsement can be, for example, a "handled by endorsement" (HBE) 114a. The "handled by endorsement" (HBE), the public key 106d of the agent device, and the agent signature 112d, together with the public key 106a of the record sender device and the public key 106b of the record receiver device, can indicate that the agent device 116d may have received the individual record 100 from the record sender device 116a on behalf of the record receiver 102b.

At interaction 908, the agent 102d can send the first modified individual record 100m1 to the record receiver 102b directly through a communication link or indirectly. For example, the agent 102d can send the first modified individual record 100m1 to the record receiver 102b in, for example, a peer-to-peer manner using a short range link (SRL) 122. As another example, the agent 102d can send the first modified individual record 100m1 to the record receiver 102b through a network, for example the network 118. The configuration of the record receiver device 116b can vary. For example, the record receiver device 116b can be similar to or the same as the user device 116 illustrated in FIG. 2, the processing platform 124 illustrated in FIG. 3, or any combination thereof.

In some embodiments, once in the possession of the record receiver 102b, the record receiver 102b can verify the first modified individual record 100m1. Verifying the first modified individual record 100m1 can comprise determining whether the public key 106d associated with the agent device is associated with an authorized agent 102d. The record receiver 102b can reject individual records received by a non-authorized person, or received by while not endorsed by an authorized agent. Verifying the first modified individual record 100m1 can comprise authenticating the record sender signature 112a and agent signature 112d using, for example, the public key 106a of the record sender device and the public key 106d of the agent device in the first modified individual record 100m1.

Example Individual Record Redemption

With reference to FIG. 9, the record receiver device 116b can use, for example, its secure element (SE) 204b to create and sign a second modified individual record 100m2. In some embodiments, prior to signing the second modified individual record 100m2 at interaction 912, the secure element (SE) 204b of the record receiver device 116b can require both the provision of a block to be digitally signed, for example a block 105c of the second modified individual record 100m2, and authentication information of the record receiver or an authorized personnel working for the record receiver 102b.

The content of the second modified individual record 100m2 can vary.

For example, the second modified individual record 100m2 can comprise the block 105b of the first modified individual record 100m1. As another example, the second modified individual record 100m2 may not comprise the block 105b of the first modified individual record 100m1. The second modified individual record 100m2 can comprise an endorsement block 105c. For example, the endorsement can be a "for processing only endorsement" (FPOE) 114b that, together with the public key 106b of the record receiver, specifies that the second modified individual record 100m2 can only be redeemed by the record receiver 102b.

After signing the second modified individual record 100m2, the record receiver 102b can redeem the second modified individual record 100m2 with the processing platform 124 at interaction 916. On redemption, a service provider 104 operating the processing platform 124 can process at interaction 920 the second modified individual record 100m2 by verifying the authenticity of one or more signatures in the chain of blocks 105a, 105b, and 105c in the second modified individual record 100m2. For example, the processing platform 124 can verify the record sender signature 112a, the agent signature 112d, and record receiver signature 112b. After successful verification, the processing platform 124 can perform as instructed by the content A 110a of the second modified individual record 100m2.

In some embodiments, the processing platform 124 can inform the record receiver device 116b at interaction 924 that the second modified individual record 100m2 has been processed successfully. The record receiver device 116b can in turn notify the agent device 116d at interaction 928 that the modified individual record 100m1 has been successfully processed using, for example, a "handled by endorsement" (HBE).

The agent device 116d can remove the modified individual record 100m1 stored in the individual records container 202 of the agent device 116d as one of the unredeemed individual records 208. The agent device 116d can input the content A 110a of the individual record 100 into an external device accompanied by, for example, a message such as "record cleared."

Example Context of Buyers/Payers and Sellers/Payees

In some embodiments, the content request 402 can be a payment request 402 comprising an amount B 110b. The individual records 100 can comprise digital cheques 100. The content A 110a of an individual record 100 can comprise an amount A 110a. The amount B and the amount A can be the same, similar, or different. The amount can be a fiat currency, cryptocurrency (e.g., Bitcoin), a financial security (e.g., stock or bond), or any type of real, intangible, or virtual asset. The record ID 108 can comprise a check ID 108. Creating individual records 100 can comprise creating digital checks 100, and creating modified individual records 100m1 can comprise creating modified digital checks 100m1. A "for processing only endorsement" (FPOE) can be a "for deposit only endorsement" (FDOE).

The record sender 102a can be a buyer or a payer 102a, and the record receiver 102b can be a seller or a payee 102b. The record sender device 116a and the record receiver device 116b can be a buyer device or a payer device 116a and a seller device or a payee device 116b. The exchange involving the individual record 100 can be the record sender 102a buying, for example, a computer from the record receiver 102b, and the record sender 102a paying the purchase with a digital cheque 100 with the amount A 110a being the purchase price of the computer. The agent 102d illustrated in FIG. 9 can be a checker or a cashier 102d. The record receiver 102b illustrated in FIG. 9 can be a merchant 102b. An external device can be a point of sale system or a cash register.

The common records 206 in the common records container 240 can be a common ledger 206 in a common ledger container 240. Unredeemed individual records 208 stored in the individual records container 202 can be unredeemed cheques 208 stored in a wallet 202.

The processing platform 124 can process payments. The processing platform 124 performing for the record receiver 102b as instructed by the content 110 of the modified individual record 100m1 can comprise providing the payee device with an amount A 110a as instructed by the modified digital cheque 100m1. The central records container 332 can be a central ledger, and the central records 302 can comprise a common ledger. The user record status 306 can comprise user current balance 306.

Examples of Costs/Fees

Third parties other than users 102a or 102b and the service provider 104 can charge third party fees for certain activities. For example, the third party maintaining, for example, documents with their document IDs stored in the contents 110 of the individual records 100 can charge the processing platform 124 access fees for accessing these documents. The processing platform 124 can in turn charge the users 102a or 102b the access fees.

The processing platform 124 can charge transaction fees for certain transactions. For example, the processing platform 124 can charge transaction fees for processing the individual records 100 or for maintaining user accounts. As another example, the processing platform 124 can charge transaction fees for accessing documents as instructed by the contents 110 of the individual records 100. As yet another example, the processing platform 124 can charge transaction fees for providing record receivers with access to the documents with their document IDs stored in the contents 110 of individual records 100. The processing platform 124 can charge different users different fees for the same or similar transactions such as accessing the same or similar documents. As yet another example, the processing platform 124 can charge users for undesirable behaviors, for example granting other users access to documents when they should not. The transaction fees can be based on the transaction size or the number of transactions, can be fixed, or any combination thereof.

The processing platform 124 can charge the record receiver 102b with agents 102d, for example, maintenance fees for key pairs. The maintenance fees can be charged once, for example, when the processing platform 124 provide the record receiver 102b with the key pairs, or can be charged periodically. The charge can be fixed, negotiated, discounted, preferential, exclusive, or any combination thereof.

Example Query Endorsement

In some embodiments, a record receiver can be connected to a network even if a record sender may not. For example, a record sender 102a and a record receiver 102b can exchange an individual record 100 at the record sender's place of business. A record receiver device 116b operated by the record receiver 102b may be connected the network 118, through a private network operated by, for example, the record receiver 106b. And a record sender device 116a operated by the record sender 102a may not be connected to the network 118 because of, for example, poor cellular connectivity. Before accepting an exchange involving the individual record 100, the record receiver 102b can electronically query a processing platform 124 regarding whether the processing platform 124 will perform as instructed in a content A 110a of the individual record 100 when the individual record 100 is electronically communicated to and redeemed with the processing platform 124. For example, the content A 110a can give the record receiver device 102b access to the document with its document ID stored in the content A 110a. The receiver 102b can verify using, for example, a "query endorsement" (QE) with the processing platform 124 that the record sender 102a can give access to the document to the record receiver 102b.

Figure 11:
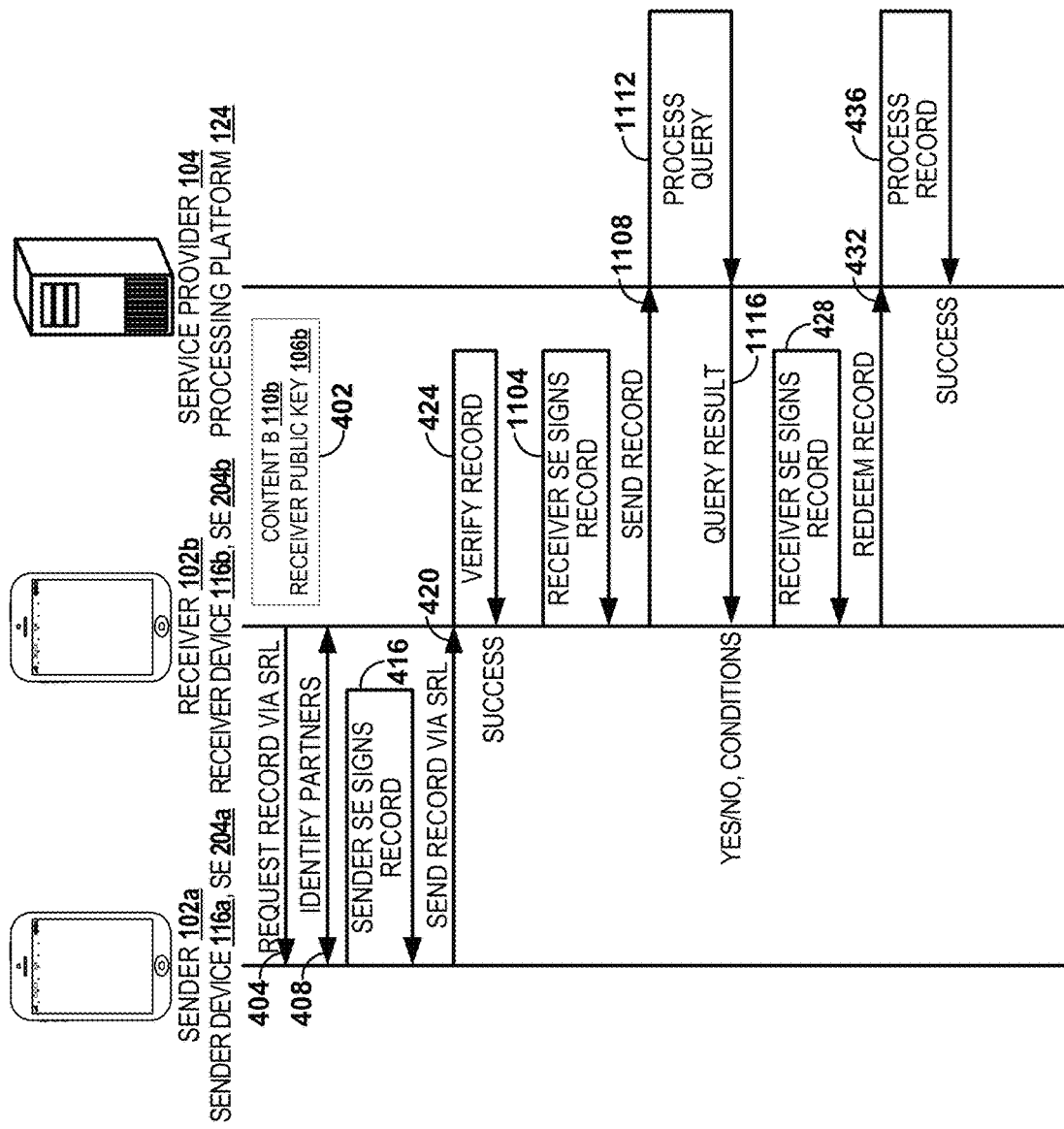
FIG. 11 is an interaction diagram illustrating one embodiment of securely exchanging and redeeming individual records involving query endorsement.

FIG. 11 is an interaction diagram illustrating one embodiment of securely exchanging and redeeming individual records involving query endorsement. As illustrated in FIGS. 4-5, a record receiver 102b, using a record receiver device 116b, can request an individual record 100 from a record sender 102A by sending a content request 402 to a record sender device 116A using a short range link (SRL) 122 at interaction 404. The content request 402 can comprise a content B 110b and a public key 106b of the record receiver device.

At interaction 408, the record sender device 116A can confirm the identity of the record receiver device 116b by partner identification. After the secure element (SE) 204A of the record sender device 116A verifies authentication information 512A of the record sender, the secure element 204A can sign an individual record 100 at interaction 416. Prior to signing the individual record 100 at interaction 416, the secure element 204A can require both the provision of a block to be digitally signed, for example a block 105A of the individual record 100, and the authentication of the record sender 102A.

Figure 12:
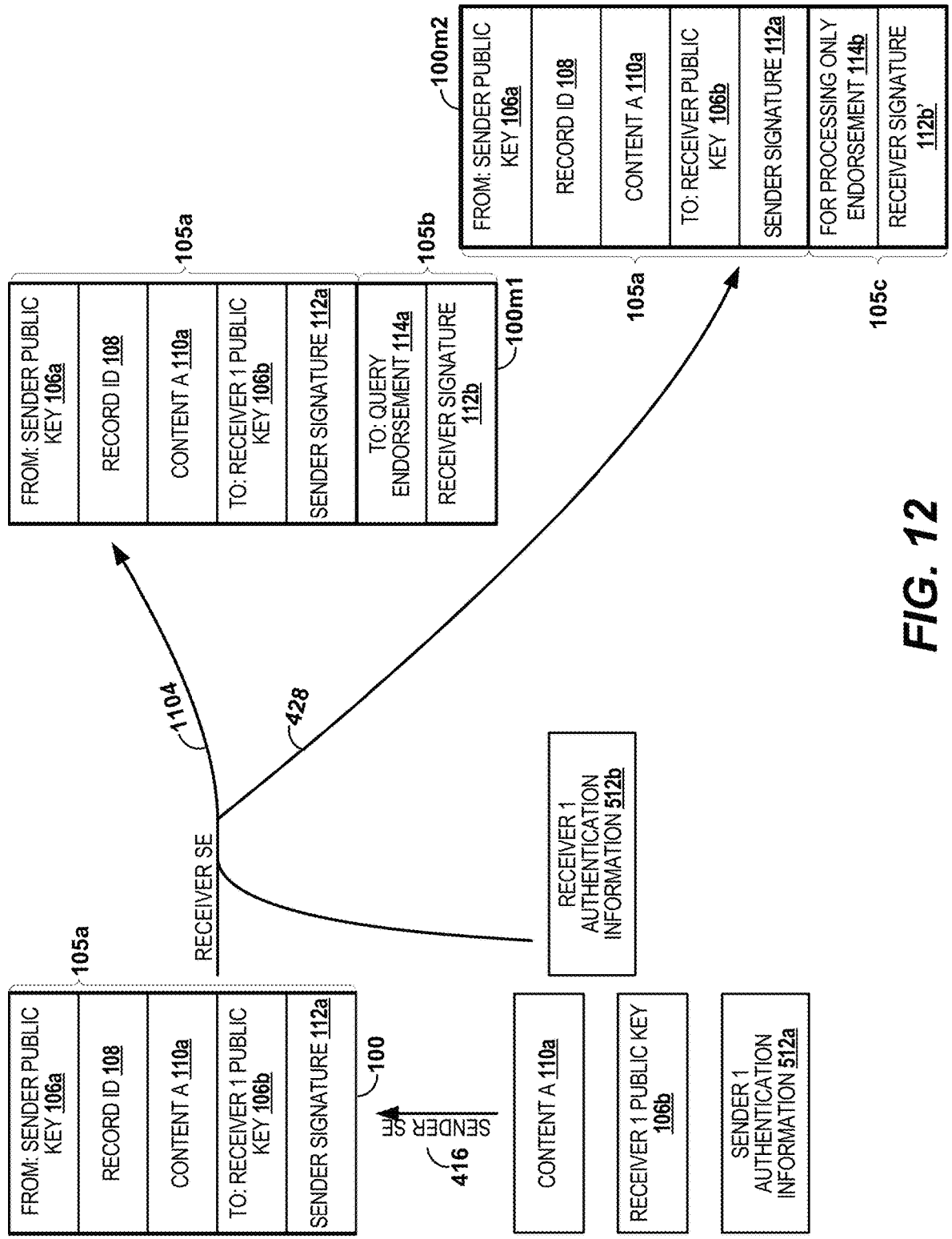
FIG. 12 schematically illustrates example individual records involving query endorsement.

FIG. 12 schematically illustrates example individual records involving query endorsement. As illustrated in FIGS. 11-12, the individual record 100 can be a digital object comprising one or more blocks. The individual record 100 can comprise a block 105a. The block 105a can comprise a public key 106a of the record sender device in the "from field," a public key 106b of the record receiver device, a record ID 108 in the "to field," a content A 110a, and a record sender signature 112a of the block 105a.

As illustrated in FIG. 11, at interaction 420, the record sender 102a can send the individual record 100 to the record receiver 102b in, for example, a peer-to-peer manner using a short range link (SRL) 122. Once in the possession of the record receiver 102b, the record receiver 102b can verify the individual record 100 at interaction 424. Verifying the individual record 100 can comprise authenticating the record sender signature 112a using, for example, the public key 106a of the record sender device in the individual record 100.

Example Querying

With reference to FIG. 11, after successfully verifying the individual record 100, the record receiver device 116b can, using its secure element 204b, create and sign a first modified individual record 100m1. Prior to signing the first modified individual record 100m1 at interaction 1104, the secure element (SE) 204b can require both the provision of a block to be digitally signed, for example a block 105b of the modified individual record 100m1, and authentication information 512b of the record receiver. The first modified individual record 100m1 can comprise the block 105a of the individual record 100 and the block 105b. The block 105b can comprise an endorsement and a record receiver signature 112b of the block 105b. For example, the endorsement can be a "query endorsement" (QE) 114a. The "query endorsement" 114a can indicate that the first modified individual record is for querying, and not for redemption. The "query endorsement" 114a can indicate or can include a query that the receiver device 102b would like to know whether the processing platform 124 would perform as instructed by the content A 110a of the first modified individual record 100m1 if one or more conditions are satisfied. Non-limiting examples of the conditions include that a second modified individual record 100m2 based on the individual record 100 with a "for processing only endorsement" (FPOE) being electronically communicated to and redeemed by the record receiver 102b with the processing platform 124, the record sender 102a or the record receiver 102b having performed a task, or the occurrence of an event such as receiving authorization from another user or a non-user, or a specific time. In some embodiments, the processing platform 124 can provide the record receiver 102b with sourcing information and fee splitting information.

After signing the first modified individual record 100m1, the record receiver 102b can send the modified individual record 100m1 to the processing platform 124 at interaction 1108. After processing the query endorsement 114a in the first modified individual record 100m1 at interaction 1112, the processing platform 124 can provide the record receiver 102b with a query result at interaction 1116. For example, the query result can indicate that the processing platform 124 would or would not perform as instructed by the content A 110a of the first modified individual record 100m1 and the timing of performance. As another example, a query result can be that the processing platform 124 would perform as instructed by the content A 110a if one or more conditions have been satisfied. As yet another example, a query result can comprise source information or a cost.

Example Individual Record Redemption

With reference to FIG. 11, given the query result, the record receiver 102b can decide whether to accept the exchange involving the individual record 100 with the record sender 102a. If the record receiver 102b decides to accept the exchange and redeem the individual record 100 with the processing platform 124, the record receiver device 116b can, using its secure element 204b, create and sign the second modified individual record 100m2. Prior to signing the modified individual record 100m1 at interaction 428, the secure element (SE) 204b can require both the provision of a block to be digitally signed, for example a block 105c of the second modified individual record 100m2, and authentication information 512b of the record receiver. The modified individual record 100m1 can comprise the block 105a of the individual record 100 and an endorsement block 105c. The block 105c can comprise an endorsement and a record receiver signature 112b' of the block 105c. For example, the endorsement can be a "for processing only endorsement" (FPOE) 114b specifying that the modified individual record 100m1 can only be redeemed by the record receiver 102b. In some embodiments, the second modified individual record 100m2 can include the block 105b of the first modified individual record 100m1.

After signing the second modified individual record 100m2, the record receiver 102b can redeem the second modified individual record 100m2 with the processing platform 124 at interaction 432. On redemption, a service provider 104 operating the processing platform 124 can process at interaction 436 the second modified individual record 100m2 by verifying the authenticity of one or more signatures in the chain of blocks 105a and 105c in the modified individual record 100m1. The signatures authenticated can include the record sender signature 112a and the second record receiver signature 112b. After successful verification, the processing platform 124 can perform as instructed by the content A 110a of the second modified individual record 100m2.

The timing of the exchange involving the individual record 100 being considered complete can be different in different implementations. For example, the exchange involving the individual record 100 can be considered complete when the record receiver 102b accepts the exchange involving the individual record 100 with the record sender 102a after receiving the query result at interaction 1116. The query result can indicate that the processing platform 124 would perform as instructed by the content A 110a of the first modified individual record 100m1 and the timing of performance. As another example, the exchange involving the individual record 100 can be considered complete when the service provider 104 operating the processing platform 124 successfully processes at interaction 436 the second modified individual record 100m2. The processing platform 124 can verify the authenticity of one or more signatures in the chain of blocks 105a and 105c in the modified individual record 100m1. As yet another example, the exchange involving the individual record 100 can be considered complete when the central platform 124 performs as instructed by the content A 110a of the second modified individual record 100m2.

Example Distribution of Common Records

Example Frequency of Updates

The processing platform 124 can update the common records 206 from time to time or at a regular interval by sending updated common records 206 to one or more user devices. In some embodiments, the regular intervals can be time-based, for example every hour, every day, every week, or every month.

In some embodiments, the regular intervals can be based on the number or the percentage of users or user devices with changed status. Non-limiting examples of changed status include a device becoming a user device 116, a device 116 no longer being a user device, a user 102a or 102b or a user device 116 being added to or removed from a demerit list (demerits will be described below), the demerit status of a user 102a or 102b or a user device 116a or 116b on the demerit list changing such as an increase or a decrease in demerit points, or a user 102a or 102b or a user device 116 being added to or removed from a blacklist. For example, the number of users or user devices 116 with changed status can be 100. As another example, the percentage of users or user devices 116 with changes status can be 1% of all users or user devices 116.

In some embodiments, the regular intervals can be based on the number of error events detected by an error manager of the processing platform 124 or determined by error managers of user devices 116, for example 100 error events. An error event can be, for example, the processing platform receiving an individual record with a "malicious code" (MC) endorsement (further described below).

Example Common Records Received from Processing Platform

Figure 13:
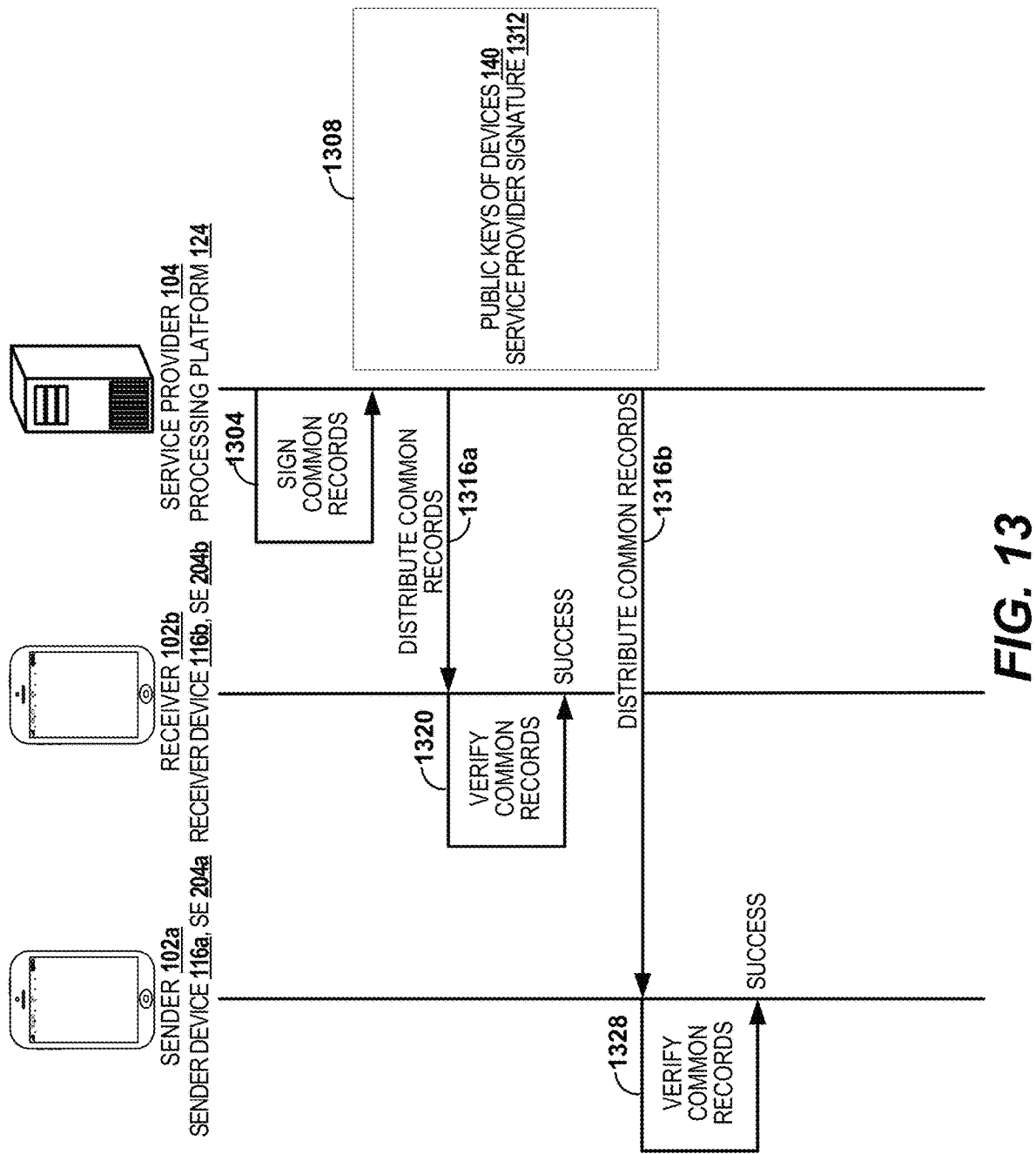
FIG. 13 is an interaction diagram illustrating one embodiment of distributing common records from a processing platform.
Figure 14:
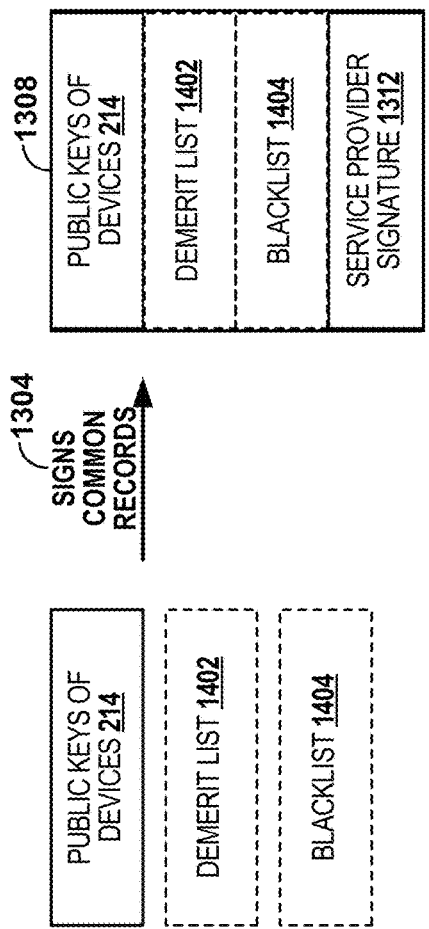
FIG. 14 schematically illustrates example common records for distribution.

FIG. 13 is an interaction diagram illustrating one embodiment of distributing common records 206 from a processing platform 124. At interaction 1304, the processing platform 124 using, for example, a common records generator can create a common records message 1308. FIG. 14 schematically illustrates example common records for distribution. As illustrated in FIGS. 13-14, the common records message 1308 can include updated common records 206 which can include updated public keys of devices 214. The common records message 1308 can include a demerit list 1402 and a blacklist 1404. The processing platform 124 can sign the common records message 1308 by adding a service provider signature 1312 to the common records message 1308. The service provider signature 1312 can be created by the common records generator 340 using the service provider private key 348 in the service provider's possession.

A common records distributor of the processing platform 124 can distribute the common records message 1308 to user devices. The processing platform 124 can distribute the common records message 1308 to user devices sequentially. For example, the processing platform 124 can distribute the common records message 1308 to a record receiver device 102b at interaction 1316a first and subsequently to a record sender device 102a at interaction 1316b. Such sequential distribution can advantageously avoid traffic congestion and bandwidth bottleneck. Common records receivers of the record sender device 102a and the record receiver device 102b can receive the common records message 1308 from the processing platform 124.

The processing platform 124 can distribute the common records message 1308 to one or more user devices 116 at the same time or close in time. For example, the common records distributor can distribute the common records message 1308 to 100 user devices 116 at the same time. As another example, the common records distributor 344 can distribute the common records message 1308 to 10% of user devices 116 at the same time. As yet another example, the common records distributor 344 can distribute the common records message 1308 to the user devices 116 in 100 batches.

At interaction 1320, the secure element (SE) 130b of the record receiver device 102b can verify the authenticity of the common records message 1308. Verifying the authenticity of the common records message 1308 can comprise verifying the service provider signature 1308. Verifying the service provider signature 1308 can comprise determining, using the service provider public key 212 stored in the secure element 204b, whether the service provider signature 1308 has been created using the service provider private key 348. Similarly at interaction 1328, the secure element 204a of the record sender device 102a can verify the authenticity of the common records message 1308.

Example Common Records Received from Record Receiver

User devices, for example a record receiver device, after receiving a common record message 1308 from the processing platform 124, can propagate the common records message 1308 to other user devices, including a record sender device. For example, user devices that have received the common records message 1308 can broadcast the received common records message 1308 to other user devices for a time period after receiving it or continuously until receiving a new common records message from the processing platform 124.

Figure 15:
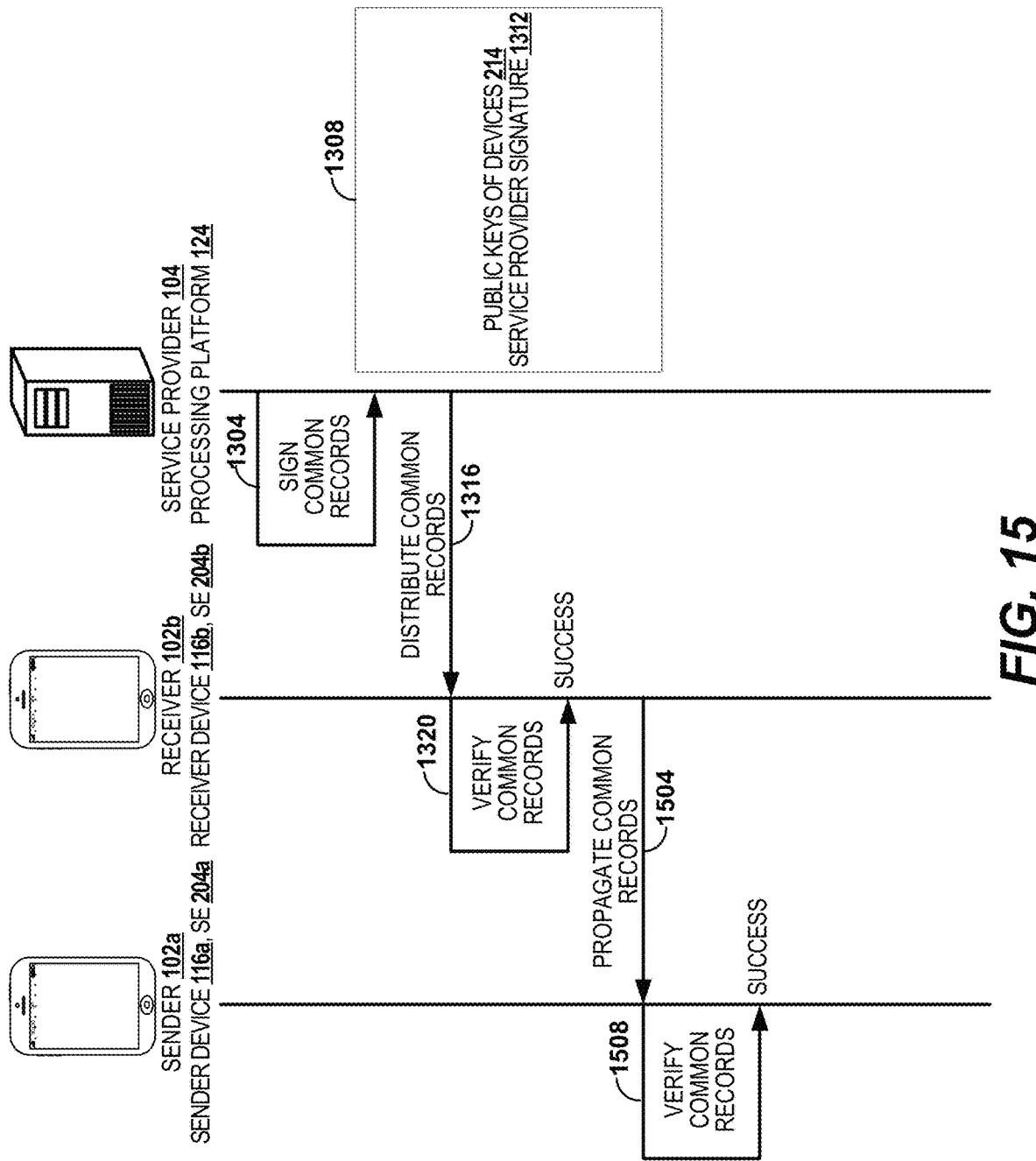
FIG. 15 is an interaction diagram illustrating an example of propagation of common records by a record receiver device.

FIG. 15 is an interaction diagram illustrating an example of propagation of common records by a record receiver device. After creating and signing the common record message 1308 at interaction 1304, the processing platform 124 can distribute the common records message 1308 to user devices, for example the record receiver device 102b at interaction 1316. At interaction 1320, the secure element (SE) 204b of the record receiver device 102b can verify the authenticity of the common records message 1308.

Prior to exchanging an individual record, for example the individual record 100 illustrated in FIGS. 4-12, the record sender device 102a may not have received the common records message 1308 from the processing platform 124 or any other user device 116. At interaction 1504, the record receiver device 102b can propagate the common records message 1308 by offering to send and sending the common records message 1308 to the record sender device 102a. The common records message 1308 the record sender device 102a received from the record receiver device 102b can include a signature of the record receiver device. At interaction 1508, the secure element (SE) 204a of the record sender device 102a can verify authenticity of the common records message 1308.

Example Common Records Received from Record Sender

Figure 16:
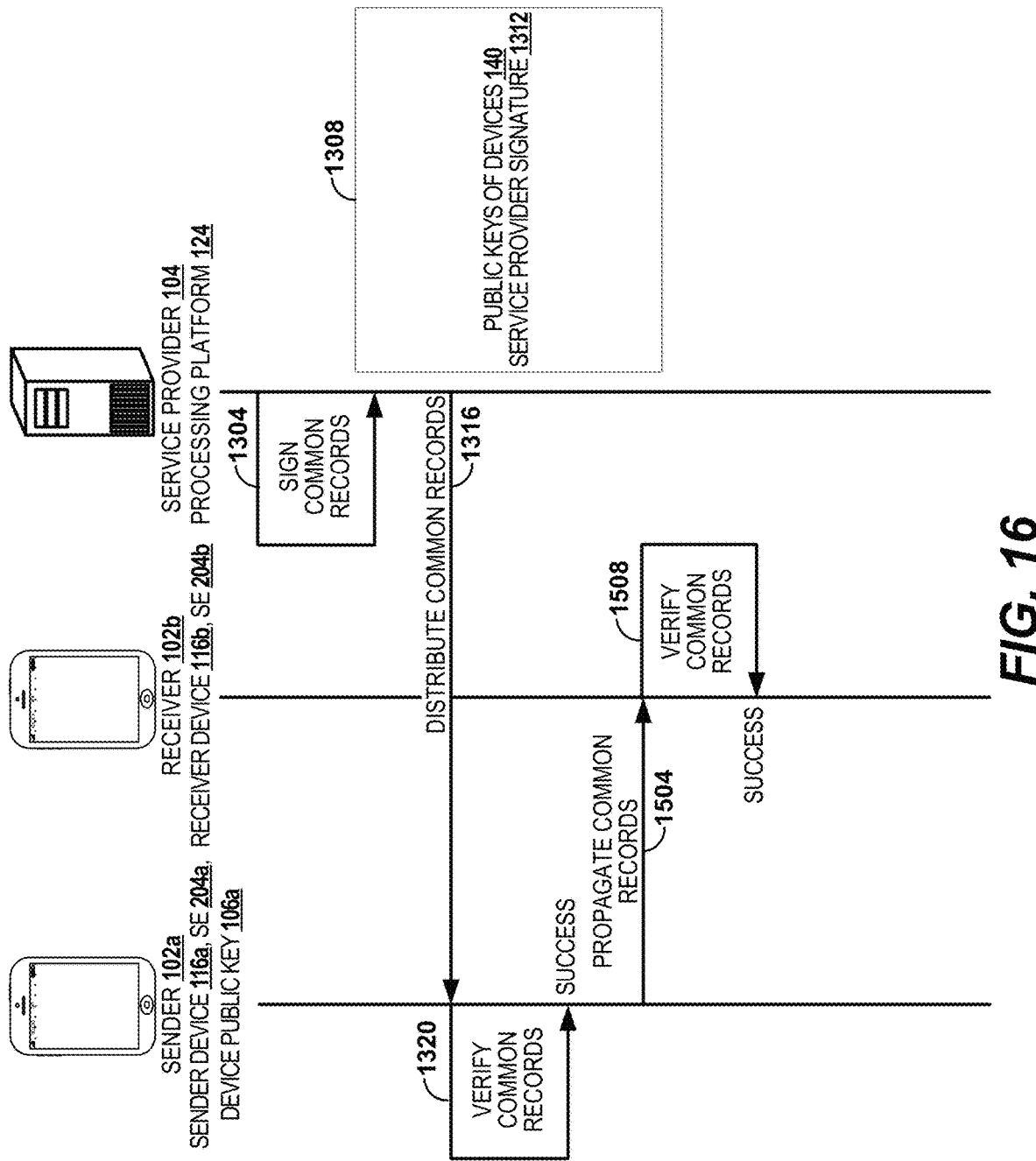
FIG. 16 is an interaction diagram illustrating an example of propagation of common records by a record sender device.

User devices, for example a record sender device, after receiving common records 206 from the processing platform 124, can propagate the common records 206 to other user devices, including a record receiver device. FIG. 16 is an interaction diagram illustrating an example of propagation of common records by a record sender device. After creating and signing the common record message 1308 at interaction 1304, the processing platform 124 can distribute the common records message 1308 to user devices, for example the record sender device 102b at interaction 1316. At interaction 1328, the secure element (SE) 204a of the record sender device 102a can verify the authenticity of the common records message 1308.

Prior to exchanging an individual record, for example the individual record 100 illustrated in FIGS. 4-12, the record receiver device 102b, may not have received the common records message 1308 from the processing platform 124 or any other user device 116. For example, the record sender device 116a can be a new user device, and the record receiver device 116b may not be in the possession of the public key 106a of the record sender device. Without receiving the common records message 1308 containing the public key 106 of the record sender device, the record receiver 102b may be unable to verify that the record sender device 116a is a valid user device.

At interaction 1504, the record sender device 102a can propagate the common records message 1308 by offering to send and sending the common records message 1308 to the record receiver device 102b. At interaction 1508, the secure element (SE) 204b of the record receiver device 102b can verify the authenticity of the common records message 1308. Such propagation advantageously allows the exchange of an individual record even though the record receiver device 102b may not be in the possession of the public key 102a of the record sender device prior to receiving the common records message 1308 from the record sender device 102a.

Example Error Management

Individual records that the processing platform 124 receives from user devices can contain intended or unintended errors. Users can behave maliciously by creating invalid individual records, for example individual records with invalid signatures. Unscrupulous users can cause other users to appear as malicious users by, for example causing them to create invalid individual records.

Example Sender Cloning with Multiple Receivers

Figure 17:
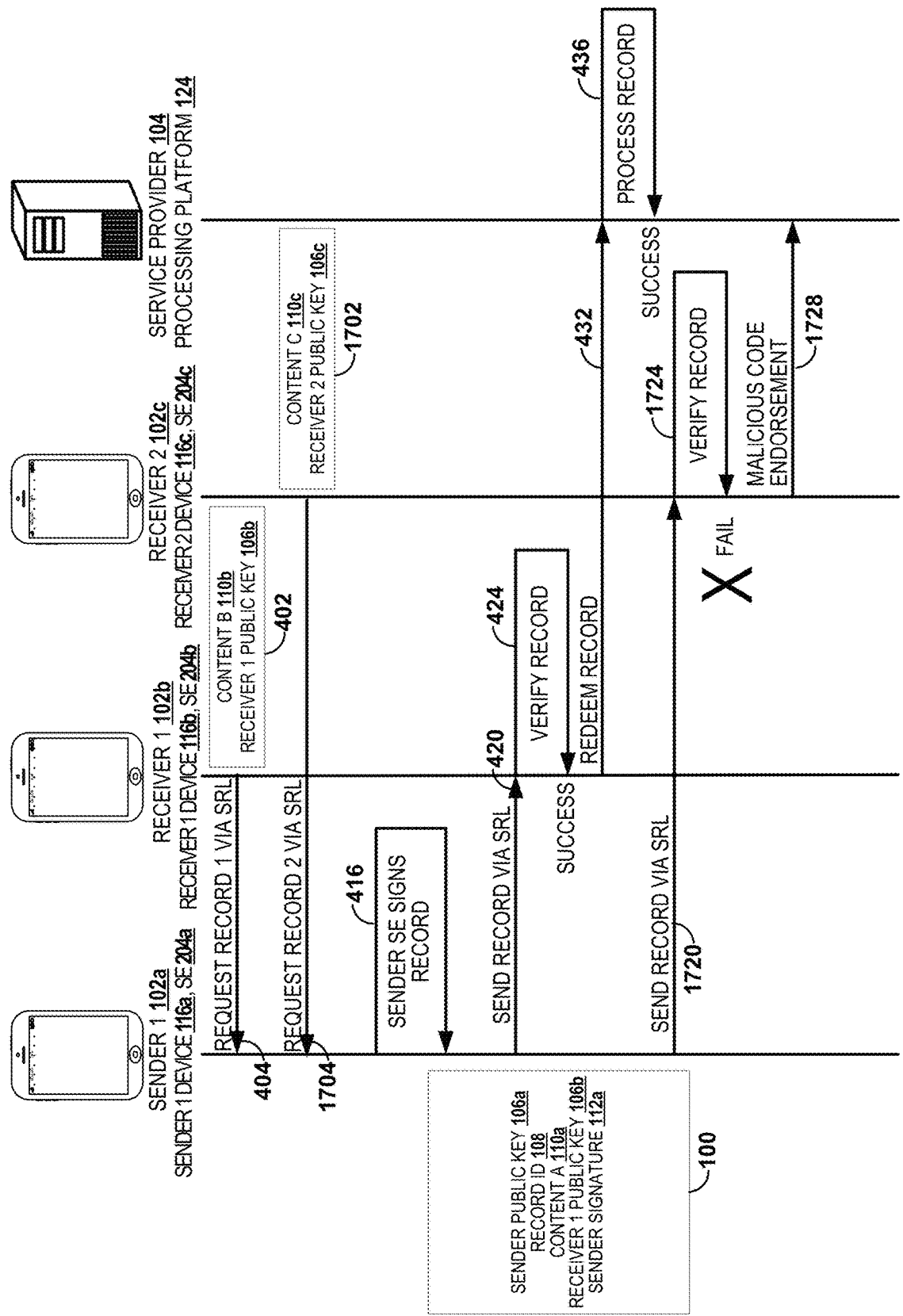
FIG. 17 is an interaction diagram illustrating an example of malicious behavior by sender cloning with multiple receivers.

In some embodiments, a malicious record sender can send an individual record to two different record receivers. FIG. 17 is an interaction diagram illustrating this malicious behavior, which can be referred to as sender cloning with multiple receivers. A first record receiver 102b, using a first record receiver device 116b, can request an individual record from a record sender 102a by sending a first content request 402 to a first record sender device 116a using a short range link (SRL) 122 at interaction 404. The first content request 402 can comprise a content B 110b and a first public key 106b of the first record receiver device. A second record receiver 102c, using a second record receiver device 116c, can request an individual record from the record sender 102a by sending a second content request 1702 to the record sender device 116a using a short range link 122 at interaction 1704. The second content request 402 can comprise a content C 110c and a second public key 106c of the second record receiver device. The record sender 102a can receive the first content request 402 prior to, subsequent to, or at the same time as, receiving the second content request 1702.

The secure element (SE) 204a of the record sender device 116a can create and sign an individual record 100 at interaction 416 prior to sending a first copy of the individual record 100 to the first record receiver device 116b at interaction 420. After successful verification of the individual record 100 at interaction 424, the first record receiver device 116b can redeem the individual record 100 with a processing platform 124 at interaction 432. On redemption, a service provider 104 operating the processing platform 124 can process at interaction 436 the individual record 100 by verifying the authenticity of one or more signatures in the redeemed individual record 100. After successful verification, the processing platform 124 can perform as instructed by the content A 110a of the individual record 100.

After creating and signing the individual record 100 at interaction 416, the record sender device 116a can also send a second copy of the individual record 100 to the second record receiver device 116b at interaction 1720. The record sender 102a can send a copy of the individual record 100 to the first record receiver 102b prior to, subsequent to, or at the same time as sending another copy of the individual record 100 to the second record receiver 102c.

The content B 100b and the content C 100c can be the same or similar such that the content A 100a can appear to the first record receiver 102b and the second record receiver 102c as satisfying the first content request 402 and the second content request 1702 respectively. However, verification of the individual record 100 by the second record receiver 116c at interaction 1724 can fail because the individual record 100 can include the public key 106b of the first record receiver device, and not the public key 106c of the second record receiver device. This can indicate that the individual record 100 is intended for the first record receiver 102b, and not the second record receiver 102c. Because of unsuccessful verification, the second record receiver 106c can decline the exchange involving the second content request 1702 with the record sender 102a. In some embodiments, after unsuccessful verification, the second record sender device 116c can add a "malicious record endorsement" (MRE) to the individual record 100 prior to sending it to the processing platform 124 at interaction 1728.

Example Sender Cloning with a Single Receiver

Figure 18:
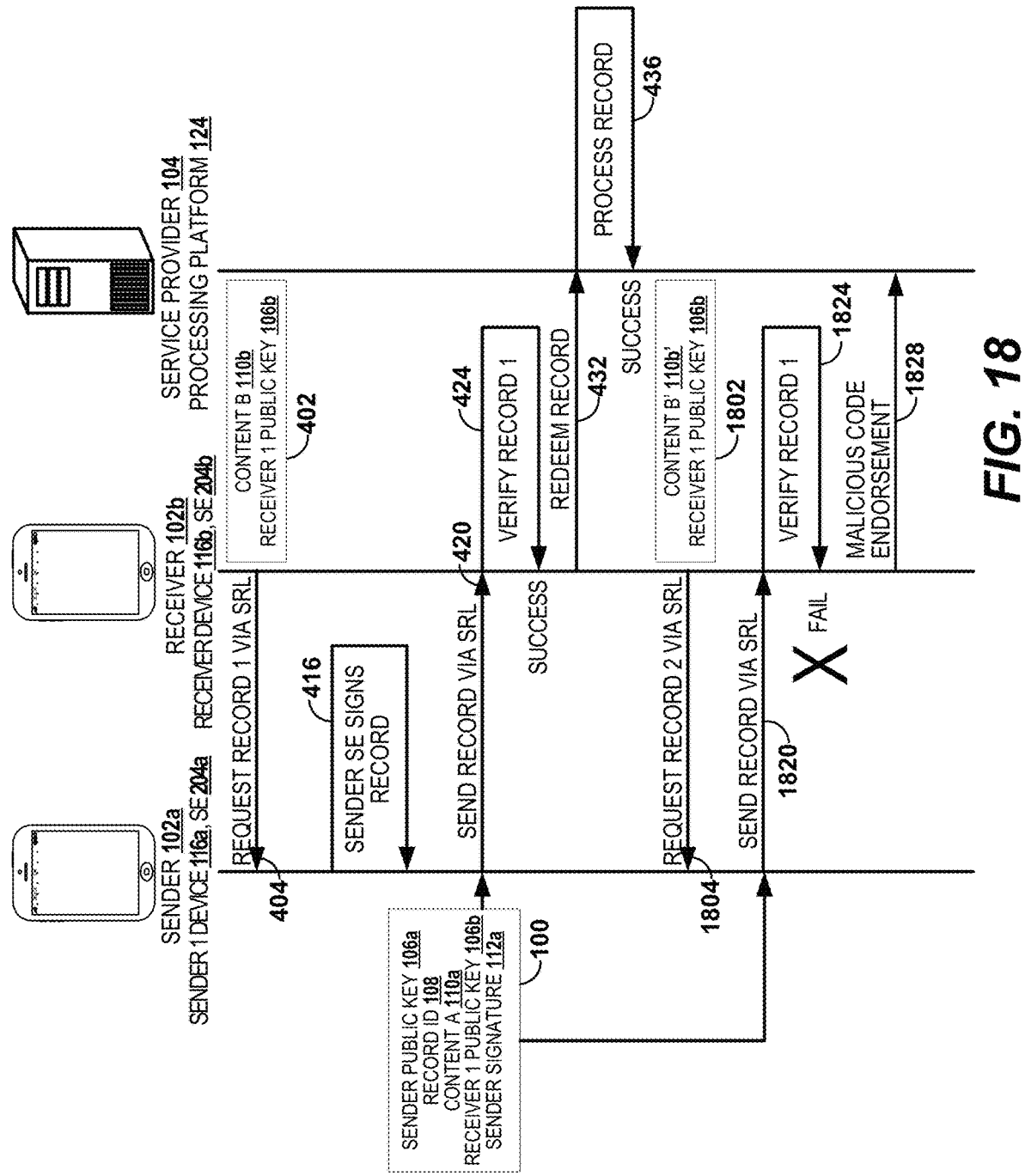
FIG. 18 is an interaction diagram illustrating an example of malicious behavior by sender cloning with a single receiver.

In some embodiments, a malicious record sender can send two copies of the same individual record to one record receiver. FIG. 18 is an interaction diagram illustrating this malicious behavior, which can be referred to as sender cloning with a single receiver. A record receiver 102b, using a record receiver device 116b, can request an individual record from a record sender 102a by sending a first content request 402 to a record sender device 116a using a short range link (SRL) 122 at interaction 404. The first content request 402 can comprise a content B 110b and a public key 106b of the record receiver device. Similarly, the record receiver 102b can request another individual record from the record sender 102a by sending a second content request 1802 to the record sender device 116a using a short range link 122 at interaction 1804. The second content request 1802 can comprise a content B' 110b' and the public key 106b of the record receiver device. The record receiver 102b can send the first content request 402 and the second content request 1802 at the same time or at different times.

The secure element (SE) 204a of the record sender device 116a can create and sign an individual record 100 at interaction 416 prior to sending a first copy of the individual record 100 to the record receiver device 116b at interaction 420. The record ID of the individual record 100 can be, for example, N. After successful verification of the individual record 100 at interaction 424, the record receiver device 116b can redeem the individual record 100 with a processing platform 124 at interaction 432. On redemption, a service provider 104 operating the processing platform 124 can process at interaction 436 the individual record 100 by verifying the authenticity of one or more signatures in the redeemed individual record 100. After successful verification, the processing platform 124 can perform as instructed by the content A 110a of the individual record 100.

At interaction 1820, the record sender device 116a can send a second copy of the individual record 100 to the record receiver device 116b. The content B 100b and the content B' 100b' can be the same or similar such that the content A 100a can appear to the record receiver 102b as satisfying the first content request 402 and the second content request 1802.

However, verification of the second copy of the individual record 100 by the record receiver 116b at interaction 1820 can fail. For each user device the record receiver device 116b has received one or more individual records from, a record history tracker of the record receiver device 116b can keep track of the record ID of the last individual record received from the user device. For example, the record history tracker can keep track of the record ID 108 N of the last individual record 100 it has received from the record sender device 116a. Thus, the record sender device 116a should not have sent the record receiver device 116b the second copy of the individual record 100 containing the same record ID 108 N.

In some embodiments, for each user device the record receiver device 116b has received one or more individual records from, the record history tracker can keep track of the individual record 100 with the largest record ID 108 received. Advantageously, for each user device the record receiver device 116b has received one or more individual records from, the record receiver device 116b can keep track of only the record ID 108 of the last individual record 100 received from the user device because record IDs 108 of individual records created by one record sender can be monotonically increasing. In some embodiments, the record history tracker can keep track of record IDs 108 of all individual records received.

Because of unsuccessful verification, the record receiver 106b can decline the exchange involving the second content request 1802 with the record sender 102a. In some embodiments, after unsuccessful verification, the record sender device 116b can add a "malicious record endorsement" to the second copy of the individual record 100 prior to sending it to the processing platform 124 at interaction 1828.

Example Forking

Figure 19:
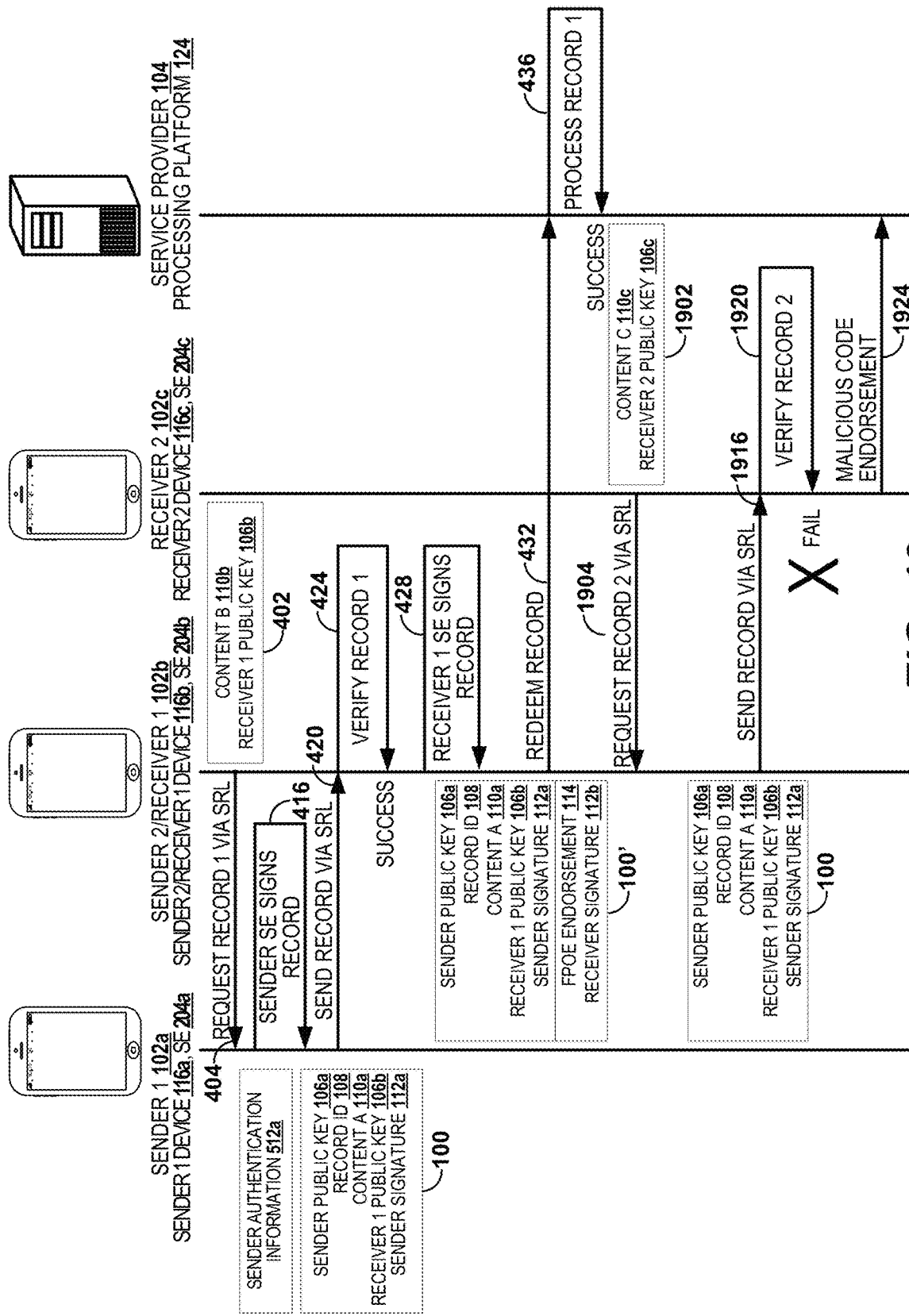
FIG. 19 is an interaction diagram illustrating an example of malicious behavior by forking.

In some embodiments, a malicious record receiver can copy an individual record before endorsing it and attempt to send a saved copy of the individual record to a second record receiver. FIG. 19 is an interaction diagram illustrating this malicious behavior, which can be referred to as forking. A first record receiver 102b, using a first record receiver device 116b, can request an individual record from a first record sender 102a by sending a first content request 402 to a first record sender device 116a using a short range link (SRL) 122 at interaction 404. The first content request 402 can comprise a content B 110b and a public key 106b of the first record receiver device.

The secure element (SE) 204a of the first record sender device 116a can create and sign an individual record 100 at interaction 416 prior to sending the individual record 100 to the first record receiver device 116b at interaction 420. After successful verification of the individual record 100 at interaction 424, the first record receiver device 116b can create a modified individual record 100m1 with a first record receiver signature 112b at interaction 428. On redemption of the modified individual record 100m1 with a processing platform 124 at interaction 432, a service provider 104 operating the processing platform 124 can process at interaction 436 the modified individual record 100m1 by verifying the authenticity of one or more signatures in the modified individual record 100m1. After successful verification, the processing platform 124 can perform as instructed by the content A 110a of the modified individual record 100m1.

A second record receiver 102c, using a second record receiver device 116c, can request an individual record from the first record receiver 102b by sending a second content request 1902 to the first record receiver device 116b. The first record receiver 102b can be a second record sender 102b, and the first record sender device 116b can be referred to as a second record sender device 116b. The second content request 1902 can comprise a content C 110c and a public key 106c of the second record receiver device.

The second record sender device 116b can send a copy of the individual record 100 to the second record receiver device 116c at interaction 1916. However, verification of the individual record 100 by the second record receiver 116c at interaction 1920 can fail because the individual record 100 can include the public key 106b of the second record sender device, and not the public key 106c of the second record receiver device. This can mean that the individual record 100 is intended for the first record receiver 102b, and not the second record receiver 102c. Because of unsuccessful verification, the second record receiver 106c can decline the exchange involving the second content request 1902 with the second record sender 102b. In some embodiments, after unsuccessful verification, the second record sender device 116c can add a "malicious record endorsement" to the individual record 100 prior to sending it to the processing platform 124 at interaction 1924.

Example Receiver Cloning

Figure 20:
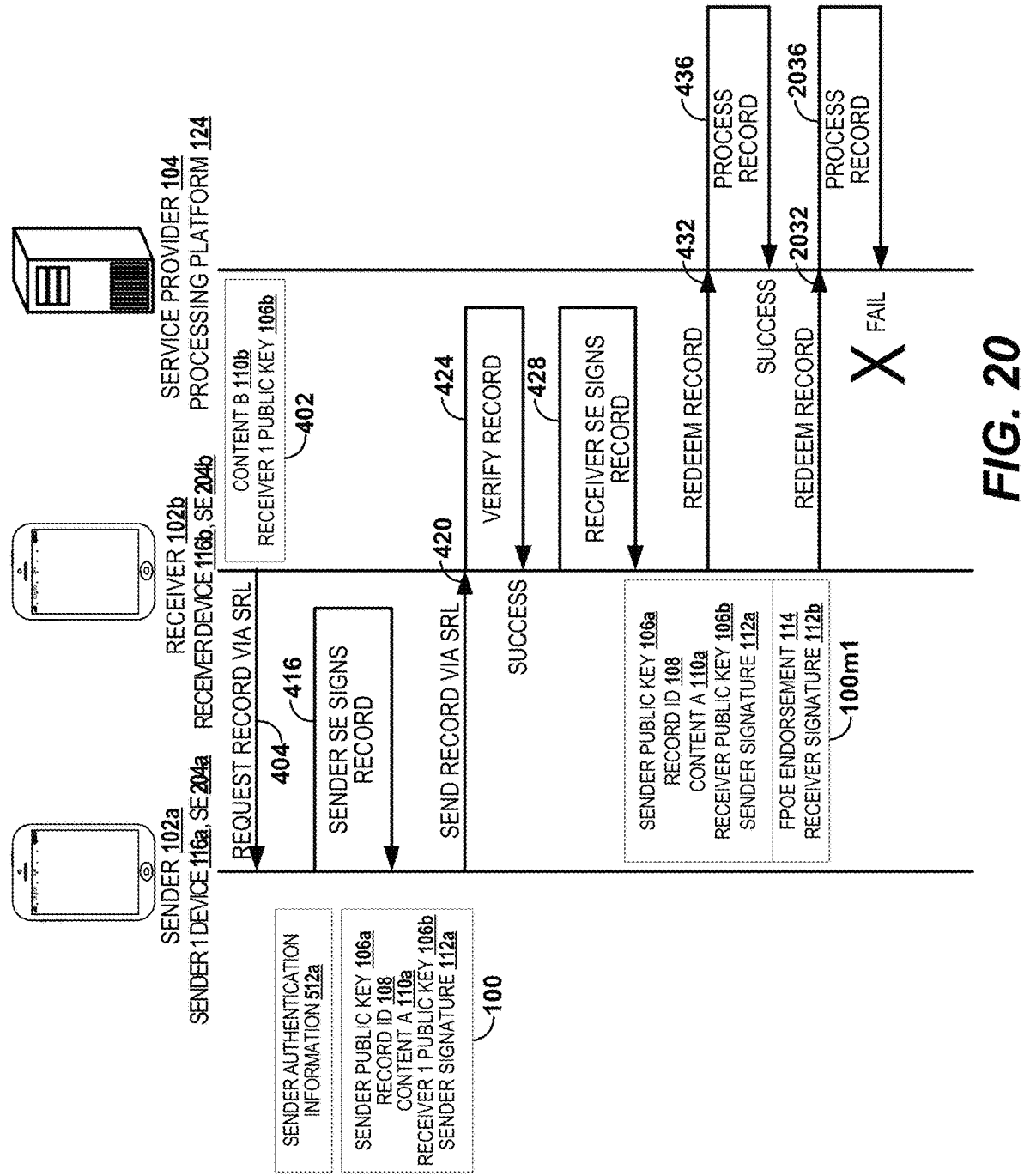
FIG. 20 is an interaction diagram illustrating an example of malicious behavior by receiver cloning.

In some embodiments, a malicious record receiver can attempt to redeem an individual record twice. In some embodiments, a malicious record receiver can redeem an individual record twice in an attempt to accuse a record sender of record sender cloning with a single receiver. FIG. 20 is an interaction diagram illustrating this malicious behavior, which can be referred to as receiver cloning. A record receiver 102b, using a record receiver device 116b, can request an individual record from a record sender 102a by sending a content request 402 to a record sender device 116a using a short range link (SRL) 122 at interaction 404. The content request 402 can comprise a content B 110b and a public key 106b of the record receiver device.

The secure element (SE) 204a of the record sender device 116a can create and sign an individual record 100 with a record ID 108 N at interaction 416 prior to sending the individual record 100 to the record receiver device 116b at interaction 420. After successful verification of the individual record 100 at 424, the record receiver device 116b can create a modified individual record 100m1 with a record receiver signature 112b at interaction 428 prior to redeeming a first copy of the modified individual record 100m1 with a processing platform 124 at interaction 432. On redemption, a service provider 104 operating the processing platform 124 can process at interaction 436 the modified individual record 100m1 by verifying the authenticity of one or more signatures in the modified individual record 100m1. After successful verification, the processing platform 124 can perform as instructed by the content A 110a of the individual record 100.

The record sender device 116b can attempt to redeem a second copy of the modified individual record 100m1 with the processing platform 124 at interaction 2032. However, processing of the second copy of the modified individual record 100m1 can fail at interaction 2036. The processing platform 124 has previously successfully processed the first copy of modified individual record 100m1 at interaction 436. For each record sender device, the user record status 306 of the central records 302 can contain the record IDs of the individual records that the processing platform 302 has processed. For example, for the record sender device 116a, the user record status 306 of the central records 302 can contain the record ID 108 N of the modified individual record 100m1. When the record sender device 116b attempts to redeem the second copy of the modified individual record 100m1 with the same record ID 108 N, the processing platform 124 can detect this malicious redemption by comparing the record ID 108 N of the modified individual record 100m1 and the user record status 306.

Example Mousing

Figure 21:
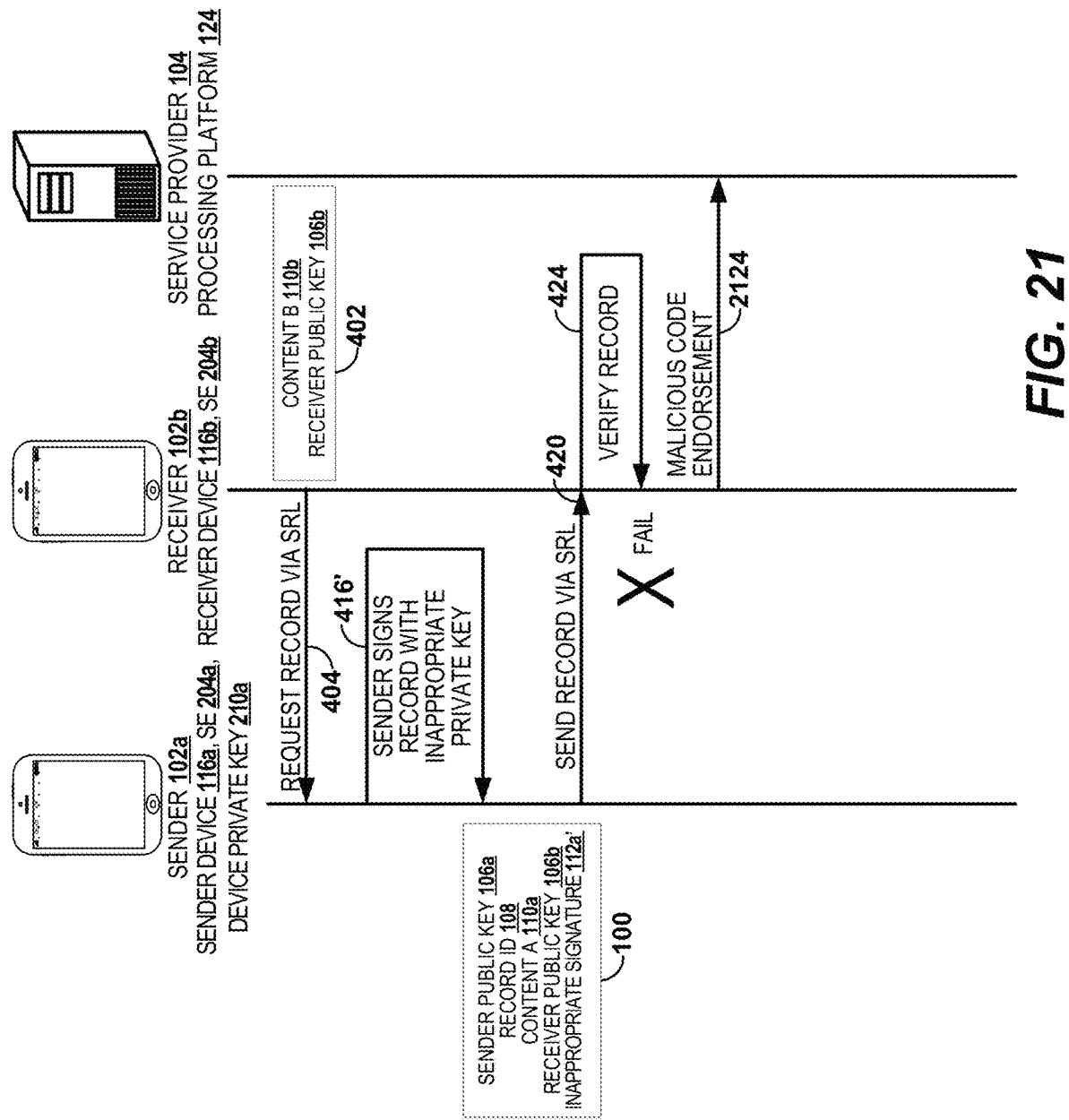
FIG. 21 is an interaction diagram illustrating an example of malicious behavior by mousing.

In some embodiments, a malicious record sender can create individual records with inappropriate signatures by bypassing the secure element (SE) of his record sender device. FIG. 21 is an interaction diagram illustrating this malicious behavior, which can be referred to as mousing. A record receiver 102b, using a record receiver device 116b, can request an individual record from a record sender 102a by sending a content request 402 to a record sender device 116a using a short range link (SRL) 122 at interaction 404. The content request 402 can comprise a content B 110b and a public key 106b of the record receiver device.

By hacking or bypassing its secure element (SE) 204a, the record sender device 116a can create an individual record 100 with an inappropriate signature 112a' at interaction 416 prior to sending the individual record 100 to the record receiver device 116b at interaction 420. The inappropriate signature 112' can be a random signature or can be created using a private key not associated with the record sender device 106b.

Verification of the individual record 100 by the record receiver 116b at interaction 424 can fail. The record receiver device 116b cannot determine that the inappropriate signature 112' has been created using the private key 210a of the record sender device. The record receiver device 116b cannot decrypt the inappropriate signature 112' using the public key 106a of the record sender device. Because of unsuccessful verification, the record receiver 106b can decline the exchange involving the content request 402 with the record sender 102a. In some embodiments, after unsuccessful verification, the record sender device 116b can add a "malicious record endorsement" to the individual record 100 prior to sending it to the processing platform 124 at interaction 2124.

Example Ghosting

Figure 22:
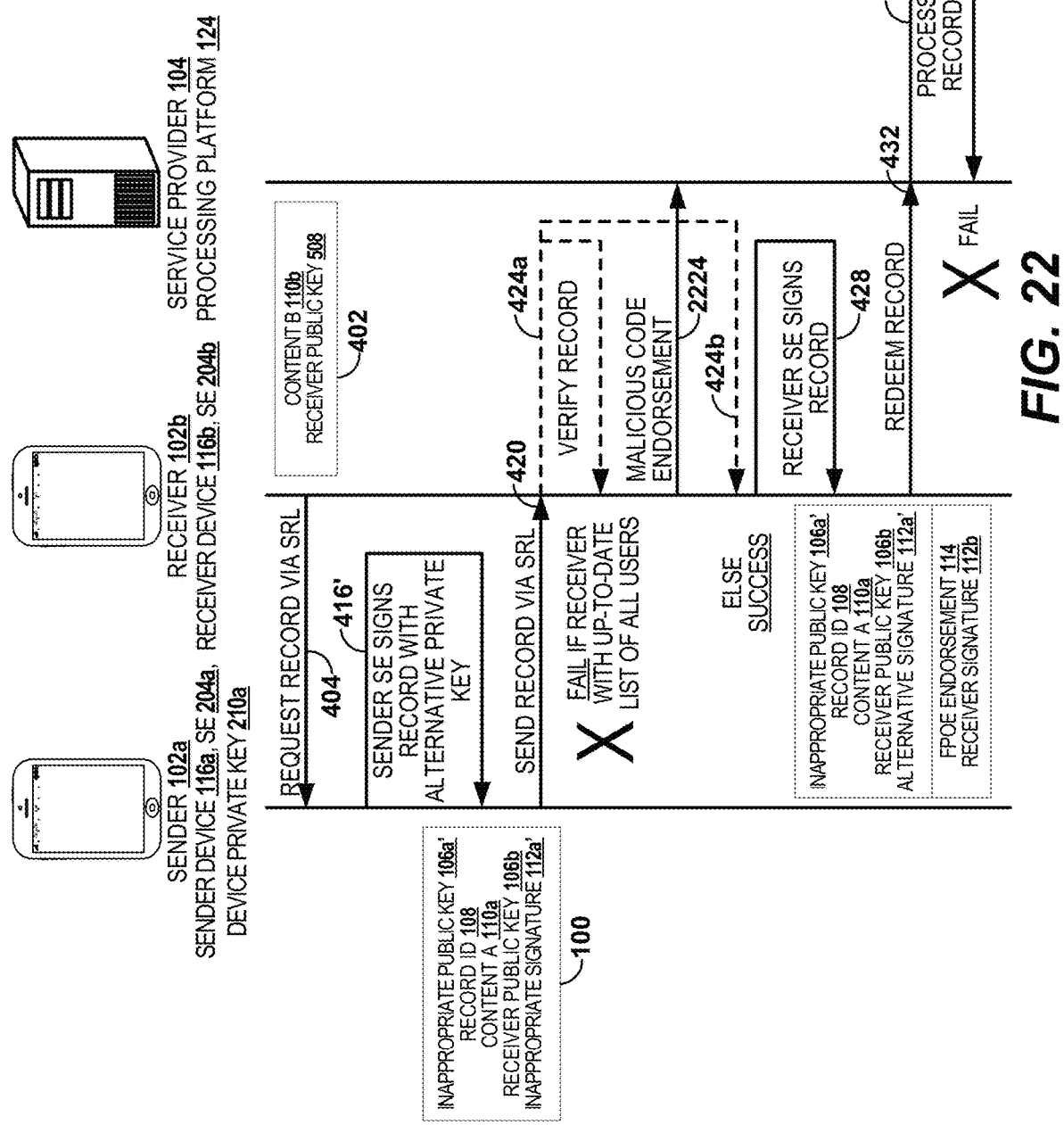
FIG. 22 is an interaction diagram illustrating an example of malicious behavior by ghosting.

In some embodiments, a malicious record sender can create individual records with inappropriate signatures. FIG. 22 is an interaction diagram illustrating this malicious behavior, which can be referred to as ghosting. A record receiver 102b, using a record receiver device 116b, can request an individual record from a record sender 102a by sending a content request 402 to a record sender device 116a using a short range link (SRL) 122 at interaction 404. The content request 402 can comprise a content B 110b and a public key 106b of the record receiver device.

By hacking or bypassing its secure element (SE) 204a, the record sender device 116a can create an individual record 100 with an inappropriate public key 106a' and an inappropriate signature 112' at interaction 416' prior to sending the individual record 100 to the record receiver device 116b at interaction 420. The inappropriate public key 106' and the public key 106a of the record sender device can different. The inappropriate signature 112' can be created using the inappropriate private key 210'.

Verification of the individual record 100 by the record receiver 116b at 424a can fail if the record receiver device has up-to-date public keys of devices 214b. Even though the record receiver device 116b can decrypt the inappropriate signature 112', the record receiver device 116b can be aware that the inappropriate public key 106' may not belong to a user device. The inappropriate public key 106' may not be in the public keys of devices 214b of the common records 206. Because of unsuccessful verification, the record receiver 106b can decline the exchange involving the content request 402 with the record sender 102a. In some embodiments, after unsuccessful verification, the record sender device 116b can add a "malicious record endorsement" (MRE) to the individual record 100 prior to sending it to the processing platform 124 at interaction 2224.

In some embodiments, verification of the individual record 100 by the record receiver 116b at interaction 424b can be successful because the record receiver device may not have up-to-date public keys 214b of devices. Because the inappropriate signature 112' has been created using the inappropriate private key 210', the record receiver device 116b can successfully decrypt the inappropriate signature 112' using the inappropriate public key 106' in the individual record 100a. After successful verification of the individual record 100 at interaction 424b, the first record receiver device 116b can create a modified individual record 100m1 with a record receiver signature 112b at interaction 428 prior to redeeming the modified individual record 100m1 with the processing platform 124 at interaction 432. However, processing of the modified individual record 100m1 can fail at interaction 436 because the inappropriate public key 106a' is not in the public keys of devices 214 of the central records 302. In some embodiments, even if verification of the individual record 100 by the record receiver 116b at interaction 424b can be successful, the record receiver 102b can decline the exchange involving the content request 402 with the record sender 102a because the inappropriate public key 106a is not in the public keys of devices 214 of the common records 206. In some embodiments, a proprietary variant of the encryption algorithm can be employed, thus making ghosting impossible.

Example Demerit and Blacklist

Certain actions by the users are undesirable in the methods and systems disclosed herein. In some embodiments, undesirable actions may not require altering or hacking user devices. For example, an undesirable action can be a result of a record sender 116a creating an individual record 100 with a content 110 that is inappropriate. For example, the user record status 306 can indicate that only a record sender 102a himself has access to the document with its document ID stored in the content 110; and the record sender 102a cannot grant other users access to the document. If the content 110 of an individual record 100 attempts to grant a record receiver 102b access to the document, the content 110 can be inappropriate. The record sender 102a, by creating the individual record 100 with the inappropriate content 110, can act undesirably.

The processing platform 124 can include a demerit list that is configured to keep track of the number of undesirable actions by users. The demerit list can keep track of and can be based on the number of undesirable actions processed or the number of individual records 100 with inappropriate contents 110 processed, the types of undesirable actions or inappropriate contents 110, when and how recent the undesirable actions have occurred, when and how recent the individual records 100 with inappropriate contents 110 have been processed, or any combination thereof. In some embodiments, the demerit list can determine demerit points for users and user devices 116. The demerit points can be based on the information the demerit list can keep track of. The demerit points can be normalized with respect to all users or some users, for example new users.

In some embodiments, undesirable actions may require altering or hacking user devices. Non-limiting examples of undesirable actions that require altering user devices can include sender cloning with multiple receivers, sender cloning with a single receiver, forking, receiver cloning, mousing, ghosting, or any combination thereof. Undesirable actions can be detected with a number of detection schemes and methods. These undesirable actions can be detected as illustrated in FIGS. 17-22. As another example, the processing platform 124 can detect device alterations based on checksums and signed certifications for software and hardware on user devices 116.

The processing platform 124 can include a blacklist that can keep track of the user devices that have been altered by detecting their participations in undesirable actions that require device alterations. In some embodiments, if a user device of a user is on the blacklist, all user devices of the user can be on the blacklist 1404. If a user device is on the blacklist, it can be banned temporarily or permanently from the methods and systems disclosed herein. In some embodiments, users and user devices 116 with a certain number of demerit points can be placed on the blacklist.

Example Malicious Record Endorsement

For some undesirable actions, record receiver devices 116b can detect the alterations or hacking of the record sender devices 116a themselves. For example, with sender cloning with multiple receivers illustrated in FIG. 17, the second record receiver device 116c can detect by itself the individual record 100 is intended for the first record receiver device 116b. In some embodiments, upon unsuccessful verification, the second record sender device 116c can add a "malicious record endorsement" (MRE) to the individual record 100 prior to sending it to the processing platform 124 at interaction 1724. The second record sender device 116c can send the individual record 100 with a "malicious record endorsement" together with a record receiver signature 112c, which can be referred to as a signed "malicious record endorsement" to the processing platform 124. The record sender device 116c can send the individual record 100 with a "malicious record endorsement" when it is connected to the network 118.

Example Fuzzy Ruling

When the processing platform 124 receives an individual record 100 with a signed "malicious record endorsement," the processing platform 124 can determine that a malicious user is present. However, the processing platform 124 may be unable to distinguish certain undesirable actions such as sender cloning with a single receiver and receiver cloning. And the processing platform 124 may be unable to assign guilt or fault to a particular user or a user device 116.

For certain undesirable actions, the processing platform 124 may be able to assign guilt or fault to a particular user. For example, if two identical copies of an individual record 100, involving a record sender 102a and a first record receiver 102b, are redeemed at the processing platform 124, then either the record sender 102a or the first record receiver 102b is a malicious user. Based on either the record sender 102a or the first record receiver 102b being a malicious user, the processing platform 124 can generate a number of rules. A non-limiting example rule is:

$$M(\text{Sender}) + M(\text{First Receiver}) = \text{True}, \quad (\text{Rule 1})$$

where M( ) denotes a Boolean operator that determines if the argument is malicious, and "+" denotes the logical OR operation.

This information can be stored for future use. For example, if two identical copies of another individual record, involving the record sender 102a and a second record receiver 102b', are redeemed at the processing platform 124, the processing platform 124 can generate a number of rules. A non-limiting example rule is:

$$(M(\text{Sender}) + M(\text{First Receiver})) * (M(\text{Sender}) + M(\text{Second Receiver})) = \text{True}, \quad (\text{Rule 2})$$

where "*" denotes the logical AND operation.
Rule 2 can be rewritten as:

$$M(\text{Sender}) + (M(\text{First Receiver})) * M(\text{Second Receiver})) = \text{True}. \quad (\text{Rule 3})$$

In interpreting the rules, the processing platform 124 can, for example assume that no two users are malicious. If no two users are malicious, the processing platform 124 can conclude from Rule 3 that the record sender 102a is malicious. As another example, the processing platform 124 can assert a prior belief that malicious users may be rare, occurring with probability "p" greater than 0 and smaller than 1. Then the probability that both the first record receiver 102b and the second record receiver 102b' both being malicious can be p*p in Rule 3. The left hand side of Rule 3 can be expressed as p+p*p.

Similarly, such interpretations and assumptions can be extended to include all observations of all users by the processing platform 124 and can be expressed in a sum of products form. Thus, the term with the least elements in the product can be the most likely to be true. For example, in Rule 3 the term M (Sender) can have the least element and can be the most likely to be true. These users and user devices can be labeled as malicious and blacklisted, immediately, provisionally, or can be further investigated.

Example User Device

Figure 23:
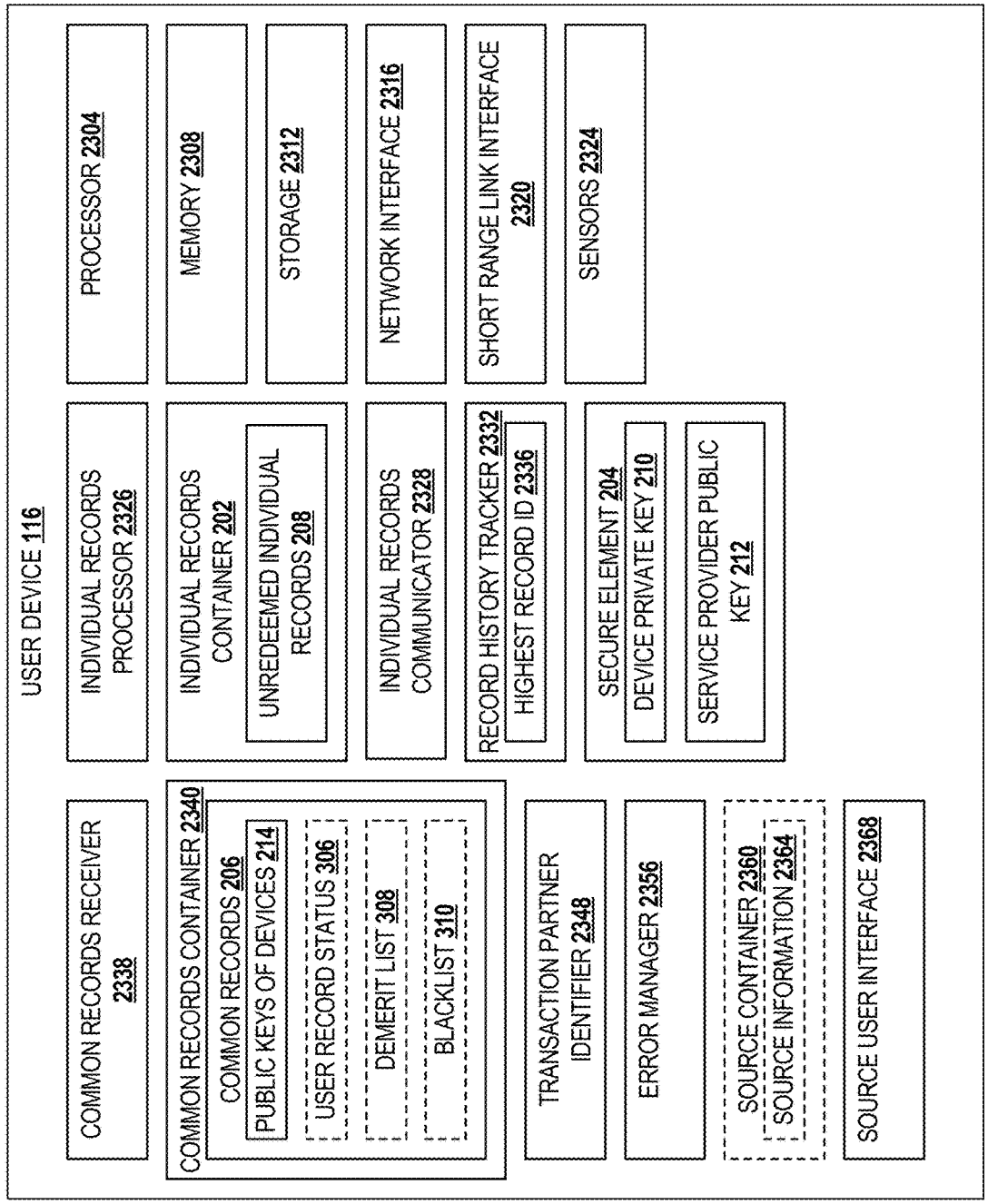
FIG. 23 is a block diagram of an example user device.

Example Processor, Memory, Storage, Network Interface, and Short Range Link Interface FIG. 23 schematically illustrates an example user device 116. User devices 116 can be record sender devices, record receiver devices, and agent devices. The user device 116 can include a processor 2304 configured for executing instructions stored in a memory 2308, for example a random access memory (RAM). The memory 2308 can be configured for storing instructions and data when the user device 116 is powered on. The memory 2308 can include both read only and writable memory. The user device 116 can include a storage 2312 configured for storing instructions and data when the user device 116 is powered on or powered off. One or both of the memory 2308 and the storage 2312 can store instructions for securely exchanging contents and records.

The user device 116 can include a network interface 2316 and a short range link (SRL) interface 2320. The network interface 2316 can be configured for communicating with other devices on the network 118, for example the processing platform 124, synchronously or asynchronously. Non-limiting examples of the network interface 2316 include wired communication, wireless communication, cellular communication, and communications using Bluetooth®, radio frequency (RF), or infrared (IR). The short range link (SRL) interface 2320 can be configured for communicating with other user devices 116 through the short range link (SRL) 122. The short range link interface 2320 can be a peer-to-peer radio or other interfaces through which the user devices 116a or 116b can communicate with one another. The short range link interface 2320 can be based on the Infrared Data Association (IrDA)/Infrared Physical Layer Specification (IrPHY), Bluetooth®, Near Field Communication (NFC), ad hoc Institute of Electrical and Electronics Engineers (IEEE) 802.11, or any other wireless communication methods and systems.

Example Sensors

The user device 116 can include one or more sensors 2324 for sensing the user device's surrounding. In some embodiments, the sensors 2324 can include motion sensors, orientation sensors, location sensors, or any combination thereof. A motion sensor can be configured to sense, detect, and determine the movements of the user operating the user device 116, for example the user shaking the user device 116. In some embodiments, a motion sensor can convert the user's motions into electrical signals for processing by the user device 116. For example, a motion sensor can comprise a single axis accelerometer configured for sensing, detecting, and determining the movements imparted on the user device 116 by the user. As another example, a motion sensor can comprise multiple accelerometers, for example single axis accelerometers and 3D accelerometers, to enable detection of directional movements and vibrations in a multiplicity of directions and to increase detection sensitivity.

An orientation sensor can be configured to determine the orientation of the user device 116. For example, an orientation sensor of the sender device 116a can determine the record sender's head relative to a fixed plane, for example the floor of the place of business where the record sender 102a and the record receiver 102b are securely exchanging an individual record 100. In some embodiments, an orientation sensor can convert orientation information into electrical signals for processing by the user device 116. A location sensor can be configured to determine the location of the user based on the location of the user device 116. Non-limiting examples of location sensors include global positioning system (GPS) or assisted GPS (aGPS) transceivers.

The sensors 2324 can include imaging sensors (e.g., digital cameras), microphones, or biometric sensors. An imaging sensor can be configured to capture what the user sees. For example, an imaging sensor of the record sender device 116a can capture one or more images of what the record sender 102a sees. As another example, when the record sender 102a and the record receiver 102b are securely exchanging an individual record 100, an imaging sensor of the record sender device 116a can capture an image of the record receiver device 116b in order to authenticate the record sender device 116a. In some embodiments, an imaging sensor can convert photons into electrical signals and images for processing by the user device 116.

A microphone can be configured to detect sound waves from the environment surrounding the user and from the user. The user device 116 can detect and "hear" what the user hears and says. In some embodiments, a microphone can convert sound waves into electrical signals for processing by the user device 116. A biometric sensor can be configured to capture the user's biometric information. Non-limiting examples of biometric information include iris scan, skin tone, skin texture, or fingerprints.

Example Individual Records Processor, Container, Communicator, and Tracker

The user device 116 can include an individual records processor 2326, an individual records container 202, an individual records communicator 2328, and a record history tracker 2332. The individual records processor 2326 can be configured for creating and modifying individual records. The individual records container 202 can be configured for storing unredeemed individual records 208. The individual records communicator 2328 can be configured for sending, receiving, or redeeming individual records and modified individual records. The record history tracker 2332 can be configured for tracking individual records that the user device 116 has created, received, modified, or redeemed.

For example, the individual records processor 2326 of the record sender device 116a can create the individual record 100. The individual record communicator 2328 of the record sender device 116a can send the individual record 100 to the record receiver device 116b. The record receiver device 116b can receive the individual record 100 using its individual records communicator 2328. The individual records processor 2326 of the record receiver device 116b can modify the individual record 100 to create the modified individual record 100m1. The record receiver device 116b can store the modified individual record 100m1 in the individual records container 202 as one of the unredeemed individual records 208. The record receiver 116b can redeem the modified individual record 100m1 using its individual records communicator 2328 with the processing platform 124.

The record history tracker 2332 can contain a highest record ID 2336 for tracking the record ID of the individual record 100 that the user device 116 has created most recently. After the user device 116 creates a new individual record with a record ID bigger than the highest record ID 2336, the user device 116 can update the highest record ID 2336. As another example, the record history tracker 2332 can keep track of all the individual records 100 the user device 116 has created, received, modified, or redeemed. The record sender device 116a can contain a copy of the individual record 100, and the record receiver device 116b can contain a copy of the modified individual record 100m1.

Example Secure Element (SE)

The user device 116 can include a secure element (SE) 204. The secure element 204 can be configured to securely store the private key 210 of the user device and one or more service provider public keys 212. In some embodiments, the secure element 204 can include a public key of the service provider 124. In some embodiments, the secure element 204 can include two or more service provider public keys 212 of one service providers 124. In some embodiments, the secure element 204 can include two or more service provider public keys 212 of two or more service providers. The secure element 204 can use the private key 210 of the user device to sign individual records 100. The secure element 204a of the record sender device 116a can add the receiver public key 106b and the record ID 108 to the individual record 100. The record ID 108 can be based on, for example, the highest record ID 2336 tracked by the record history tracker 2332. In some embodiments, the secure element 204 can comprise one or more of the record history tracker 2332 and the highest record ID 2336.

The secure element (SE) 204 can use the service provider public key 212 to verify the authenticity of information received from the service provider 104. For example, the information received from the service provider 104 can comprise a service provider signature created using the private key of the service provider public-key cryptography pair. Verifying the authenticity of information received from the service provider 104 can comprise determining, using the service provider public key 212, whether the service provider signature has been created using the service provider private key. In some embodiments, the service provider public key 212 can be hardcoded in the secure element 204. In some embodiments, the service provider public key 212 can be updated by the processing platform 124.

The secure element (SE) 204 can have different implementations, including a hardware implementation, a secure virtualization, a secure execution environment, or any combination thereof. For example, the secure element 204 can comprise an integrated circuit, or another hardware component that can securely store the private key 210 associated with the user device 116. As another example, the secure element 204 can be implemented by a virtualized infrastructure. The virtualized infrastructure can be supported by one or more hardware features in a processor in the user device 116, for example the processor 2304. As yet another example, the secure element 204 can be implemented as a secure execution environment. The secure execution environment can be a virtual implementation of an infrastructure such as the Global Platform (GP) on which Java Card applets can run. The Global Platform system can be hosted by, for example, the Trust Zone features of an Advanced Reduced Instruction Set Computing (RISC) Machine (ARM) processor of the user device 116 providing a trusted execution environment (TEE).

Example Common Records Receiver and Container

The user device 116 can include a common records receiver 2338 that can be configured for receiving common records 206 for storage in a common records container 2340. The common records 206 can contain the public keys of devices 214. In some embodiments, the common records

206 can contain user record status 306. In some embodiments, the common records 206 can contain a demerit list 1402 and a blacklist 1404. A user or a user device can be on the demerit list 1402 if the user or the user device has created an individual record instructing the processing platform 124 to perform a task when the user or the user device should not. A user or a user device can be on the blacklist 1404 if the user or the user device has, for example, attempted to redeem an individual record by signing it using a private key not assigned to the user device.

Example Transaction Partner Identifier

The user device 116 can include a transaction partner identifier 2348 configured for identifying record sender devices and record receiver devices. For example, as illustrated in FIG. 1B, for the record sender device 116a to create and send the individual record 100 to the record receiver device 116b, the record sender device 116a may need to identify the public key 106b of the record receiver device 116b. The record receiver device 116b can send a public key to the record sender device 116a using, for example, the short range link interface 2320. The transaction partner identifier 2348 of the record sender device 116a can confirm, for example, the public key received from the record receiver device 116b is indeed the public key 106b of the record receiver device.

Example Error Manager

The user device 116 can include an error manager 2356 for processing improper individual records received. For example, the record receiver device 116b may be unable to verify the authenticity of the record sender signature 112a of the individual record 100 received from the record sender device 116a. In some embodiments, in response to receiving improper individual records, the error manager 2356 can send the individual records to the processing platform 124 after adding a "malicious record endorsement" to the improper individual records.

Example Sourcing

The user device 116 can include a source container 2360 configured for maintaining source information 2364. The source information 2364 can be associated with identification strings, for example the name of a depository. The source information 2364 can identify a number of sources for obtaining, for example, the document with its ID stored in the content 110 of an individual record 100. The sources may or may not be part of the processing platform 264.

The user devices 116 can create individual records 100 with source fields for storing source information. In some embodiments, if individual records 100 have empty source fields or do not have source fields, the individual records 100 can be assumed to have default sources. For example, if an individual record 100 instructs the processing platform 124 to provide a document to a record receiver 102b, the individual record 100 can include a source field such as a particular depository for obtaining the document. If the individual record 100 does not contain a source field or contains an empty source field, the processing platform 124 can obtain the document from a default depository.

In some embodiments, individual records 100 can contain fee sharing fields regarding whether the record senders 102a or the record receivers 102b will pay or split sourcing fees associated with sourcing. For example, a depository can charge the processing platform 100 for accessing a document as instructed by an individual record 100, and the fee sharing field can indicate whether the record sender 102a or the record sender 102b will be responsible for the charge by the depository or if and how they can split the charge. In some embodiments, the user devices 116 can reject individual records 100 with certain source fields, fee sharing fields, or any combination thereof.

The user device 116 can include a source user interface 2368 for receiving source information 2364 from users. For example, users can input source information 2364 using a web interface or an application on user devices 116. As another example, the source user interface 2368 can provide a visual interface for extracting source information 2364 from documents containing the source information 264. The visual interface can make use of the sensors 2324, for example an imaging sensor, and computer vision algorithms.

Example Processing Platform

Example Processor, Memory, Storage, and Network Interface

Figure 24:
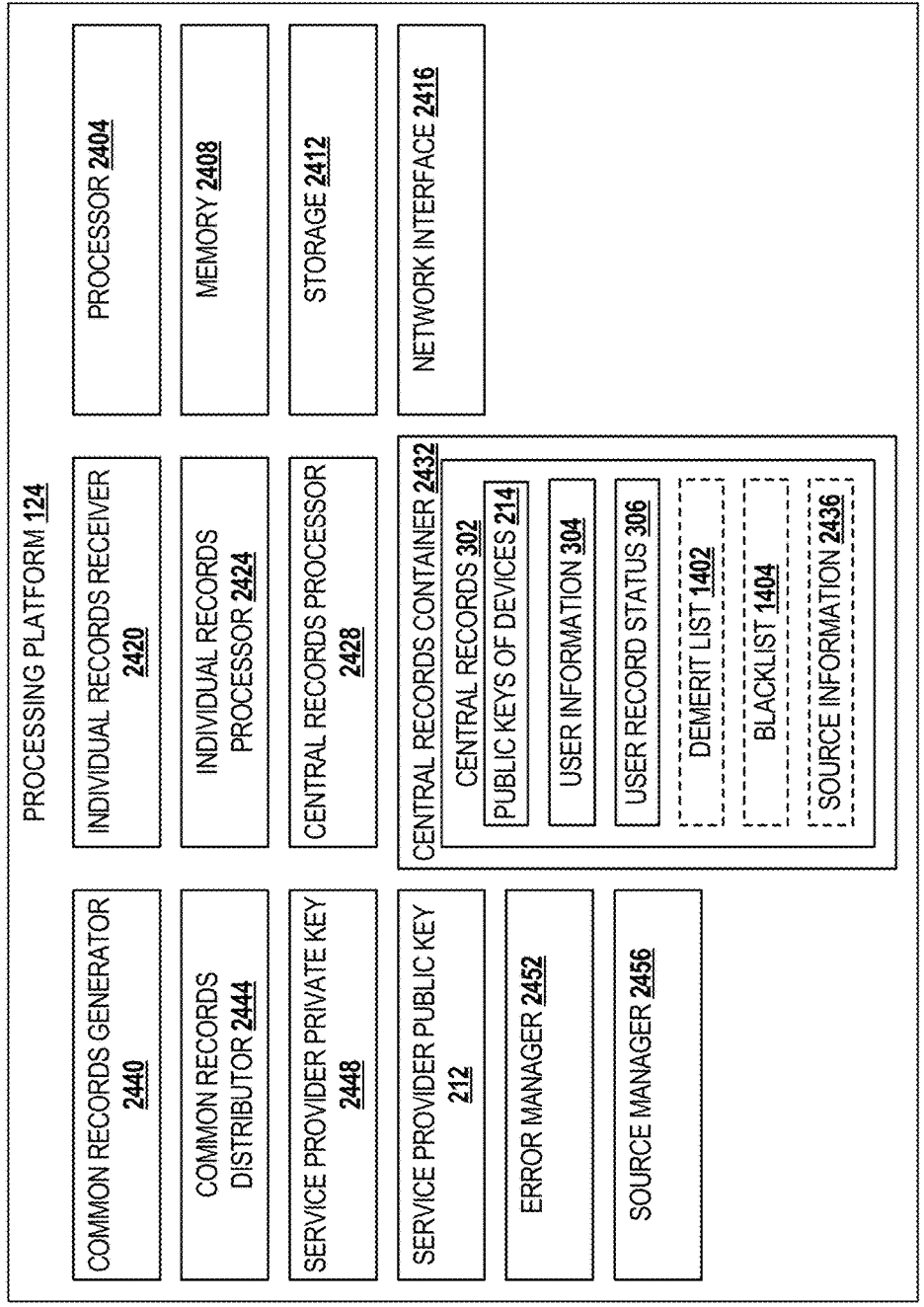
FIG. 24 is a block diagram of an example processing platform.

The processing platform 124 can comprise one or more server computers. The server computers can be centralized or distributed. FIG. 24 schematically illustrates an example processing platform 124. The processing platform 124 can include a processor 2404 configured for executing instructions stored in a memory 2408, for example a random access memory (RAM). The memory 2408 can be configured for storing instructions and data when the processing platform 124 is powered on. The memory 2408 can include both read only and writable memory. The processing platform 124 can include a storage 2412 configured for storing instructions and data when the processing platform 124 is powered on or powered off. One or both of the memory 2408 and the storage 2412 can store instructions for processing individual records, for example the modified individual record 100m1 that the record receiver device 116b has redeemed with the processing platform 104. The processing platform 124 can include a network interface 2416 configured for communicating with other devices on the network 118, for example the user devices 116, synchronously or asynchronously, continuously or intermittently. The network interface 2416 of the processing platform 124 and the network interface 306 of the user device 116 can be the same or different.

Example Individual Records Receiver and Processor

The processing platform 124 can include an individual records receiver 2420 configured for receiving individual records 100 from user devices 116. An individual records processor 2424 of the processing platform 124 can be configured for processing individual records 100 received by the individual records receiver 2420 from users devices 116. For example the individual record processor 2424 of the processing platform 124 can process the modified individual record 100m1 received by the individual records receiver 2420 from the record receiver 102b.

Processing an individual record 100 can comprise authenticating some or all of the signatures in the individual record 100 from the originator of the individual record 100 to the signer of a "for processing only endorsement" (FPOE). For example, processing the modified individual record 100m1 can comprise authenticating one or both of the record sender signature 112a and the record receiver signature 112b.

Authenticating the signatures in the individual records 100 can be based on the public keys of user devices 214 stored in a central records container 2432 containing the central records 302. For example, the individual records processor 2424 can authenticate the record sender signature 112a and the record receiver signature 112b in the modified individual record 100m1. Authenticating the record sender signature 112a and the record receiver signature 112b can comprise determining whether the record sender signature 112a and the record receiver signature 112b have been created using the private key 212a of the record sender device and the private key 212b of the record receiver device 116*b* respectively. Determining whether the record sender signature 112*a* and the record receiver signature 112*b* have been created using the private key 212*a* of the record sender device and the private key 212*b* of the record receiver device can comprise using the public key 106*a* of the record sender device and the public key 106*b* of the record receiver device to determine the authenticity of signatures.

Processing the individual records can comprise acting as instructed by the contents 110 of the individual records 100 processed. For example, if the content 110 of the modified individual record 100*m*1 comprises an instruction that the record receiver device 116*b* should be given access to a document with a particular document ID, processing the modified individual record 100*m*1 can comprise giving the record receiver device 116*b* such access.

Example Central Records Processor and Container

After the individual records processor 2424 completes processing individual records received, a central records processor 2428 of the processing platform 124 can be configured to update the central records 302 contained in a central records container 2432. The central records processor 2428 can back up the central records 302 contained in the central records container 2432 to, for example, a backup storage. In some embodiments, the central records 302 contained in the central records container 2432 are authoritative. For example, the user record status 306 of the central records 302 can contain the most up-to-date and the most accurate information of the users or the user devices. In some embodiments, at any given time, there can be individual records that have not been redeemed and may not be reflected by the central records 302.

The central records 302 can comprise the public keys of user devices 214, the user information 304, the user record status 306, a demerit list 1402, a blacklist 1404, and source information 2436. For example, after the individual records processor 2424 gives the record receiver device 116*b* access to the document as instructed by the content 110 of the modified individual record 100*m*1, the central records processor 2428 can update the user record status 306 to reflect such grant of access.

The source information 2436 can include information regarding how the contents 110 of the individual records 100 can be processed. For example, the modified individual record 100*m*1 can instruct the processing platform 124 to give the record receiver device 116*b* access to the document with a particular document ID, and the document may be stored in two databases. The source information 2436 can indicate that the document can be obtained from either databases, or the document should be obtained from one of the two databases if possible.

Example Common Records Generator and Distributor

A common records generator 2440 of the processing platform 124 can create the common records 206 from the central records 302 for distribution to user devices 116 by a common records distributor 2444. The contents of the common records 206 can vary. For example, the common records 206 can be identical to the central records 302. As another example, the common records 206 can be a subset of the central records 302. The common records 206 can contain one or more of the public keys of devices 214, the user information 304, the user record status 306, the demerit list 1402, the blacklist 1404, and the source information 2436. The common records distributor 2444 can distribute the common records 206 with a signature of the common records 206 created using the service provider private key 2448. One or both of the service provider public key 212 and the service provider private key 2448 can be stored in a secure element (SE) of the processing platform 124. The service provider private key 2448 can be in the exclusive or the non-exclusive possession of the processing platform 124.

Example Error Manager

The processor platform 124 can include an error manager 2452 configured for processing improper individual records. For example, the record receiver device 116*b* can send the modified individual record 100*m*1 with a "malicious record endorsement" in the endorsement block 105*b*. The error manager 2452 can be configured to determine whether the record sender device 116*a* should be placed on the demerit list 1402 or on the blacklist 1404 based on the improper individual records received by the processing platform 124.

Example Sourcing

The processing platform 124 can include a source manager 2456 for managing source information 2436 stored in the central records 302. The source manager 2456 can be configured for facilitating interactions with sources and for determining the sources to interact with. The source information 2436 can identify a number of sources, including the default sources and preferences for different sources, for performing as instructed by the contents 110 of the individual records 100 redeemed. The source information 2436 can include costs associated with accessing the sources, for example the costs the sources charge for accessing them. The source information 2436 can comprise information received from users.

Example System for Cryptographically Secure Transfer of Funds

Disclosed herein are systems and methods for offline digital transfer of funds. For example, transaction instruments such as digital cheques can be securely transferred and exchanged using a hybrid system. The hybrid system can provide meaningful or satisfactory centralized and peer-to-peer exchanges of digital cheques or transmission of value when not all parties to a transaction are connected to central data servers that can authenticate the transaction. Digital cheques can have variable value, and not being a bearer document (such as cash), they allow large amounts of value to be transferred from one person or entity to another without both parties being required to appear at a central depository such as a bank. Challenges related to digital transmissions such as the triviality with which digital cheques can be copied are addressed. Features based on digital tools and techniques available on digital platforms are disclosed, for example using digital cryptography, the much more powerful cryptographic analog of the traditional hand written signature, for endorsement of digital cheques.

The hybrid system can comprise one or more components for transferring funds from one user of the system to another. The hybrid system can have both centralized as well as peer-to-peer components. With the hybrid system, users can make financial transactions with one another without access to the central components of the system at the time of the transactions. The system can utilize a network such as the Internet, the worldwide network that can be accessed by wired or wireless communications implementing protocols such as Institute of Electrical and Electronics Engineers (IEEE) 802.11 standards 802.11 or long range networks such as the cellular telephone networks.

The one or more components of the system can include a digital cheque, users such as a buyer or a seller, mobile computers (MC), a wallet, a short range link (SRL), a processing platform, a central ledger, a common ledger, or a company. The digital cheque can be a digital object, a block of data, which can be transmitted from one component of the system to another. The buyer can be a payer who wishes to transfer funds to another person, for example, the seller. The seller can be a payee who wishes to receive funds from another person, for example the buyer. The mobile computers can be computing devices in the possession of the buyer and the seller. The mobile computers in the possession of the buyer and the seller may be identical or different. The mobile computers may be cellular telephones, for example. The wallet can be a digital data structure, residing on a mobile computer that contains all digital cheques received by that mobile computer that have not yet been transmitted on to the processing platform. The short range link can be a peer-to-peer radio or other links that allow the mobile computers to communicate with one another. The link can be based on the Infrared Data Association (IrDA)/Infrared Physical Layer Specification (IrPHY), Bluetooth®, Near Field Communication (NFC), ad hoc Institute of Electrical and Electronics Engineers (IEEE) 802.11, or any other wireless communication methods and systems.

The processing platform can be a server comprising a machine or a collection of machines that can be infrastructural to the system. The processing platform can be connected to the network and indirectly (though possibly only intermittently) to the mobile computers. The processing platform can maintain the central ledger as well as the common ledger. The central ledger can be a database that maintains balances, measured in currency units. Currency units may be existing national currencies (e.g. US Dollars). Currency units may be a novel fiat currency created for the system. This balance information can be stored for every user of the system. The central ledger can maintain other ancillary or identifying information about each user. The common ledger, associated with the central ledger, can be distributed throughout the system. The common ledger can contain a list of valid user identifiers (IDs). The common ledger can also contain additional information about users. The common ledger is distinct form the central ledger in that the common ledger does not contain account balances in some embodiments. The common ledger may omit other information in the central ledger. The company can be a service provider or an entity that operates the processing platform.

Example Basic Transactions

Figure 25:
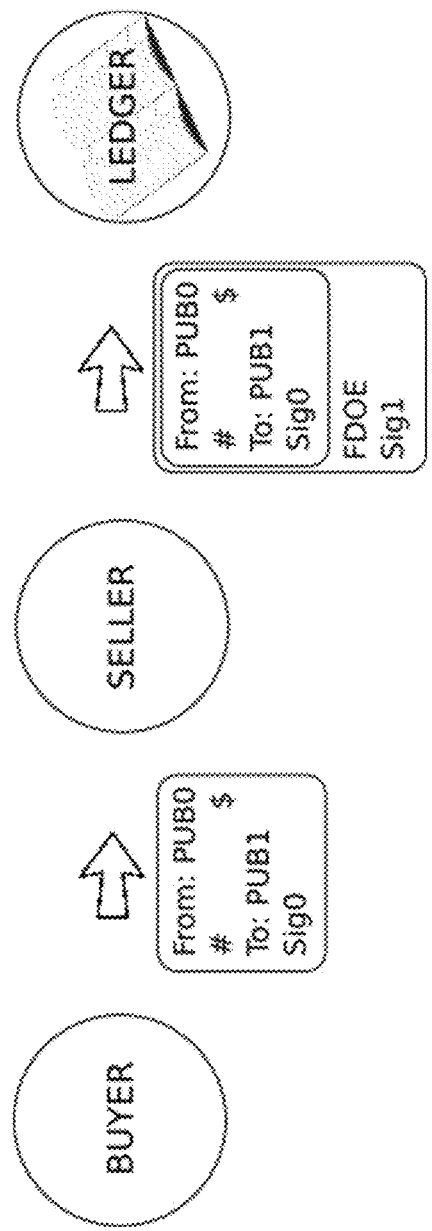
FIG. 25 schematically illustrates an example of a standard transaction.

FIG. 25 schematically illustrates an example of a standard transaction. The buyer may issue an instruction to the central ledger that can be given to the seller. Such an instruction can be a digital cheque. The Seller can then redeem that digital cheque, to the processing platform maintaining the central ledger, in order to transfer the money. The transaction between the buyer and seller may be done offline, such that neither party is connected to the network, and the data transmission can instead be done via the short range link (SRL). The seller can then redeem the digital cheque with the processing platform that maintains the central ledger at any later time when the seller's mobile computer is connected to the processing platform through the network.

Both the buyer and the seller can have a mobile computer (MC). A mobile computer may be equipped with a secure element (SE). The secure element can have different implementations, including a hardware implementation, a secure virtualization, a secure execution environment, or any combination thereof. For example, the secure element can be a chip or other hardware component that is capable of securely storing a private key of public key cryptographic algorithms such Rivest-Shamir-Adleman (RSA) encryption. As another example, the SE can be a virtualized infrastructure that may be supported by hardware features in another processor in the MC. As yet another example, the SE may be a virtual implementation of infrastructure such as Global Platform (GP) on which Java Card applets run. The entire GP system may be hosted by means of the TrustZone features of the Advanced Reduced Instruction Set Computing (RISC) Machine (ARM) processor of the mobile device, for example the ARM Global Platform trusted execution environment (TEE).

The secure element can sign data blocks of digital cheques. The secure element can have other, possibly unrelated, functions the SE may also have. In signing the data blocks, the secure element can also complete two additional fields in the block. The first additional field can be the Public Key associated with the user which can be stored in the SE. The second additional field can be a cheque identifier (ID), a number that is uniformly incrementing inside of the SE such that the same number will never appear twice.

The action of the SE can be triggered by both the provision of a block of a digital cheque to be digitally signed, as well as a pass phrase or biometric template. The pass phrase or biometric template may be required in order for the SE to issue a signature. The biometric template may be derived from fingerprint, iris, or any other source. The SE may implement a biometric fuzzy vault configured for recognizing the biometric template. The signature can complete and sign the block. This signature can be a digital signature, and may be created use of an algorithm such as RSA to encrypt a hash such as secure hash algorithm (SHA)-2 of the block. The signature can be created with the private key stored in the SE, but can be verified by any holder of the user's associated public key.

The buyer can transmit the signed digital cheque directly to the seller, or indirectly through any other party, by means of the SRL or by any other means. Once in the possession of the seller, the seller may choose to add an endorsement block to the digital cheque. This endorsement may be a "for deposit only endorsement" (FDOE) that specifies that the digital cheque may be only deposited. This endorsement may further redirect the digital cheque to a third party. Once the endorsement is added, the seller can repeat the process of generating a signature for the entire digital cheque, including the original block, the buyer's signature, and the endorsement block. Accordingly, any digital cheque can be a chain of blocks, each identifying its originator. At each block, the entire prior portion of the chain can be signed by the party handling the blocks at that time using the private key of his mobile computer.

Any digital cheque whose last block is an FDOE may be redeemed with the processing platform. On redemption, the processing platform can verify the authenticity of each Signature in the chain back to the originator of the digital cheque, for example the original buyer. If all of the signatures are authentic, then the fund will be transferred from the account of the originator and placed in the account of the user at the end point of the chain in the digital cheque. The time at which the seller becomes connected to the processing platform and redeems the digital cheque in his wallet can be a redemption event.

Example Central Ledger

The company can be responsible for maintaining the processing platform, and the processing platform can be configured to maintain the central ledger. The central ledger can be, or can comprise, a database of users. The central ledger can contain information known about the users, including their public keys and their current balances. In some embodiments, the central ledger can contain all information about the users known in the system. The public keys can associated with private keys in the SEs of the mobile computers. A record in the central ledger can be the record of a device, rather than an individual. Mobile computers owned by a user can be grouped together by the user if such information is available. Balances between devices associated with a particular user may be pooled in some embodiments.

Even though there can be backup copies of the central ledger, the central ledger can be unique, such that the balances it contains are the authoritative balances in the system. At any given time, there may be digital cheques outstanding in the system, of which the central ledger may be unaware. The processing platform that maintains the central ledger can use the information in the central ledger to authenticate any digital cheque from its point of origin to the signer of the FDOE.

Example Common Ledger

Individual mobile computers in the system may maintain a data structure called a common ledger. A common ledger can be a derivative of the central ledger that does not contain financial balance information. The common ledger can contain a list of all of the valid public keys, i.e. user identities, in the system. The common ledger can also contain information about individual users, such as their demerits or blacklist status (further described below).

The common ledger may be updated from time to time by the processing platform. When distributed, the common ledger can be cryptographically signed using a private key known only to the processing platform. Every recipient can be provisioned in advance with the corresponding public key required to verify the signature on the common ledger.

Example Transaction Partner Identification

Because the digital cheque of the system can be transmitted electronically from the buyer to the seller, the buyer may be unsure of the identity of the seller. For example, when a merchant acting as a seller desires payment from a buyer acting as a payee, the merchant may issue a "payment request" (PR), via the SRL. The payment request can contain the merchant's identifier (ID), for example the merchant's public key, and the requested value. A malicious actor might generate a payment request at approximately the same time as the merchant, hoping that the buyer may incorrectly send a digital cheque to him rather than the merchant issuing the payment request. Accordingly, the buyer may need to be able to identify the seller. The buyer can identify the seller by partner identification. Non-limiting examples of methods for partner identification include payment authorization, knocking, physical indication, beam forming, prior arrangement, cursory validation, or any combination thereof.

Example Payment Authorization

In some embodiments, partner identification can comprise payment authorization (PA). For example, the buyer can issue an intent to pay (IP). The intent to pay can be a zero value transaction sent to buyer, for example the public key of the seller's mobile computer, provided in the payment request. If the intent to pay arrives at the seller's MC, then the seller can indicate by non-electronic methods that he is the recipient of the intent to pay. For example, the seller can verbally inform the buyer that he has received the intent to pay. When the seller indicates to the buyer that he is the recipient of the intent to pay, the seller's payment requested can be validated and the buyer can send payment to the seller.

Example Knocking

In some embodiments, partner identification can comprise knocking. For example, the buyer's mobile computer (MC) and the seller's mobile computer can come into physical contact, for example knocking. The mobile computers can comprise motion sensors. And the motion sensors of the buyer's mobile computer and the seller's mobile computer can measure the physical contact. The simultaneity of the physical contact measured by the buyer's mobile computer and the seller's mobile computer can be a proof of authenticity. The seller's mobile computer can send the payment authorization when the knock occurs. The buyer's mobile computer can accept the payment authorization based on the temporal concurrency of the physical contact that it itself measures and the receipt of the payment authorization. In some embodiments, to provide additional security, the seller can send to the buyer a signature of the contact it measures. Because the contact can produce an equal and opposite reaction in the buyer's mobile computer, the buyer's mobile computer can validate the contact measured by the seller's mobile computer.

Example Physical Indication

In some embodiments, partner identification can comprise physical indication. For example, if the mobile computers (MCs) are capable of perceiving the environment (e.g., via imaging sensors such as cameras), the two mobile computers can be oriented so as to perceive one another. The observed pose of the other MC plays a role analogous to the signature of the knock when knocking is used for partner identification. For example, if the camera of A's mobile computer sees B's MC to be up and to the left, then the camera of B's mobile computer should see A's MC to be down and to the right. The perceived orientations may be compared qualitatively or quantitatively.

Example Beam Forming

In some embodiments, partner identification can comprise beam forming. For example, the short range link (SRL) of mobile computers may be directional (e.g., using a beam-forming or directional antenna). With beam forming, the buyer's mobile computer and the seller's mobile computer can be pointed at one another when sending or receiving a payment request. Thus, the payment request (PR) from the seller's mobile computer can be sent to the buyer's mobile computer (MC). If another PR is sent from another direction, the response may not be received by the buyer's mobile computer, as the buyer's MC is oriented towards the seller's MC.

Example Prior Arrangement

In some embodiments, partner identification can comprise prior arrangement. For example, the buyer may know the identifier (ID) of a particular seller; thus validation may be unnecessary.

Example Cursory Validation

In some embodiments, partner identification can comprise cursory validation. The common ledger can contain an identifying string, for example BigBoxStore, which can be used for cursory validation of a payment request. For example, a merchant can be identified by the company operating the processing platform in the common ledger as BigBoxStore. Such identification can be associated with an indication, for example a bit, in the common ledger that indicates that the BigBoxStore's identity has been validated by the company. The validated identity can be distinguished from identities assigned or provided by users themselves.

Error Management

The system disclosed herein can be capable of authenticating any chain of endorsements in a digital cheque when they are authentic. However, digital cheques can contain errors. Unscrupulous users operating within the system can attack the system by creating invalid digital cheques, or unscrupulous entities can attack other users of the system by making these other users appear as malicious actors. In some embodiments, some attacks can be initially indistinguishable from other attacks.

Example Buyer Cloning with Multiple Sellers

Figure 26:
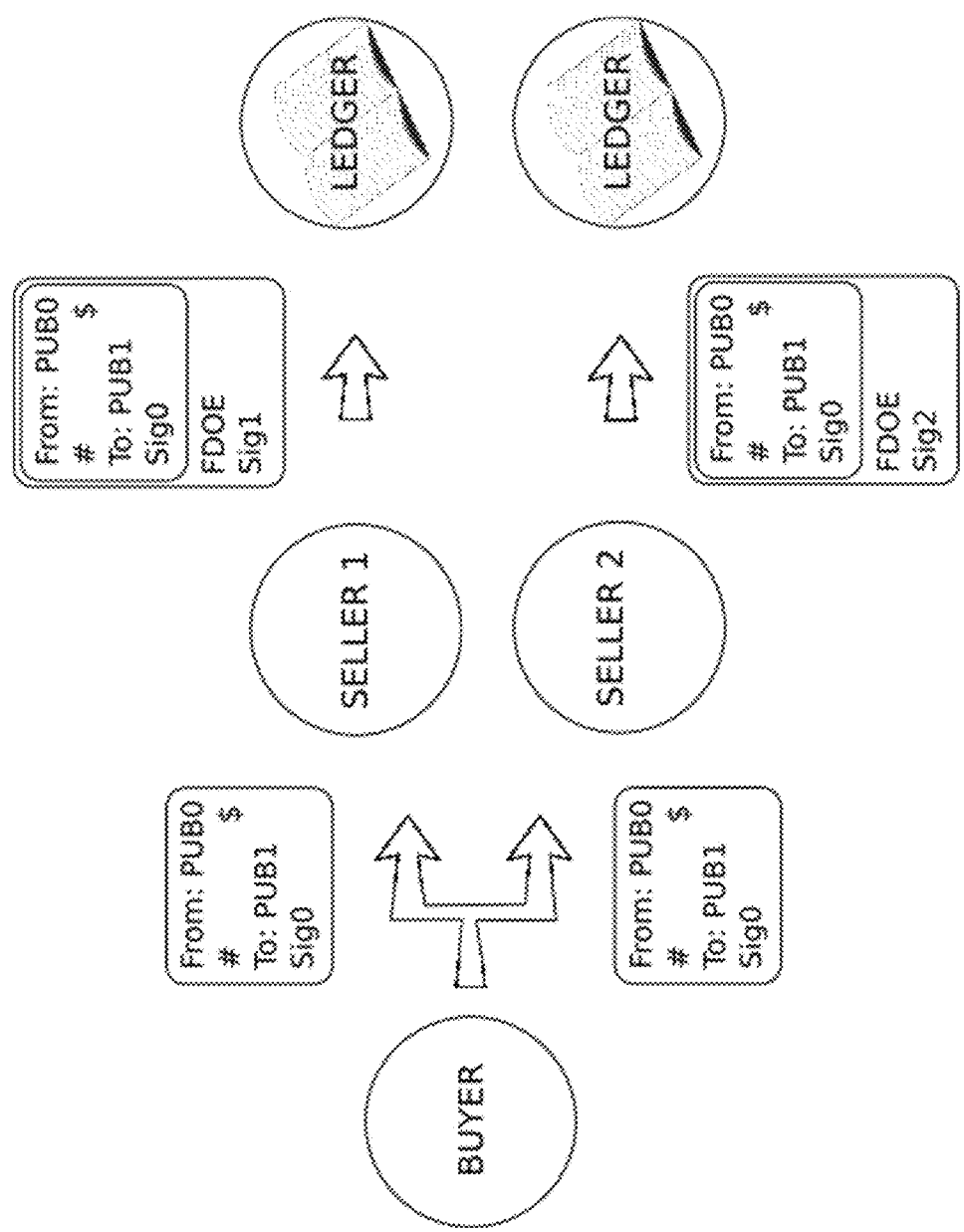
FIG. 26 schematically illustrates an example of buyer cloning with multiple sellers.

A malicious buyer can copy a digital cheque after signing it and send the identical copies of a digital cheque to two different sellers with the goal that it can receive goods from both sellers while only paying once. FIG. 26 schematically illustrates an example of this malicious behavior, which can be referred to as buyer cloning with multiple sellers. For example, the malicious buyer can send identical copies of a digital cheque to a first seller and a second seller when the digital cheque is intended for the first seller. Upon receiving a copy of the digital cheque, the second seller can immediately determine that the digital cheque it has received is not endorsed to it. Accordingly, the second seller can reject the digital cheque.

Example Buyer Cloning with a Single Seller

Figure 27:
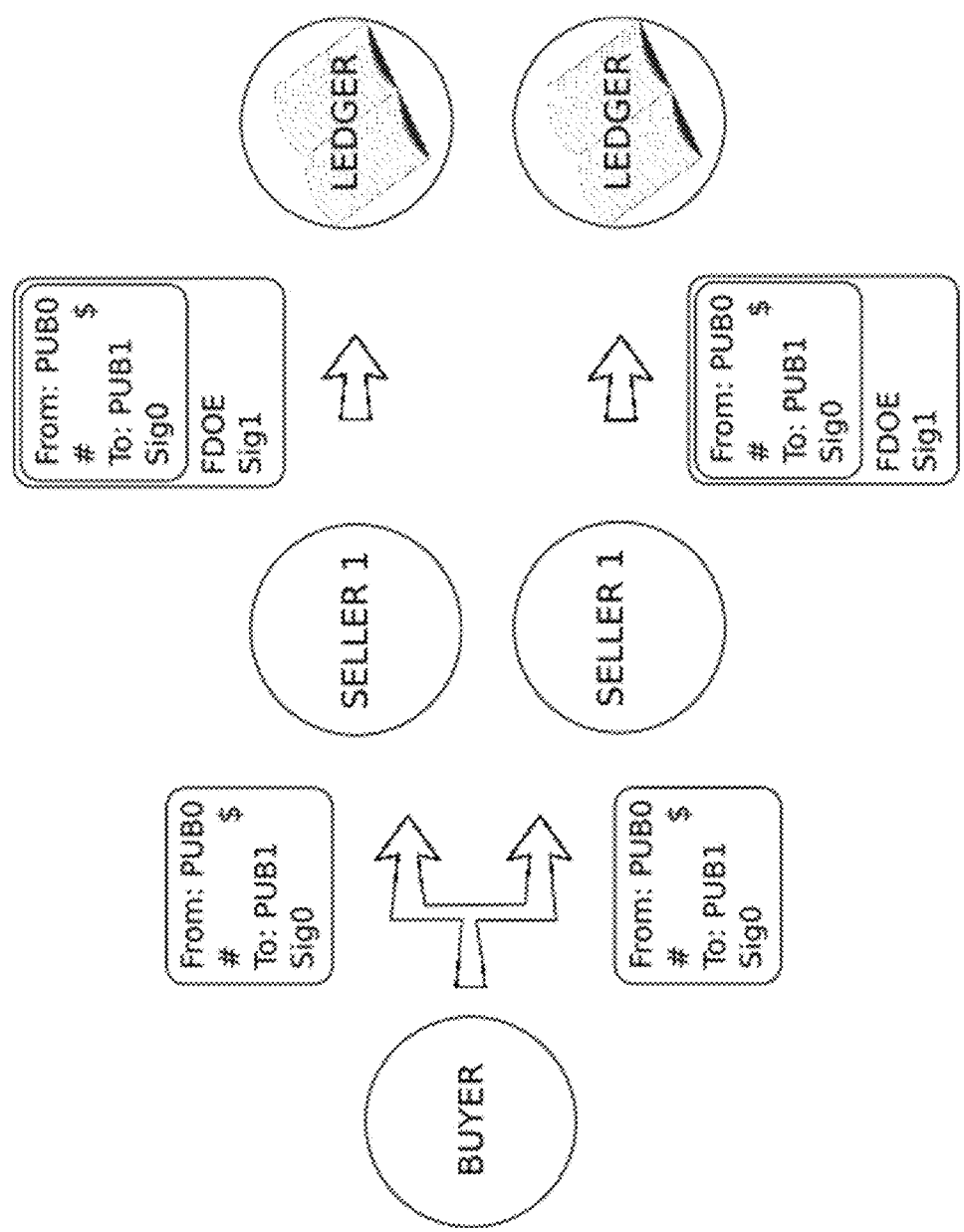
FIG. 27 schematically illustrates an example of buyer cloning with a single seller.

A malicious buyer can copy a digital cheque after signing it and attempt to reuse that digital cheque later with the same seller with the goal that it can receive goods from that seller twice while only paying once. FIG. 27 schematically illustrates this malicious behavior, which can be referred to as buyer cloning with a single seller. The seller's mobile computer (MC) can detect such malicious behavior. For example, the seller's mobile computer can keep a record of the cheque ID from the last digital cheque from any particular user it has received digital cheques from. In some embodiments, because the cheque IDs can be issued in a strictly increasing order, the seller's mobile computer can keep track of the ID of the last digital cheque it has received from any particular user. In some embodiments, the seller's mobile computer can keep track of the IDs of all digital cheques it has received. Any new digital cheque received from a particular user should have a cheque ID greater than the highest cheque ID on record.

Because the central ledger can always detect a copied digital cheque, the processing platform will never pay a copied digital cheque. Therefore, it is the seller's responsibility to keep this record of transactions. The seller's MC can execute a software program or a hardware program can automatically log transactions and digital cheques it has received, and compare all new transactions against this log.

Example Forking

Figure 28:
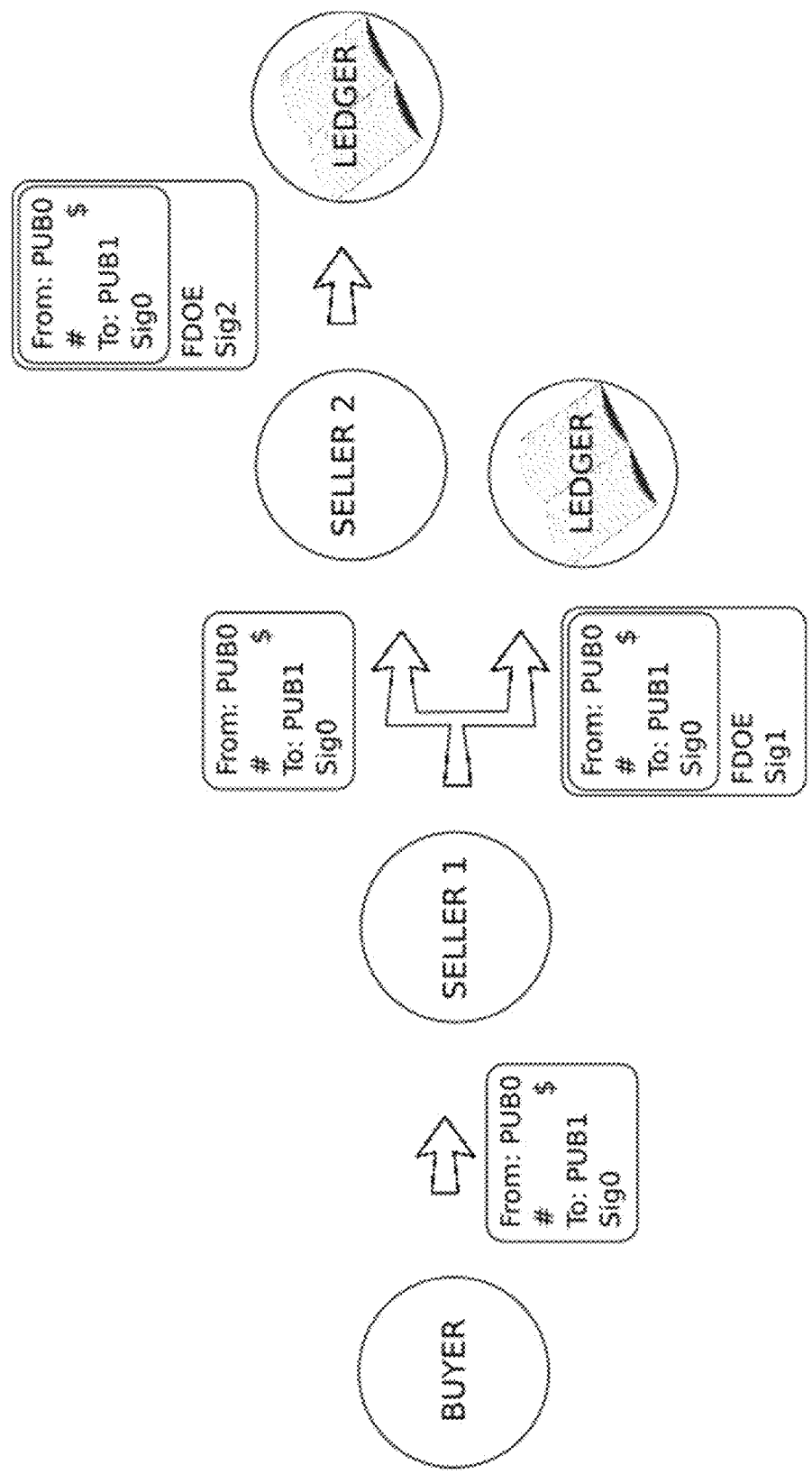
FIG. 28 schematically illustrates an example of cheque forking.

A malicious seller can receive a digital cheque from a buyer. After receiving the digital cheque, the seller can copy the digital cheque before endorsing it and attempt to pay a second seller using the received digital cheque, with the goal of purchasing goods from the second seller while not paying for it. FIG. 28 schematically illustrates this malicious behavior, which can be referred to as cheque forking. The second seller can reject the digital cheque received from the malicious seller because it can verify that the digital cheque received does not indicate it as the intended recipient.

Example Seller Cloning

Figure 29:
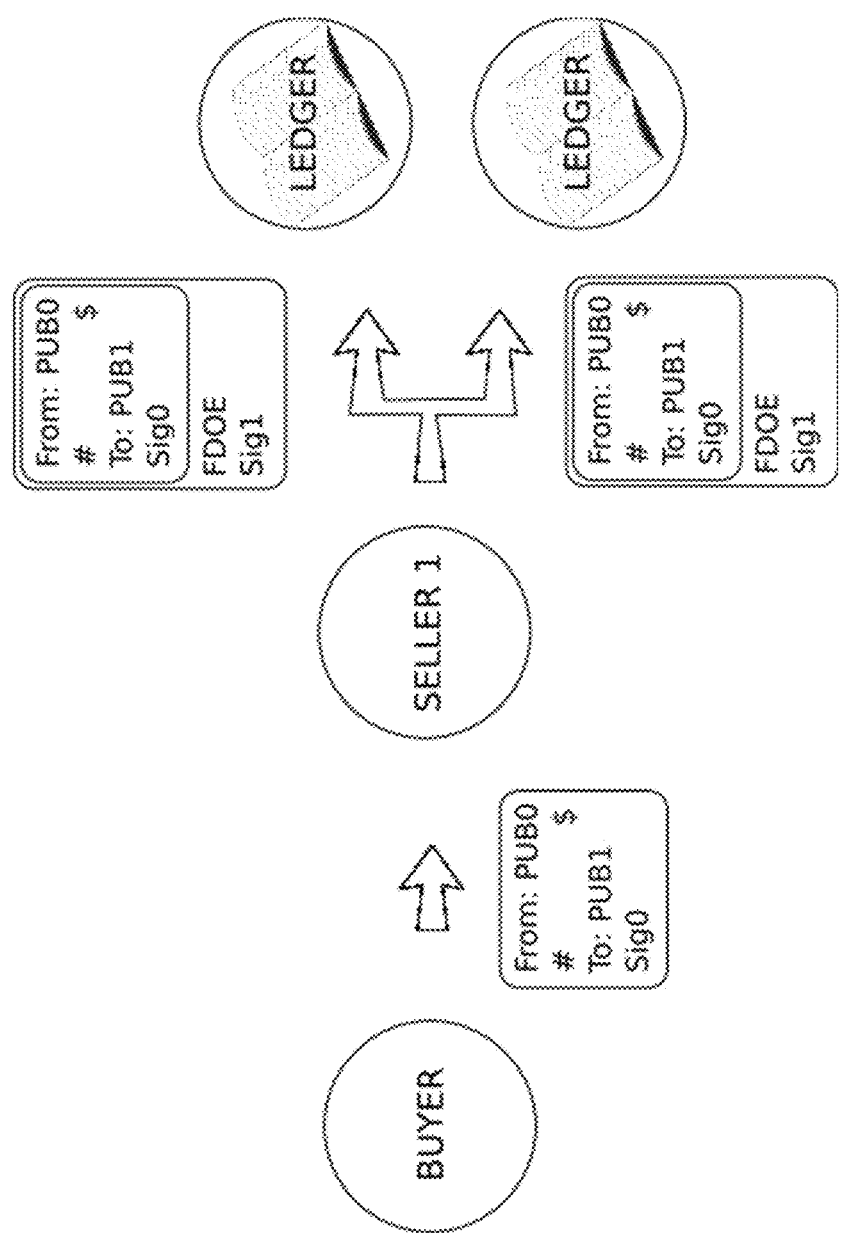
FIG. 29 schematically illustrates an example of seller cloning.

A malicious seller can copy a received digital cheque and deposit it twice, with the goal that it can be paid twice for the transaction. FIG. 29 schematically illustrates this malicious behavior which can be referred to as seller cloning. The malicious seller can attempt seller cloning with the intent that the buyer be accused of buyer cloning.

Because the central ledger can contain the same cheque ID number from the buyer, the processing platform can identified this malicious behavior when the malicious seller deposits the received digital cheque the second time. To detect this attack, the central ledger can retain a record of all cheque ID numbers that have been redeemed from a particular originating ID of a mobile computer. In some embodiments, the common ledger can contain this record and be distributed to users or mobile devices of the system. Accordingly, users or user devices can receive digital cheques received out of order.

Example Mousing

Figure 30:
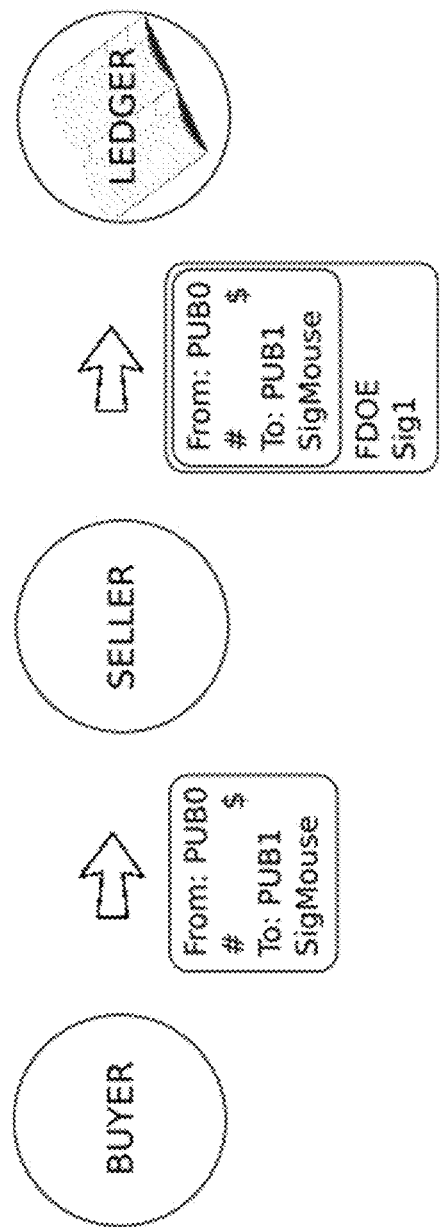
FIG. 30 schematically illustrates an example of mousing.

A malicious buyer can bypass the secure element of his mobile computer and generate a false signature for a digital cheque. A false signature can be a signature created not using the private key of the malicious buyer's mobile computer. FIG. 30 schematically illustrates this malicious behavior which can be referred to as mousing. The malicious buyer's goal can be that when the digital cheque can be unredeemable because the seller cannot verify that it has originated from the malicious buyer. The seller can immediately detectable this malicious behavior because the signature of the digital cheque cannot be decrypted with the buyer's ID, for example the malicious buyer's public key that is part of the digital cheque. Accordingly, the seller can immediately reject the digital cheque.

Example Ghosting

Figure 31:
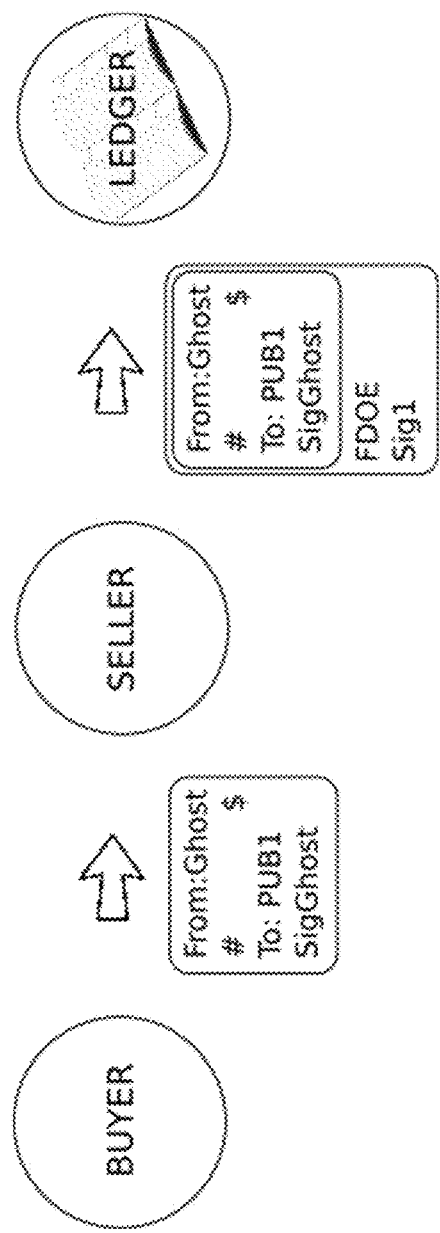
FIG. 31 schematically illustrates an example of ghosting.

A malicious buyer can generate a digital cheque using a different ID than its own which is then signed using the private key associated with the different ID. FIG. 31 schematically illustrates this malicious behavior which can be referred to as ghosting. The seller can detect ghosting if the seller has an up-to-date list of all users in the system while the processing platform can detectable when the digital cheque arrives at the ledger. The seller can have a copy of the common ledger and can either reject the digital cheque or accept it at its own risk in the case that its common ledger does not contain the buyer ID on the digital cheque. In some embodiments, the system can employ a proprietary variant of the encryption algorithm, thus making ghosting impossible.

Example Merit, Demerit, and Blacklist

Certain activities by users can be undesirable. The system can respond to users who have been involved in undesirable activities in a variety of ways. The first type of undesirable activities does not require any explicit modification of the mobile computers or the computer programs running on the mobile computers (MCs). The first type of undesirable activities, overdrafts, can include "bouncing" digital cheques, for example issuing more value in digital cheques than the issuer's balance can support. When users are involved in overdrafts, the system can give them demerits. The demerit system can, for example, keep track of one or more of the following: demerits based on number of bounced digital cheques, demerits based on value of bounced digital cheques, demerits based on recency of bounced digital cheques, or any combination thereof. The demerit system can normalize some or all of the demerits it keeps track of by the total number of digital cheques redeemed or the values of all digital cheques redeemed.

The second kind of undesirable activities, hacking, can require tampering with the mobile computers, the secure elements (SE) of the mobile computers, or the computer programs running on the mobile computers. The second kind of undesirable activities can include attacks mentioned in the previous section, for example forking, cloning, or mousing, which require explicit hacking or modification of the mobile computers, the secure elements of the mobile computers, of the computer programs running on the mobile computers (i.e. unauthorized modification of the behaviors of the mobile computers, the secure elements, or the computer programs). The system can detect some hacks using checksums and signed certificates for the computer programs running on the mobile computers. When users are involved in hacking, the system can place them on a blacklist. The Blacklist can be a list of user IDs that are banned temporarily or from all future transactions. Because user IDs can be uniquely tied to mobile computers, blacklisting a user ID can be equivalent to blacklisting a mobile computer. Any user shown to have participated in an attack originating from a hacked device can be blacklisted.

Example Signed Statements

Sellers can immediately detect certain types of hacking. For example, in the case of buyer cloning with multiple sellers, the second seller can immediately detect that it has received a malicious "hacked" cheque. It can be advantageous if such a hacking event be reported to the processing platform. For example, the seller's mobile computer can endorse the digital cheque received with a "malicious cheque" (MC) endorsement. MC endorsements can be signed like any other digital cheques from the second seller, and the endorsed cheque can be transmitted to the processing platform when other digital cheques in that seller's possession are redeemed with the processing platform.

The receipt of a signed MC endorsement by the processing platform can mean that a malicious actor is present in the system. However, the identity of the malicious actor may be unclear. For example, the MC presented by the seller may indicate buyer cloning from a malicious buyer it has actually transacted with; however it may also be a legitimate digital cheque received by a malicious seller who itself clones the buyer's check with the goal of accusing the buyer of buyer cloning. In either case, a malicious actor is present in the system.

Example Fuzzy Ruling

For some class of the hacks, it may be hard or impossible to unambiguously assign guilt to a particular party in the transaction. However, because digital cheques are signed using signatures available only to the parties in the transaction, it may be possible to assign blame to one of some number of parties. For example, if two identical digital cheques are redeemed at the processing platform, then either the originator (the buyer) or the depositor (the seller) can be a malicious actor. On such an observation, a non-limiting rule can be generated:

$$M(\text{Buyer})+M(\text{Sender})=\text{True}, \quad \text{(Rule 4)}$$

where M( ) denotes a Boolean operator that determines if the argument is malicious, and "+" denotes the logical OR operation.

This information can be stored for future use. For example, if the central ledger receives another pair of identical digital cheques later from a different seller and the same buyer, then another non-limiting rule can be generated:

$$(M(\text{Buyer})+M(\text{First Seller}))*(M(\text{Buyer})+M(\text{Second Seller}))=\text{True}, \quad \text{(Rule 5)}$$

where "*" denotes the logical AND operation. Rule 5 can be rewritten as:

$$M(\text{Buyer})+(M(\text{First Seller}))*M(\text{Second Seller}))=\text{True}. \quad \text{(Rule 6)}$$

For example, in interpreting the rules, the processing platform can assume that no two actors are malicious. Accordingly, the processing platform can conclude from Rule 6 that the buyer is malicious. As another example, the processing platform can assert a prior belief that malicious actors are rare, occurring with probability "p" greater than 0 and smaller than 1. Then the probability that both sellers being malicious can be p*p in Rule 6. The left size of Rule 6 can be expressed as p+p*p.

Similarly, such interpretations and assumptions can be extended to include all observations of all users by the system and can be expressed in a sum of products form. Thus, the term with the least elements in the product can be the most likely to be true. These actors can be labeled as malicious and blacklisted, either immediately, provisionally, or further investigated.

Example Point of Sale

Figure 32:
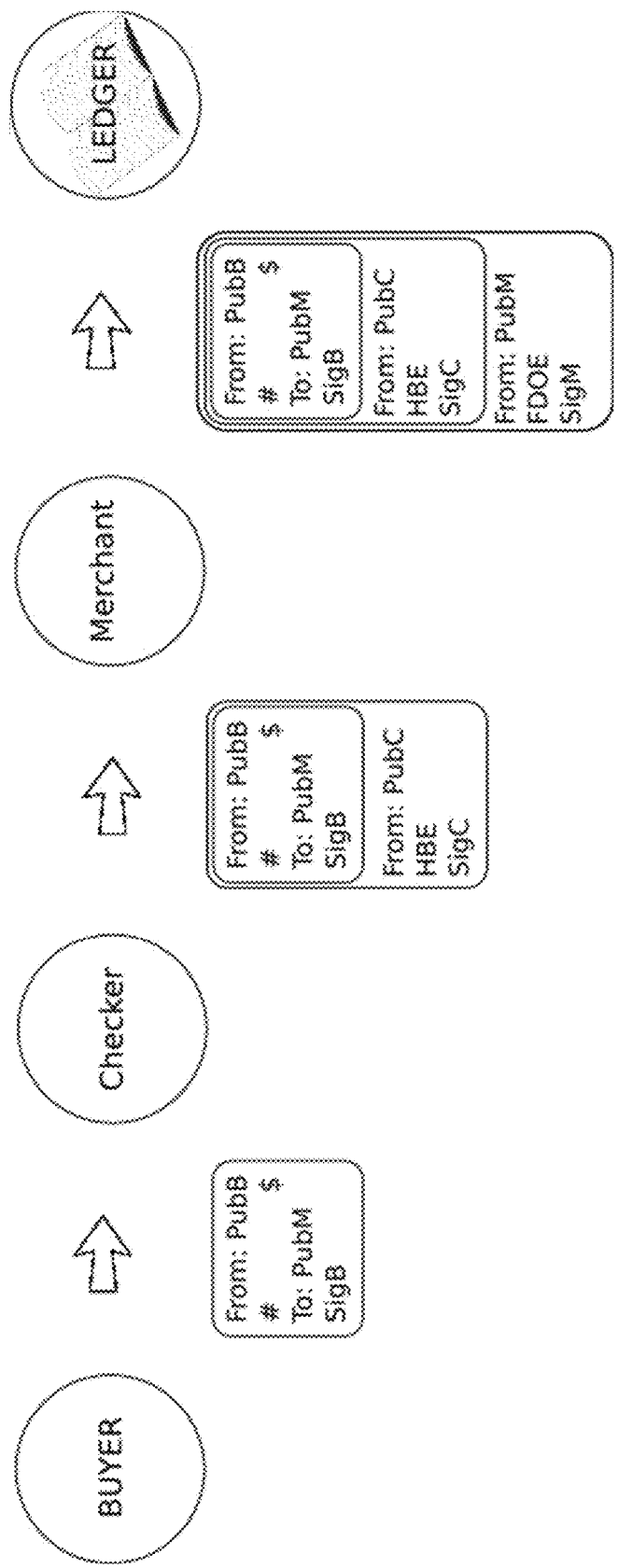
FIG. 32 schematically illustrates an example of a point of sale (PoS) transaction.

The system can interact with a point of sale system. FIG. 32 schematically illustrates an example of a point of sale (PoS) transaction. A point of sale (PoS) system can be a cash register or equivalent. A point of sale system can be at a fixed location. A point of sale system can be part of an infrastructure, for example an existing infrastructure with cash registers at a merchant such as BigBoxStore.

The merchant can be associated with one or more user identifiers (IDs). The merchant can have a single account, one account per cash register, or one per store location. The merchant's accounts can be associated with mobile computers as with other users or may be associated with key pairs issued to the merchant by the system. Merchant key pairs can be managed by computers owned by the merchant or can be hosted by the company as a service similar to "software as a service" (SaaS).

A checker, a cashier, or a PoS operator working for the merchant can have access to a mobile computer (MC) issued to him specifically, or the mobile computer can support multiple logins by authorized checkers, cashiers, or PoS operators working for the merchant.

When a buyer wishes to purchase goods or services from the merchant, the buyer can create a digital cheque issued to the merchant's user ID, but transmitted to a checker via a short range link (SRL). Once in the possession of the checker, the checker can verify that the digital cheque is valid by accessing, for example, the merchant's network. The merchant's network can be a secure Institute of Electrical and Electronics Engineers (IEEE) 802.11 network or similar networks that the checker, not the buyer, can have access to. The checker can transmit the digital cheque to the merchant's wallet via, for example, the merchant's secure network.

In a transaction involving a point of sale system, the original digital cheque from the buyer can be issued for the merchant, but given to the checker. The checker can then add a "handled by endorsement" (HBE) before transmitting the digital cheque to the merchant. The merchant can then add a "for deposit only endorsement" (FDOE) and redeem the digital cheque with the processing platform.

Prior to sending the digital cheque to the merchant, the checker can add a "handled by" endorsement (HBE) containing its own user ID and signed by the secure element of his mobile computer. The merchant may choose to only handle digital cheques marked with an HBE from one of its checkers.

When the digital cheque is redeemed by the Merchant, a message can be sent to the checker, for example using the HBE, indicating that the processing platform has cleared the digital cheque. At this time the checker can close the sale by entering the value of the digital cheque into a cash register as "check tendered" or an appropriate designation.

The merchant's PoS system may require little or no change. The merchant can issue mobile computers to its checkers. Some checkers may own their own MCs, and the merchant may choose to accept digital cheques with HBE issued from checkers' privately owned MCs.

Example Ingress and Egress of Funds Relative to the Central Ledger

Funds can enter and exit the central ledger from other common currency instruments. When a user or a user device desires to add money into the central ledger, the processing platform can transfer that money into an account of the user or user device by a transfer-in method. A transfer-in method may be withdrawal from credit cards, automated clearing house (ACH) transfer, the mailing of a physical check, or the handling of physical cash instruments. The processing platform can credit an account of the user or user device after receiving the money. For such instruments that transaction fees exist, the processing platform may or may not reimburse those fees.

When a user or a user device desires to remove money from the central ledger, the processing platform can transfer that money out of an account of the user or user device by a transfer-out method. A transfer-out method can be ACH transfer, mailing of a physical check, or any similar means. The processing platform can debit an account of the user or user device prior to sending money using the transfer-out method. The processing platform can charge a fee for money removed. This fee can be different for different customers or for customers of different types.

Merchants or users may be charged for key pairs. For example, merchants or users may be charged periodically (e.g., monthly), or only once (e.g., during setup). The key pairs can be sold at a fixed price or at a negotiated price, which can include volume discounts for merchants with multiple active key pairs. The processing platform can have preferential or exclusive pricing for some users or merchants.

Example Fees

As described above, fees may be charged on any transfer into, out of, or within the system. These transfer fees may be proportional to transaction size, fixed, or a combination of the two. Fees may also be assessed for digital cheques issued by user devices with insufficient account balances. The processing platform may opt to cover the debt created, and in such case may charge interest or fees associated with the resulting debt.

Example Sourced Transactions

Transactions in the system disclosed herein can be "sourced" from the available balance in a buyer's account on the central ledger. If it may be advantageous for a buyer to issue a digital cheque that is to have its funds drawn automatically from a source known to the common ledger, but not part of it. For example, a buyer may wish to purchase merchandise from a merchant for $100, and may want the central ledger to withdraw $100 from a particular source, such as the buyer's checking account at his bank or from a particular credit card. The system can include interfaces for entering source information (SI) such as bank account information or credit card information to the central ledger. Buyers' mobile computers can store source accounts with identification strings (SAIS). A digital cheque can include a data field for storing an SAIS.

The interfaces for entering source information into the system can be different in different implementations. For example, the interfaces can include a webpage or an "app" on the MC. Such an interface can include a visual interface (e.g. using a digital camera and software implementing computer vision algorithms) for extracting source information from a physical check, a bank statement, a physical credit card, a credit card statement, or any combination thereof.

The system may not accept digital cheques with a blank SAIS field. If the system accepts digital cheques with a blank SAIS field, the blank SAIS field can be interpreted as implying that the processing platform should withdraw funds in the users' accounts or other default sources.

Digital cheques may contain fee sharing fields indicating fee sharing policy. Fee sharing fields can be bits, bit fields, or other numbers indicating fee sharing policy such as the buyer will pay fees associated with the sourcing or how the sellers or the buyers will split the fees associated with the sourcing. For example, a digital cheque can include a bit indicating that the buyer will (or will not) pay the sourcing fees associate with the source account (e.g., a credit card fee), and a second bit indicating that the buyer will (or will not) pay the transfer fee (e.g., the fee charged by the processing platform for transfer of funds from the buyer's account to the seller's account).

The system can make these fees visible or invisible to buyers or sellers. In some embodiments, sellers may be able to refuse digital cheques selectively based on their associated fees and the buyer's fee sharing policy.

Example Fund Verification

The seller may be connected to the processing platform via a network such as the internet even though the buyer may not be. For example, a merchant can have wired or wireless connectivity to the Internet through its private network connection even though the buyer may not be connected to the processing platform because of, for example, poor cellular telephone connectivity. When the seller has access to the Internet, it can verify the availability of funds in a buyer's account before accepting a transaction.

For example, the seller may be permitted to submit an endorsed version of the digital cheque issued by the buyer with an endorsement such as "query endorsement" (QE), indicating that the digital cheque is to be used only as a query. Such a query endorsement (QE) can be signed by the seller. On receiving a digital cheque with a QE, the processing platform can return information to the seller about the buyer and the buyer's ability to complete the transaction. For example, the processing platform may return information such as immediate fund availability (current central ledger balance, or if current central ledger balance meets or exceeds the value of the digital cheque), source information if the digital cheque is sourced by means of the SAIS field (e.g., including default source information if an overdraft on current funds is anticipated), or any combination therefor. Source information may include information about fees. Fee sharing fields can be used to determine if fee information is to be shared in response to a QE digital cheque (e.g. fee information may not be shared with a seller who is holding a digital cheque that indicates that the buyer is covering the fees).

Figure 33A:
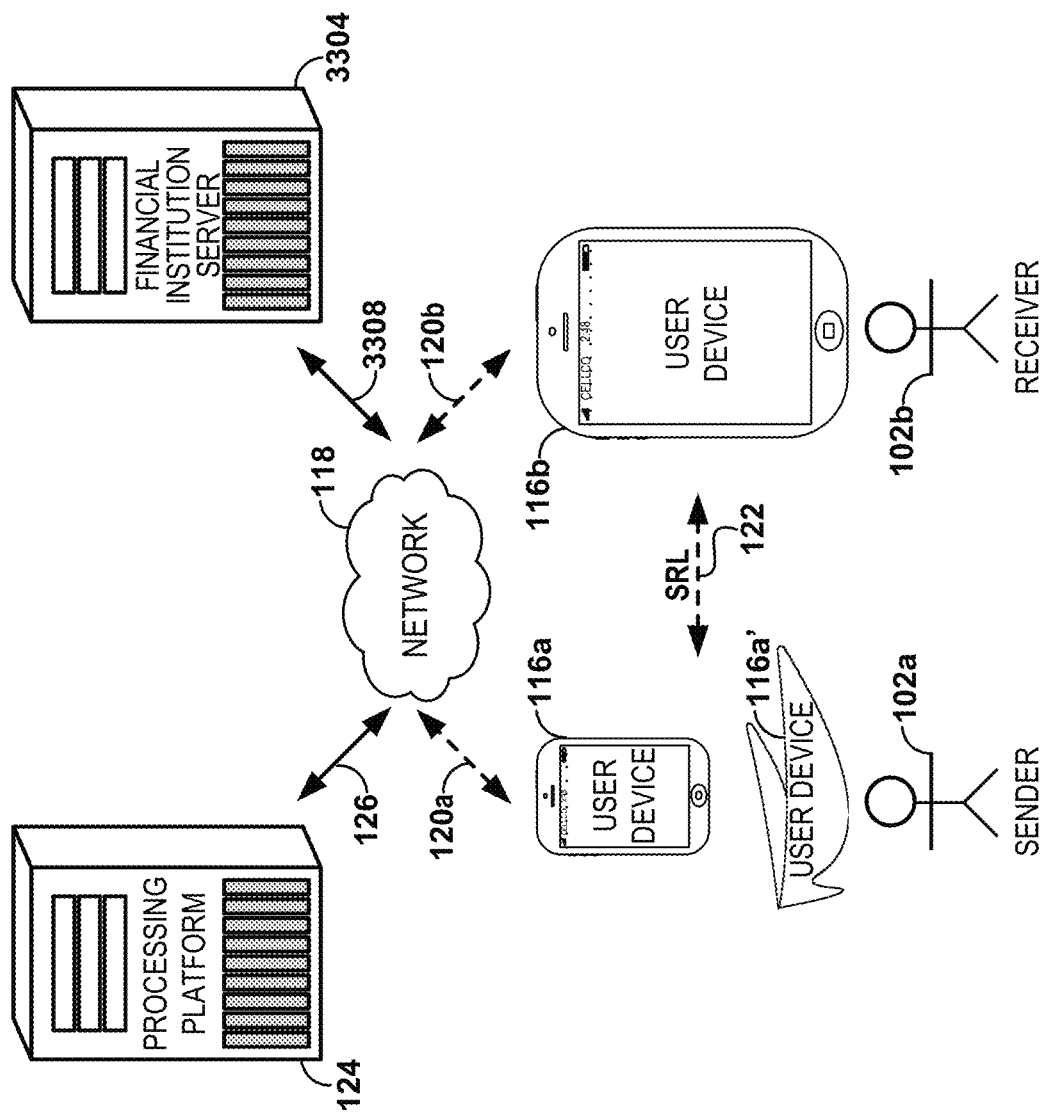
FIG. 33A-33B schematically illustrate one embodiment of securely exchanging cryptographically signed digital cheques.

Example Secure Exchange Cryptographically Signed Digital Cheques Involving a Financial Institution The systems and methods for securely exchanging contents and records (e.g., cryptographically signed digital cheques) of the present disclosure can be implemented by one or more user devices, one or more processing platforms, and one or more financial institution servers. FIG. 33 schematically illustrates another embodiment of securely exchanging cryptographically signed digital cheques involving one financial institution. In the non-limiting example embodiment shown in FIG. 33, users can operate user devices to create, send, receive, modify, or redeem individual records 100, such as cryptographically signed digital cheques. For example, a sender 102a of a digital cheque can operate a cheque sender device 116a or 116a'. A receiver 102b of the digital cheque can operate a cheque receiver device 116b.

The user devices, for example the cheque sender device 116a and the cheque receiver device 116b, can be identical or can be different. The user devices can include cellular telephones, tablet computers, e-readers, smart watches, head mounted augmented, virtual, or mixed reality display systems, wearable display systems, or computers. The user device 116a or 116b can be in communication with other devices on a network 118 using a communication link 120a, 120b, for example a cellular communication link. The network 118 can be a local area network (LAN), wide area network (WAN), or the Internet, accessible by wired or wireless communication links, e.g., implementing the Institute of Electrical and Electronics Engineers (IEEE) 802.11 standards.

When sending the digital cheque 100, one or both of the cheque sender device 116a and the cheque receiver device 116b can be offline and not connected to the network 118. The cheque sender 102a, using the cheque sender device 116a, can send the cryptographically signed digital cheque 100 to the cheque receiver 102b using a short range link (SRL) 122. The short range link (SRL) 122 can be a peer-to-peer radio or other links through which the user device 116a or 116b can communicate with one another. The short range link (SRL) 122 can be based on the Infrared Data Association (IrDA)/Infrared Physical Layer Specification (IrPHY), Bluetooth®, Near Field Communication (NFC), ad hoc 802.11, or any other wired or wireless communication methods or systems.

A processing platform 124, operated by the service provider 104, can be in communication with other devices on the network 118, for example the user devices 116a, 116b, using a communication link 126. A financial institution server 3304, operated by the service provider 104 or a financial institution affiliated with the processing platform 104, can be in communication with other devices on the network 118, for example, the processing platform 124. The communication link 120a, 120b, 126, or 3304 can be wired or wireless communications, cellular communication, Bluetooth®, local area network (LAN), wide local area network (WLAN), radio frequency (RF), infrared (IR), or any other communication methods or systems.

Figure 33B:
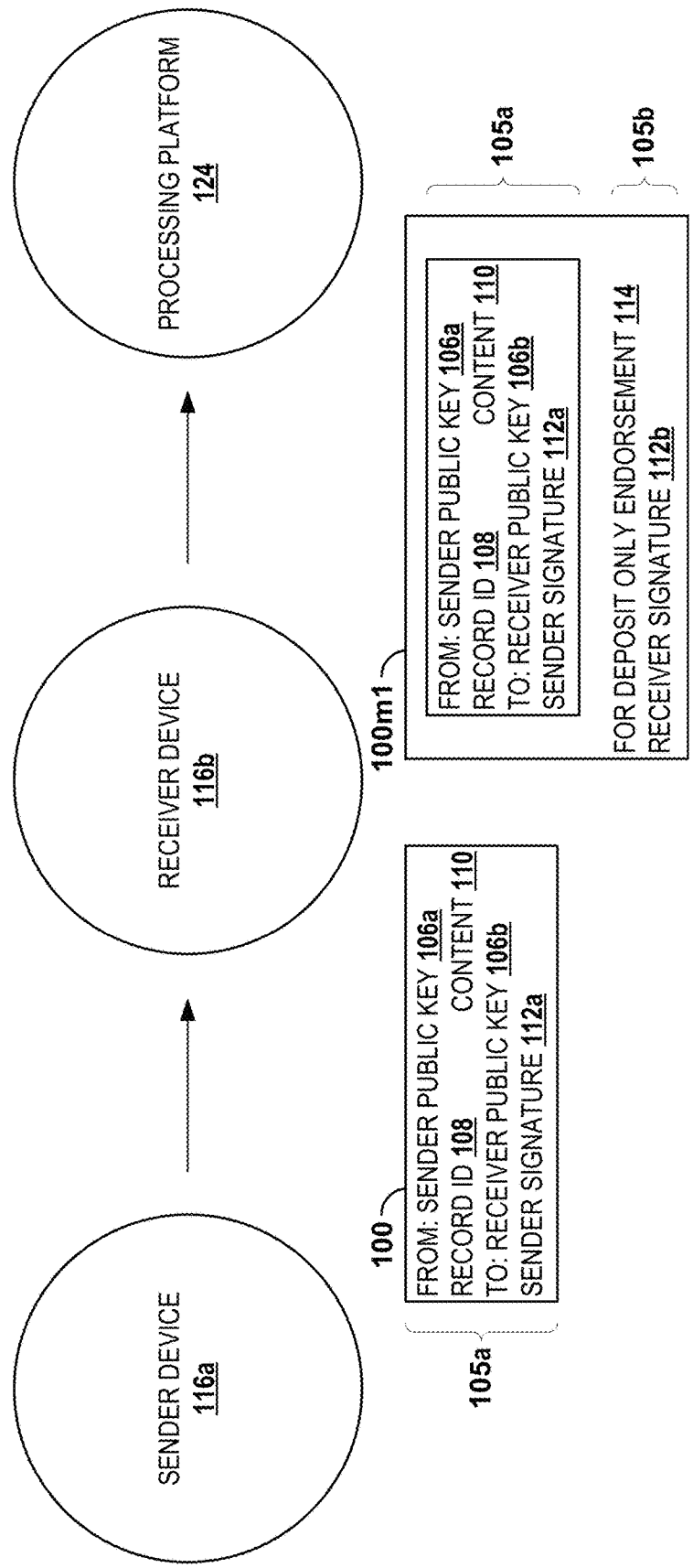

Users 102a or 102b can redeem cryptographically signed digital cheques with the processing platform 124. For example, the sender 102a operating the cheque sender device 116a can be a buyer of a product or a service from a seller, who is the receiver 102b operating the cheque receiver device 116b. Referring to FIG. 33B, a content 110 of a digital cheque 100 can comprise an amount of cryptocurrency (or real currency) for transferring from an account of the sender 102a to an account of the receiver 102b or instructions for the processing platform 124 to transfer an amount of cryptocurrency from an account of the sender 102a to an account of the receiver 102b (or from the account of the cheque sender device 116a to the account of the cheque receiver device 116b). The cheque sender device 116a can digitally sign the digital cheque 100 using the sender device private key and electronically communicates the digital cheque 100 to the receiver device 116b. The receiver device 116b endorses the cheque with an endorsement 114 (e.g., in this context, the endorsement may be a "For Deposit Only endorsement") and digitally signs the digital cheque using the receiver device private key to create a modified digital cheque 100m1. The receiver device 116b communicates the modified digital cheque 100m1 to the service provider 104, which redeems the modified digital cheque 100m1.

The processing platform 124 can verify the modified digital cheque 100m1 was authentically signed by both the sender device 116a and the receiver device 116b (using their respective public keys). The processing platform 124 can in turn instruct a financial institution server 3304 to transfer the amount of cryptocurrency from the account of the sender 102a to the account of the receiver 102b (or from the account of the cheque sender device 116a to the account of the cheque receiver device 116b). The financial institution server 3304 can maintain the account of the sender 102a and the account of the receiver 102b. In some implementations, the processing platform 124 can also keep track of the balance of the account of the sender 102a and the balance of the account of the receiver 102b. Accordingly, in this non-limiting example, the record functions as a cheque in a digital cheque system and can be used by a buyer (the sender 102a) to pay a seller (the receiver 102b) for the asset. The service provider 104 can act as a clearinghouse for at least some of this exchange (e.g., to debit the buyer's cryptocurrency or real currency account and credit the seller's cryptocurrency account).

Figure 33C:
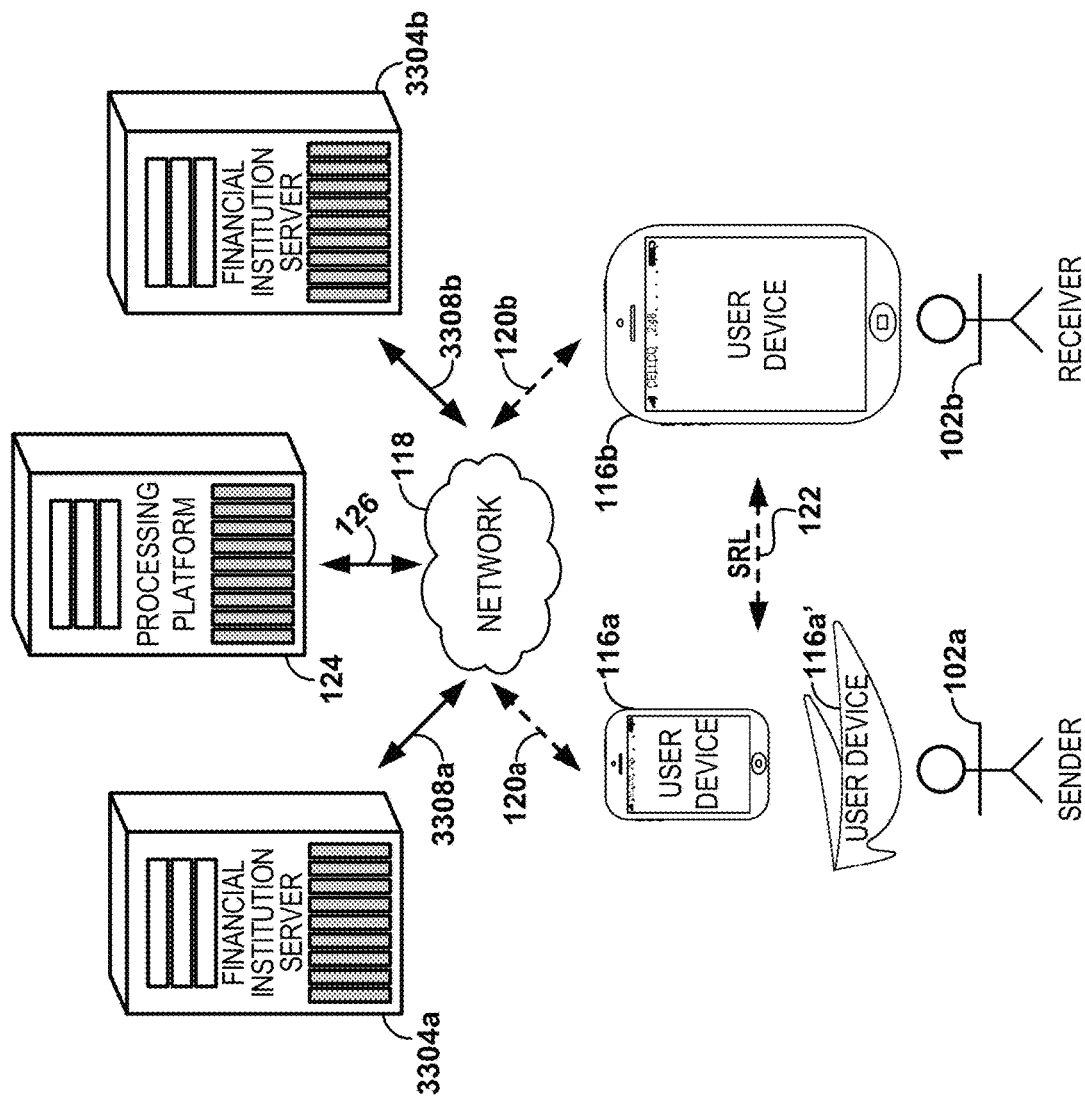
FIG. 33C schematically illustrates another embodiment of securely exchanging cryptographically signed digital cheques.

FIG. 33C schematically illustrates another embodiment of securely exchanging cryptographically signed digital cheques. After receiving a modified digital cheque 100m1, the processing platform 124 can verify the modified digital cheque 100m1 was authentically signed by both the sender device 116a and the receiver device 116b (using their respective public keys). The processing platform 124 can in turn instruct a server 3304a of a financial institution to transfer the amount of cryptocurrency from the account of the sender 102a at the financial institution to the account of the receiver 102b at another financial institution (or from the account of the cheque sender device 116a at a financial institution to the account of the cheque receiver device 116b at another financial institution). The financial institution server 3304a can maintain the account of the sender 102a. The financial institution server 3304b can maintain the account of the receiver 102b. After receiving the transfer of the amount of cryptocurrency, the server 3304b of the other financial institution can update the balance of the account of the receiver 102b at the other financial institution (or the account of the cheque receiver device 116b). In some implementations, the processing platform 124 can also keep track of the balance of the account of the sender 102a and the balance of the account of the receiver 102b.

In some embodiments, some of the terms described herein can have meanings as defined in 15 U.S.C. § 1693 (Definitions for Consumer Protection). For example, a financial institution can be a State or National bank, a State or Federal savings and loan association, a mutual savings bank, a State or Federal credit union, or any other person who, directly or indirectly holds an account belonging to a consumer. As another example, an account can be a demand deposit, savings deposit, or other asset account (other than credit balance).

Example Digital Cheque

In some embodiments, a cheque receiver can receive a cryptographically signed digital cheque from a cheque sender. FIG. 4 is an interaction diagram illustrating one embodiment of securely exchanging and redeeming an individual record created for one record receiver. A cheque receiver 102b (e.g., a payee), using a cheque receiver device 116b, can request a digital cheque 100 from a cheque sender 102a (e.g., a payer) by sending a payment request 402 to a cheque sender device 116a. The cheque receiver 102b can send the cheque sender 102a the payment request 402 using a short range link (SRL) 122 at interaction 404. The payment request 402 can comprise a content, for example a payment amount 110b and a public key 106b of the cheque receiver device. The payment amount 110b can be an amount that the cheque receiver 102b expects to receive from the cheque sender 102a. In some embodiments, the public key 106b of the cheque receiver device can uniquely identify the cheque receiver device 116b. In some embodiments, the public key 106b of the cheque receiver device can uniquely identify the cheque receiver 102b. The public key 106b can be in the common records, which can be stored in the secure element (SE) 204b in some embodiments.

Example Partner Identification

Figure 34A:
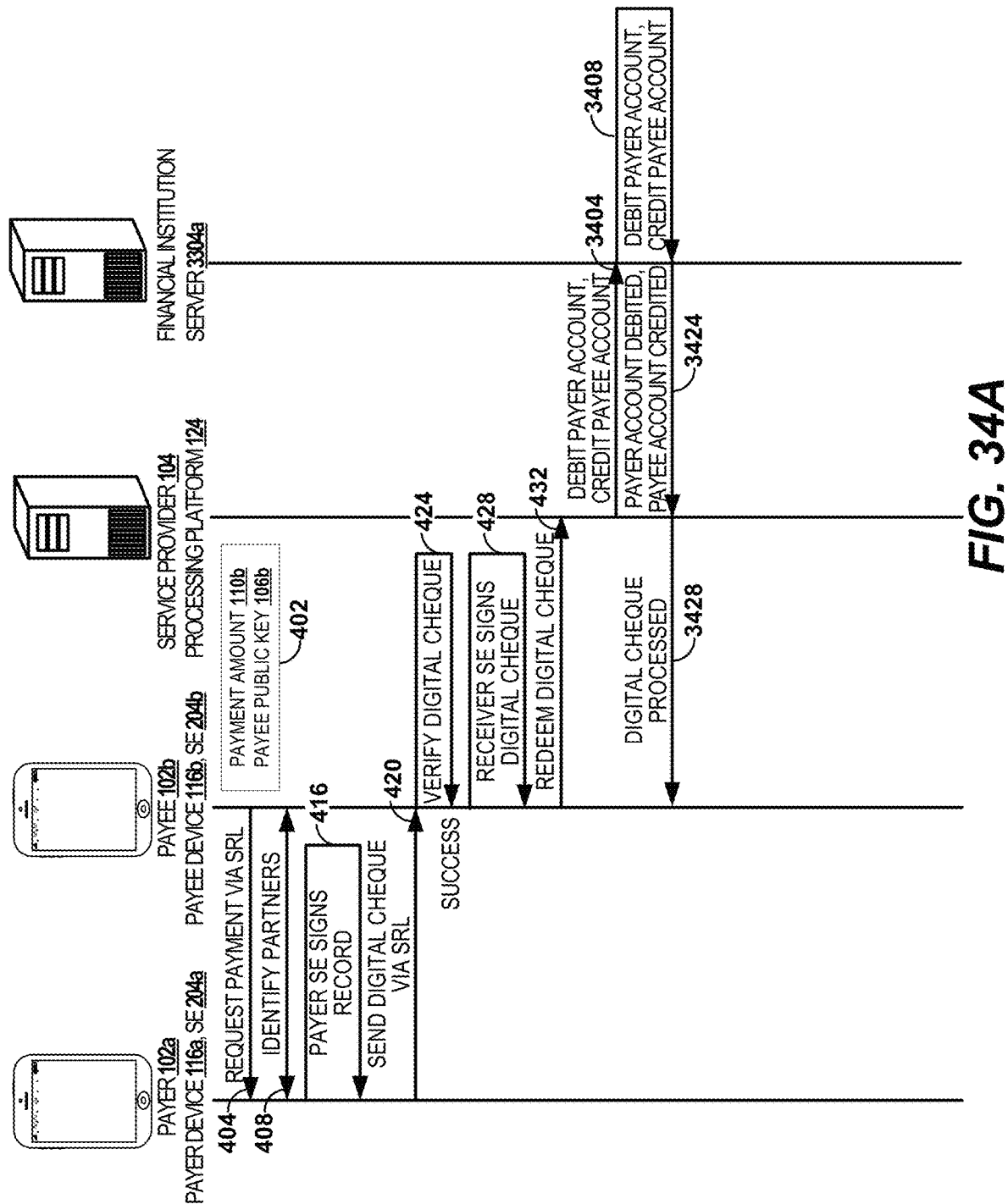
FIG. 34A is an interaction diagram illustrating one embodiment of securely exchanging and redeeming a cryptographically signed digital cheque.

With reference to FIG. 34A, at interaction 408, the cheque sender device 116a, using its transaction partner identifier, can confirm the identity of the cheque receiver device 116b by partner identification. Because the payment request 402 may have been transmitted electronically to the cheque receiver device 116a, the cheque receiver device 116a may be unsure about the identity of the user device sending the payment request 402. Partner identification can be advantageous. For example, with partner identification, the cheque sender device 116a can distinguish payment requests 402 from the cheque receiver device 116b and from malicious users. As another example, with partner identification, a malicious user cannot receive a digital cheque not intended for it. As yet another example, with partner identification, a malicious user, even after receiving a digital cheque not intended for it, cannot redeem the digital cheque.

Example Digital Cheque Creation

After the secure element (SE) 204a of the cheque sender device 116a verifies authentication information of the record sender, the secure element (SE) 204a can sign a digital cheque 100 at interaction 416. Prior to signing the individual record 100 at interaction 416, the secure element (SE) 204a can require both the provision of a block to be digitally signed, for example a block 105a of the digital cheque 100, and the authentication of the record sender 102a. Non-limiting examples of authentication can include passphrase authentication, biometric authentication such as fingerprint authentication or iris authentication, biological data authentication, or any combination thereof. Biometric authentication can utilize a biometric template based on, for example, fingerprints or eye images. The secure element (SE) 204a can implement a biometric fuzzy vault for recognizing the biometric template.

Referring to FIG. 33B, the digital cheque 100 can be a digital object comprising one or more blocks. The digital cheque 100 can comprise a block 105a, and the block 105a can comprise a public key 106a of the cheque sender device 116a in the "from field," a public key 106b of the cheque receiver device in the "to field," a cheque ID 108, a payment amount 110a, and a cheque sender signature 112a of the block 105a. The public key 106a of the cheque sender device 116a can identify the originator of the digital cheque 100, the cheque sender device 116a. The public key 106b of the cheque receiver device can identify the original recipient of the digital cheque 100, the cheque receiver device 116b. The payment amount 110a can vary. The payment amount 110a in the digital cheque 100a and the payment amount 110b requested in FIG. 34A can be the same, similar, related, or different. In the context of cryptocurrency, the payment amount sent 110a and the payment amount requested 110b can be the same amount of a cryptocurrency. The payment amount sent 110a and the payment amount requested 110b can be similar or related. For example, the payment amount requested 110b can be a pre-tax amount, and the payment amount sent 110a can be an after-tax amount. As another example, the payment amount requested 110b can be a pre-tip amount, and the payment amount sent 110a can be an after-tip amount.

With reference to FIG. 34A, at interaction 420, the cheque sender 102a can send the digital cheque 100 to the cheque receiver 102b, for example, in a peer-to-peer manner using a short range link (SRL). Once in the possession of the cheque receiver 102b, the cheque receiver 102b can verify the digital cheque 100 at interaction 424. Verifying the digital cheque 100 can comprise authenticating the cheque sender signature 112a. Authenticating the cheque sender signature 112a can comprise determining, using the public key 106a of the cheque sender device, whether the cheque sender signature 112a has been created using the private key 210 of the cheque sender device. The public key 106a of the cheque sender device can be obtained by a number of ways. For example, the public key 106a of the cheque sender device can be obtained from the digital cheque 100. As another example, the public key 106a of the cheque sender device can be obtained from the common records 206 of the cheque receiver device 116b.

Example Individual Record Redemption—One Financial Institution

With reference to FIGS. 33B and 34A, after successfully verifying the digital cheque 100, the cheque receiver device 116b can, using its secure element 204b, create and sign the modified digital cheque 100m1 at interaction 428. Prior to signing the modified digital cheque 100m1 at interaction 428, the secure element (SE) 204b can require both the provision of a block to be digitally signed, for example a block 105b of the modified digital cheque 100m1, and authentication information 512b of the cheque receiver. The modified digital cheque 100m1 can comprise the block 105a of the digital cheque 100 and an endorsement block 105b. For example, the endorsement can be a "for deposit only endorsement" (FPOE) 114 that, together with the public key 106b of the cheque receiver, specifies that the modified digital cheque 100m1 can only be redeemed by the cheque receiver 102b. In the context of cryptocurrency, after receiving a digital cheque a "for deposit only endorsement" (FDOE), the processing platform 124 can deposit or instruct to be deposited an amount of cryptocurrency to the account of the cheque receiver 102b but will not recognize a further endorsement to another party.

After signing the modified digital cheque 100m1, the cheque receiver 102b can redeem the modified digital cheque 100m1 with the processing platform 124 at interaction 432 when the cheque receiver 102b is in communication with the processing platform 124 through, for example, the network 118. On redemption, a service provider 104 operating the processing platform 124 can process at interaction 436 the modified individual record 100m1 by verifying the authenticity of one or more signatures in the chain of blocks 105a and 105b in the modified digital cheque 100m1, for example the cheque sender signature 112a and the cheque receiver signature 112b. After successful verification, the processing platform 124 can perform based on the payment amount 110a of the modified digital cheque 100m1.

The processing platform 124 can instruct a financial institution server 3304 to transfer the payment amount 110a of, for example, cryptocurrency or real currency from the account of the sender 102a to the account of the receiver 102b (or from the account of the cheque sender device 116a to the account of the cheque receiver device 116b). The financial institution operating the server 3304a can maintain the account of the sender 102a and the account of the receiver 102b. At interaction 3404, the processing platform 124 can instruct the financial institution or the server 3304a operated by the financial institution to debit the sender account and to credit the receiver account by the payment amount 110a. After authenticating the processing platform 124 and sufficiency of fund in the sender account, the financial institution can debit the sender account and credit the receiver account by the payment amount 110a at interaction 3408. After receiving an indication from the financial institution server 3304a that the accounts have been debited and credited at interaction 3424, the processing platform 124 can send an indication to the receiver device 116b that the processing platform 124 has performed based on the payment amount sent 110a of the modified digital cheque 100m1 at interaction 3428. In some implementations, the processing platform 124 can keep track of the balance of the account of the sender 102a and the balance of the account of the receiver 102b and update the balances of the accounts after interaction 3424.

Example Individual Record Redemption—Multiple Financial Institutions

Figure 34B:
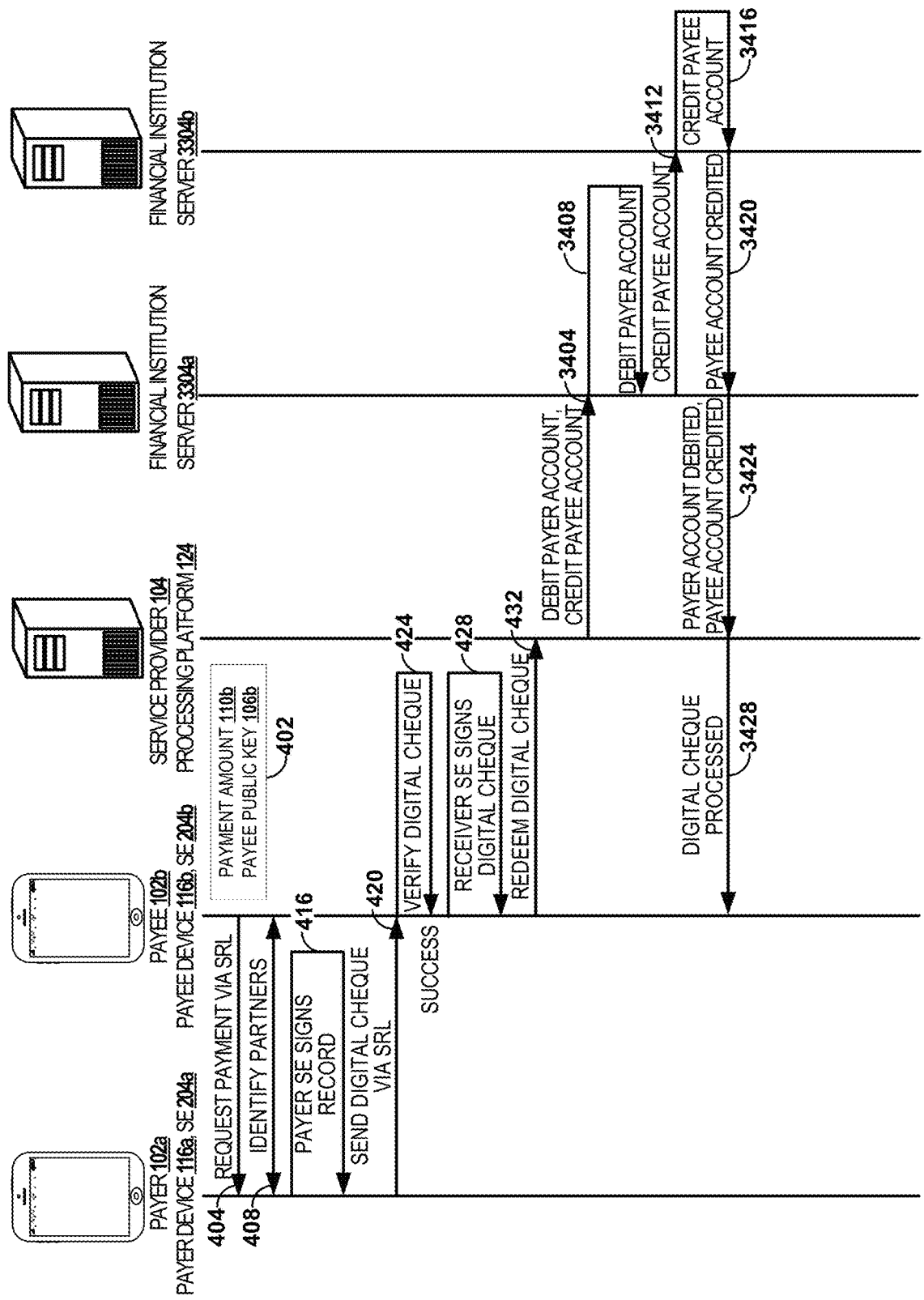
FIG. 34B is an interaction diagram illustrating another embodiment of securely exchanging and redeeming a cryptographically signed digital cheque FIG. 35 schematically illustrates an example of a wearable display system.

FIG. 34B is an interaction diagram illustrating another embodiment of securely exchanging and redeeming a cryptographically signed digital cheque involving two financial institutions. The payment request 402 and interactions 404, 408, 416, 420, 424, 428, 432, and 436 in FIG. 34B are as described with reference to FIG. 34A. After successful verification at interaction 436, the processing platform 124 can perform based on the payment amount 110a of the modified digital cheque 100m1.

The processing platform 124 can instruct a financial institution server 3304 to transfer the payment amount sent 110a from the account of the sender 102a to the account of the receiver 102b (or from the account of the cheque sender device 116a to the account of the cheque receiver device 116b). The financial institution operating the server 3304a can maintain the account of the sender 102a. The financial institution operating the server 3304a can maintain the account of the receiver 102b. At interaction 3404, the processing platform 124 can instruct the financial institution or the server 3304a operated by the financial institution to debit the sender account and to credit the receiver account by the payment amount requested 110a. After authenticating the processing platform 124 and sufficiency of fund in the sender account, the financial institution can debit the sender account at interaction 3408. The financial institution server 3304a can in turn request the other financial institution or the server 3304b operated by the other financial institution to credit the receiver account by the payment amount sent 110a at interaction 3412. After successfully crediting the receiver account by the payment amount sent 110a at interaction 3412, the server 3304b can send an indication that the receiver account has been credited successfully to the server 3304a of the financial institution.

After receiving an indication from the financial institution server 3304a that the accounts have been debited and credited at interaction 3424, the processing platform 124 can send an indication to the receiver device 116b that the processing platform 124 has performed based on the payment amount sent 110a of the modified digital cheque 100m1 at interaction 3428. In some implementations, the processing platform 124 can keep track of the balance of the account of the sender 102a and the balance of the account of the receiver 102b and update the balances of the accounts after interaction 3424.

Example Payment Types

The payment from the sender 102a to the receiver 102b can be analogous to a check transaction, a debit transaction, a credit card transaction, an automated clearing house (ACH) transaction, a wire transfer, or a combination thereof. A check-type transaction can require an "item," for example, under the uniform commercial code (UCC). A check transaction can be considered a contract between a financial institution (e.g., the financial institution operating the server 3304a and a customer owning an account at the financial institution (e.g., the sender 102a). Payment can be complete either (1) immediately if processed over the counter (e.g., a virtual counter) at the financial institution, or (2) at midnight the day the modified check 100m1 is received by financial institution. The financial institution can be liable for fraudulent activity or unauthorized payments unless account holder is negligent.

A debit-type transaction can be considered an exception to UCC definition of item as a debit transaction can involve a "signal" that completes the transaction. Payment can be completed at time of sale (e.g., when a seller, a payee, or a cheque receiver receives a digital cheque) with an immediate authorization to the financial institution to debit the account to the seller. In some embodiments, unauthorized payments subject to cheque sender "deductible" liability. For example, if an unauthorized payment is reported by a purported cheque sender with a short time period (e.g., two days), the deductible can be $50. If an unauthorized payment is reported by a purported cheque sender within a medium time period (e.g., 60 days), the deductible can be $500. If an unauthorized payment is not reported within the medium time period, the purported cheque sender is liable for the unauthorized payment. The financial institution of the purported cheque sender can be liable for remainder of unauthorized balance unless account holder is negligent.

With a credit card-type transaction, payment is complete when cheque sender pays the financial institution (e.g., a credit card company). Disputes on charges may not be permitted if a statement has been paid (two billing cycles to bring up a dispute). The financial institution is always liable as long as statement is not yet paid.

An ACH-type transaction can include credit ACH payments and debit ACH payments. With credit ACH payments, the financial institution can cancel payment for any reason. With debit ACH payments, the account holder (e.g., the cheque sender) has 1 business day to halt a payment, otherwise it goes through and customer has 15 days to notify of unauthorized payment. Payment can be considered complete at time of sale, or up one day later for debit ACH or two days for credit ACH.

Wire transfers can be transfers between financial institutions. The Electronic Funds Transfer Act permits wire transfers involving natural persons. A wire transfer involves two stages of payment orders: First, payer or cheque sender gives transfer information to a first financial institution, such as the financial institution operating the server 3304a (or the processing platform 124) to transfer money to a second financial institution (e.g., the other financial institution operating the server 3304b). Second, the first financial institution can give the second financial institution instructions on the transfer. Payment can be considered complete when step 2 is complete, whether or not the funds were actually transferred from the first financial institution to the second financial institution. So the cheque sender or payer is liable to the cheque receiver payee very fast, but the second financial institution can be liable if they made a mistake in the transfer.

In some implementations, the systems and methods disclosed herein can be used for complex bargaining. For example, a seller or a vendor can sell at one price for debit-type transactions because the seller may get the funds sooner. However, the buyer may be malicious, the seller may automatically blocks debit requests for payment of goods less than $50 due to the deductible threshold. As another example, a seller may request a wire transfer payment because they know that verification between financial institutions will occur. However, the buyer may reject such request because the buyer may not want to pay for the two steps of transfer fees unless fee sharing is involved.

Example Wearable Display System

The user device 116 can be or can be included in a wearable display device, which may advantageously provide a more immersive virtual reality (VR), augmented reality (AR), or mixed reality (MR) experience, wherein digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image, and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 35:
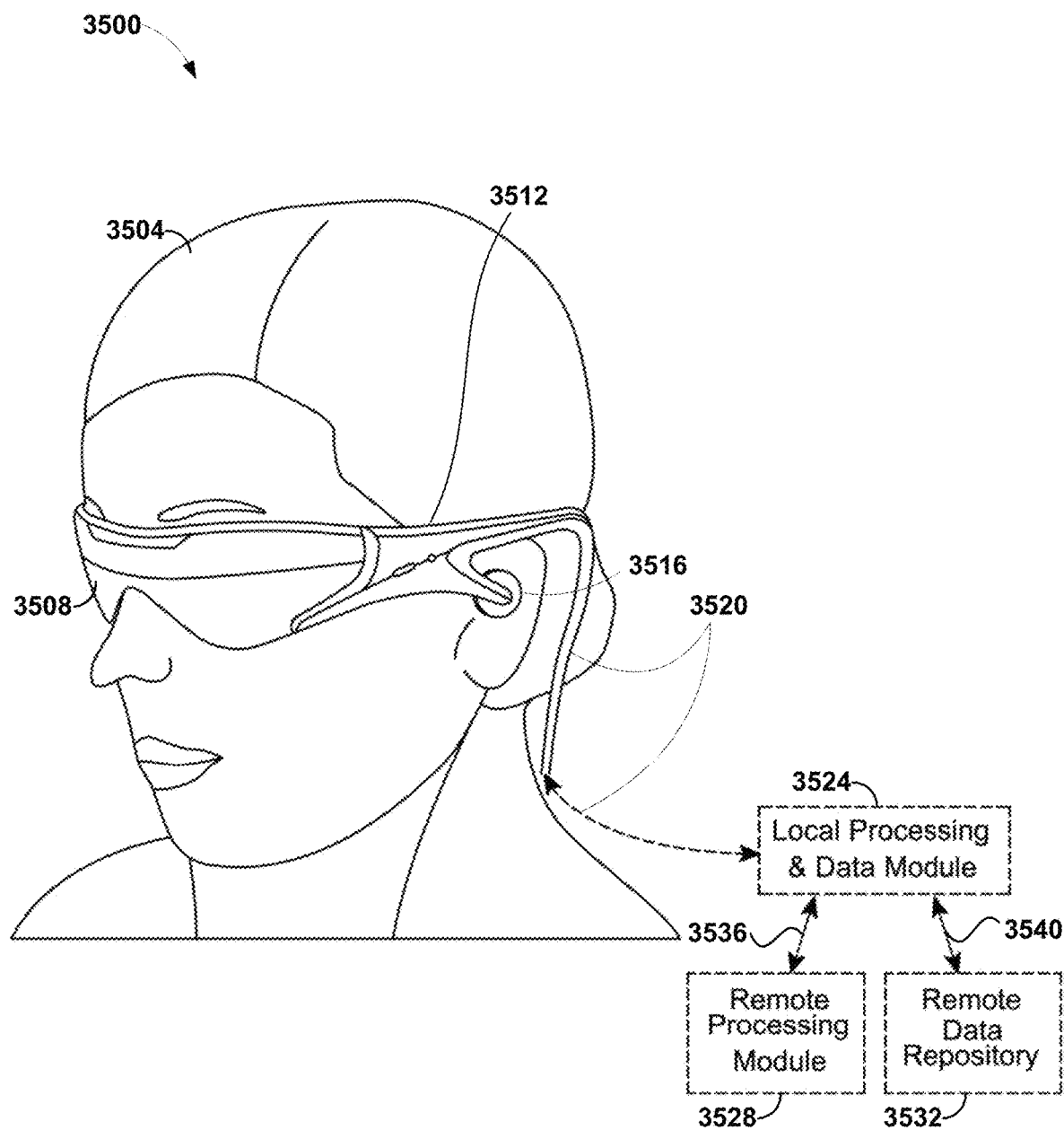

FIG. 35 illustrates an example of a wearable display system 3500 that can be used to present an AR, MR, or VR experience to the wearer 3504. The wearable display system 3500 may be programmed to perform any of the applications or embodiments described herein. The display system 3500 includes a display 3508, and various mechanical and electronic modules and systems to support the functioning of that display 3508. The display 3508 may be coupled to a frame 3512, which is wearable by a display system wearer or viewer 3504 and which is configured to position the display 3508 in front of the eyes of the wearer 3504. The display 3508 may be a light field display. In some embodiments, a speaker 35616 is coupled to the frame 3512 and positioned adjacent the ear canal of the user in some embodiments, another speaker, not shown, is positioned adjacent the other ear canal of the user to provide for stereo/shapeable sound control. The display 3508 is operatively coupled 3520, such as by a wired lead or wireless connectivity, to a local data processing module 3524 which may be mounted in a variety of configurations, such as fixedly attached to the frame 3512, fixedly attached to a helmet or hat worn by the user, embedded in headphones, or otherwise removably attached to the user 3504 (e.g., in a backpack-style configuration, in a belt-coupling style configuration).

The local processing and data module 3524 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 3512 or otherwise attached to the wearer 3504), such as image capture devices (such as cameras), microphones, inertial measurement units, accelerometers, compasses, GPS units, radio devices, and/or gyros; and/or (b) acquired and/or processed using remote processing module 3528 and/or remote data repository 3532, possibly for passage to the display 3508 after such processing or retrieval. The local processing and data module 3524 may be operatively coupled to the remote processing module 3528 and remote data repository 3532 by communication links 3536, 3540, such as via a wired or wireless communication links, such that these remote modules 3528, 3532 are operatively coupled to each other and available as resources to the local processing and data module 3524.

In some embodiments, the remote processing module 3528 may comprise one or more processors configured to analyze and process data and/or image information such as video information captured by an image capture device. The video data may be stored locally in the local processing and data module 3524 and/or in the remote data repository 3532. In some embodiments, the remote data repository 3532 may comprise a digital data storage facility, which may be available through the internet or other networking configuration in a "cloud" resource configuration. In some embodiments, all data is stored and all computations are performed in the local processing and data module 3524, allowing fully autonomous use from a remote module.

In some implementations, the local processing and data module 3524 and/or the remote processing module 3528 are programmed to perform embodiments of the systems and methods disclosed herein. The image capture device can capture video for a particular application (e.g., video of the wearer's eye for an eye-tracking application or video of a wearer's hand or finger for a gesture identification application). The video can be analyzed by one or both of the processing modules 3524, 3528. In some cases, off-loading at least some of the analysis to a remote processing module (e.g., in the "cloud") may improve efficiency or speed of the computations. The parameters of the systems and methods disclosed herein can be stored in data modules 3524 and/or 3532.

The results of the analysis can be used by one or both of the processing modules 3524, 3528 for additional operations or processing. For example, biometric identification, eye-tracking, recognition or classification of gestures, objects, poses, etc. may be used by the wearable display system 3500. For example, the wearable display system 3500 may analyze video captured of a hand of the wearer 3504 and recognize a gesture by the wearer's hand (e.g., picking up a real or virtual object, signaling assent or dissent (e.g., "thumbs up", or "thumbs down"), etc.), and the wearable display system 3500 may perform an appropriate action in response to the wearer's gesture (e.g., moving the virtual object, performing an additional operation based on the wearer's assent/dissent). As another example, video of the wearer's eye(s) can be analyzed by the wearable display system 3500 to determine the direction of the gaze of the wearer 3504 through the display 3508. As yet another example, the processing modules 3524, 3528 may analyze video of the wearer's surroundings to identify (or count) objects of a particular class of objects (e.g., to identify "cats" or "cars" near the wearer 3504). The processing modules 3524, 3528 of the wearable display system 3500 can be programmed to perform any of the methods or video or image processing applications described herein or any of the methods or applications for secure exchange of cryptographically signed records described herein. For example, embodiments of the wearable display system 3500 can be configured as the user device 116*a* (e.g., sender 102*a*) or the user device 116*b* (e.g., receiver 102*b*) and used to create, send, receive, modify, or redeem the records 100 in a cryptographically secure way as described herein.

Additional Aspects

Secure Exchange of Cryptographically Signed Records

In a 1st aspect, a method for securely exchanging cryptographically signed records is disclosed. The method is performed under control of a hardware processor and comprises: receiving a receiver individual record from a record receiver device, wherein the receiver individual record comprises a sender individual record and a receiver signature of the receiver individual record, wherein the sender individual record is created by a record sender device after receiving a record content request from the record receiver device and identifying the record receiver device, wherein the sender individual record comprises a record content, a sender public key of the record sender device, a receiver public key of the record receiver device, and a sender signature of the sender individual record, wherein the sender signature is created using a sender private key of the record sender device, wherein the sender public key and the sender private key form a sender public-key cryptographic pair, wherein the receiver individual record is created by the record receiver device after receiving the sender individual record from the record sender device and verifying the sender individual record using the sender public key while not necessarily in communication with a processing platform, wherein the receiver signature is created using a receiver private key of the record receiver device, and wherein the receiver public key and the receiver private key form a receiver public-key cryptographic pair; verifying the receiver individual record; and performing for the record receiver device as instructed by the receiver individual record.

In a 2nd aspect, the method of aspect 1, wherein the content request comprises the receiver public key and a requested content, and wherein the record content is related to the requested content.

In a 3rd aspect, the method of any one of aspects 1-2, wherein identifying the record receiver device comprises performing partner identification, wherein partner identification comprises content authorization, knocking, physical indication, beam forming, prior arrangement, cursory validation, or any combination thereof.

In a 4th aspect, the method of any one of aspects 1-3, wherein the sender individual record further comprises a record identifier.

In a 5th aspect, the method of aspect 4, wherein the record identifier is a monotonically increasing number.

In a 6th aspect, the method of any one of aspects 1-5, wherein receiving the sender individual record from the record receiver device comprises receiving the sender individual record from the record sender device via a short range link directly or through an intermediate device.

In a 7th aspect, the method of aspect 6, wherein the short range link is a peer-to-peer communication link.

In a 8th aspect, the method of any one of aspects 1-7, wherein the receiver individual record further comprises a for redemption only endorsement, a query endorsement, a malicious record endorsement, or any combination thereof.

In a 9th aspect, the method of any one of aspects 1-8, wherein the sender individual record is created after receiving authentication information of a record sender by the record sender device, and wherein the receiver individual record is created after receiving authentication information of a record receiver by the record receiver device.

In a 10th aspect, the method of any one of aspects 1-9, wherein verifying the sender individual record comprises: using the sender public key to determine the sender signature is created using the sender private key; and using the sender public key to determine the sender signature is created using the sender private key.

In a 11th aspect, the method of any one of aspects 1-10, further comprising providing common records to the record sender device and the record receiver device, wherein the common records comprise the sender public key and the receiver public key.

In a 12th aspect, the method of any one of aspects 1-10, further comprising: providing common records to the record sender device, wherein the common records comprise the sender public key and the receiver public key; and causing the record sender device to send the common records to the record receiver device.

In a 13th aspect, the method of any one of aspects 1-10, further comprising: providing common records to the record receiver device, wherein the common records comprise the sender public key and the receiver public key; and causing the record receiver device to send the common records to the record sender device.

In a 14th aspect, the method of any one of aspects 11-13, wherein the common records further comprise a third signature of the common records, wherein the common records further comprise a third signature of the common records, and wherein the third signature is created using a third private key of the processing platform.

In a 15th aspect, the method of any one of aspects 11-14, further comprising: generating the common records from central records, wherein the central records comprise the sender public key, the receiver public key, a user record status of the record sender device, and a user record status of the record receiver device.

In a 16th aspect, the method of aspect 15, further comprising: determining the user record status of the record sender prohibits the processing platform to perform the record receiver device as instructed by the receiver individual record; and adding the payer device to a demerit list.

In a 17th aspect, a method for securely exchanging cryptographically signed records is disclosed. The method is performed under control of a hardware processor and comprises: receiving a content request from a record receiver device; identifying the record receiver device; creating a sender individual record, wherein the sender individual record comprises a record content, a sender public key of a record sender device, a receiver public key of the record receiver device, and a sender signature of the sender individual record, wherein the sender signature is created using a sender private key of the record sender device, and wherein the sender public key and the sender private key form a sender public-key cryptographic pair; sending the sender individual record to the record receiver device; and receiving an indication of the record receiver device: receiving the sender individual record; verifying the sender individual record using the sender public key while not necessarily in communication with a processing platform; creating a receiver individual record, wherein the receiver individual record comprises the sender individual record and a receiver signature of the receiver individual record, wherein the receiver signature is created using a receiver private key of the record receiver device, and wherein the receiver public key and the receiver private key form a receiver public-key cryptographic pair; redeeming the receiver individual record with the processing platform; and receiving a performance by the processing platform as instructed by the receiver individual record.

In a 18th aspect, the method of aspect 17, wherein the content request comprises the receiver public key and a requested content, and wherein the record content is related to the requested content.

In a 19th aspect, the method of any one of aspects 17-18, wherein the record receiver device comprises performing partner identification, wherein partner identification comprises content authorization, knocking, physical indication, beam forming, prior arrangement, cursory validation, or any combination thereof.

In a 20th aspect, the method of any one of aspects 17-19, wherein the sender individual record further comprises a record identifier.

In a 21st aspect, the method of aspect 20, wherein the record identifier is a monotonically increasing number.

In a 22nd aspect, the method of any one of aspects 17-21, wherein sending the sender individual record to the record receiver device comprises sending the sender individual record to the record receiver device via a short range link directly or through an intermediate device.

In a 23rd aspect, the method of aspect 22, wherein the short range link is a peer-to-peer communication link.

In a 24th aspect, the method of any one of aspects 17-23, wherein the receiver individual record further comprises a for redemption only endorsement, a query endorsement, a malicious record endorsement, or any combination thereof.

In a 25th aspect, the method of aspect 24, wherein the receiver individual record further comprises a query enforcement, wherein performing for the record receiver device as instructed by the receiver individual record comprises sending a query result to the record receiver device, and wherein the query result indicates the processing platform would perform as instructed by the receiver individual record.

In a 26th aspect, the method of any one of aspects 17-25, wherein creating the sender individual record comprises receiving authentication information of a record sender by the record sender device, and wherein creating the receiver individual record comprises receiving authentication information of a record receiver by the record receiver device.

In a 27th aspect, the method of any one of aspects 17-26, wherein verifying the sender individual record comprises using the sender public key to determine the sender signature is created using the sender private key.

In a 28th aspect, the method of any one of aspects 17-27, wherein the sender signature is created by a Secure Element of the record sender device using the sender private key, and wherein the sender private key is stored in the Secure Element of the record sender device.

In a 29th aspect, the method of any one of aspects 17-28, wherein the receiver signature is created by a Secure Element of the record receiver device using the receiver private key, and wherein the receiver private key is stored in the Secure Element of the record receiver device.

In a 30th aspect, the method of any one of aspects 17-29, further comprising receiving common records from the processing platform, wherein the common records comprise the sender public key and the receiver public key.

In a 31st aspect, the method of any one of aspects 17-29, further comprising receiving common records from the record receiver device, wherein the common records comprise the sender public key and the receiver public key.

In a 32nd aspect, the method of any one of aspects 30-31, wherein the common records further comprise a third signature of the common records, wherein the third signature is created using a third private key of the processing platform, the method further comprises verifying the common records using a third public key of the processing platform while not necessarily in communication with the processing platform, wherein the third public key and the third private key form a third public-key cryptographic pair, and wherein verifying the common records comprises using the third public key to determine the third signature is created using the third private key.

In a 33rd aspect, a method for securely exchanging cryptographically signed records. The method is performed under control of a hardware processor and comprises: sending a content request to a record sender device; receiving a sender individual record from the record sender device, wherein the sender individual record is created by the record sender device after receiving the content request from a record receiver device and identifying the record receiver device, wherein the sender individual record comprises a record content, a sender public key of the record sender device, a receiver public key of the record receiver device, and a sender signature of the sender individual record, wherein the sender signature is created using a sender private key of the record sender device, and wherein the sender public key and the sender private key form a sender public-key cryptographic pair; verifying the sender individual record using the sender public key while not necessarily in communication with a processing platform; creating a receiver individual record, wherein the receiver individual record comprises the sender individual record and a receiver signature of the receiver individual record, wherein the receiver signature is created using a receiver private key of the record receiver device, and wherein the receiver public key and the receiver private key form a receiver public-key cryptographic pair; redeeming the receiver individual record with the processing platform; and receiving a performance by the processing platform as instructed by the receiver individual record.

In a 34th aspect, the method of aspect 33, wherein the content request comprises the receiver public key and a requested content, and wherein the record content is related to the requested content.

In a 35th aspect, the method of any one of aspects 33-34, wherein identifying the payee device comprises performing partner identification, wherein partner identification comprises payment authorization, knocking, physical indication, beam forming, prior arrangement, cursory validation, or any combination thereof.

In a 36th aspect, the method of any one of aspects 33-35, wherein the sender individual record further comprises a record identifier.

In a 37th aspect, the method of aspect 36, wherein the record identifier is a monotonically increasing number.

In a 38th aspect, the method of any one of aspects 33-37, wherein receiving the sender individual record from the record sender device comprises receiving the sender individual record from the record sender device via a short range link directly or through an intermediate device.

In a 39th aspect, the method of aspect 38, wherein the short range link is a peer-to-peer communication link.

In a 40th aspect, the method of any one of aspects 33-39, wherein the receiver individual record further comprises a for redemption only endorsement, a query endorsement, a malicious record endorsement, or any combination thereof.

In a 41st aspect, the method of any one of aspects 33-40, wherein the sender individual record is created after receiving authentication information of a record sender by the record sender device, and wherein creating the receiver individual record comprises receiving authentication information of a record receiver by the record receiver device.

In a 42nd aspect, the method of any one of aspects 33-41, wherein verifying the sender individual record comprises using the sender public key to determine the sender signature is created using the sender private key.

In a 43rd aspect, the method of any one of aspects 33-42, wherein the sender signature is created using a Secure Element of the record sender device using the sender private key, and wherein the sender private key is stored in the Secure Element of the record sender device.

In a 44th aspect, the method of any one of aspects 33-43, wherein the receiver signature is created using a Secure Element of the record receiver device using the receiver private key, and wherein the receiver private key is stored in the Secure Element of the record receiver device.

In a 45th aspect, the method of any one of aspects 33-44, further comprising receiving common records from the processing platform, wherein the common records comprise the sender public key and the receiver public key.

In a 46th aspect, the method of aspect 45, further comprising sending the common records to the record sender device.

In a 47th aspect, the method of any one of aspects 33-44, further comprising receiving common records from the record sender device, wherein the common records comprise the sender public key and the receiver public key.

In a 48th aspect, the method of any one of aspects 45-47, wherein the common records further comprise a third signature of the common records, and wherein the third signature is created using a third private key of the processing platform, the method further comprises verifying the common records using a third public key of the processing platform while not necessarily in communication with the processing platform, wherein the third public key and the third private key form a third public-key cryptographic pair, and wherein verifying the common records comprises using the third public key to determine the third signature is created using the third private key.

In a 49th aspect, a computer system is disclosed. The computer system comprises: a hardware processor; and non-transitory memory having instructions stored thereon, which when executed by the processor cause the processor to perform the method of any one of aspects 1-48.

In a 50th aspect, the computer system of aspect 49, wherein the computer system is a mobile device.

In a 51st aspect, the computer system of aspect 50, wherein the mobile device is a wearable display system.

Secure Exchange of Cryptographically Signed Records by Agents

In a 52nd aspect, a method for securely exchanging of cryptographically signed records by agents is disclosed. The method is performed under control of a hardware processor and comprises: receiving a principal-modified individual record from a principal device, wherein the principal-modified individual record comprises an agent-modified individual record and a signature of the principal-modified individual record, wherein the agent-modified individual record comprises an original individual record, an agent public key of an agent device, and a signature of the agent-modified individual record, wherein the original individual record comprises a record content, a sender public key of a record sender device, a principal public key of the principal device, and a signature of the original individual record, wherein the signature of the principal-modified individual record is created using a principal private key of the principal device, and wherein the principal public key and the principal private key form a principal public-key cryptographic pair, wherein the agent-modified individual record is created by the agent device after receiving the original individual record from the principal device, wherein the signature of the agent-modified individual record is created using an agent private key of the agent device, wherein the agent public key and the agent private key form an agent public-key cryptographic pair, and wherein the original individual record is created by the record sender device after receiving a content request from the agent device and identifying the agent device, wherein the signature of the original individual record is created using a sender private key of the record sender device, and wherein the sender public key and the sender private key form a sender public-key cryptographic pair; verifying the principal-modified individual record; and performing for the principal device as instructed by the principal-modified individual record.

In a 53rd aspect, the method of aspect 52, wherein the content request comprises the principal public key and a requested content, wherein the record content is related to the requested content.

In a 54th aspect, the method of any one of aspects 52-53, wherein identifying the agent device comprises performing partner identification, wherein partner identification comprises payment authorization, knocking, physical indication, beam forming, prior arrangement, cursory validation, or any combination thereof.

In a 55th aspect, the method of aspect 54, wherein the original individual record further comprises a record identifier.

In a 56th aspect, the method of aspect 55, wherein the record identifier is a monotonically increasing number.

In a 57th aspect, the method of any one of aspects 52-56, wherein receiving the original individual record from the record sender device comprises receiving the original individual record from the record sender device via a short range link directly or through an intermediate device.

In a 58th aspect, the method of aspect 57, wherein the short range link is a peer-to-peer communication link.

In a 59th aspect, the method of any one of aspects 52-58, wherein agent-modified individual record further comprises a handled by endorsement, a query endorsement, a malicious record endorsement, or any combination thereof, and wherein the principal-modified individual record further comprises a for redemption only endorsement, a query endorsement, a malicious record endorsement, or any combination thereof.

In a 60th aspect, the method of any one of aspects 52-59, wherein the original individual record is created by the record sender device after receiving authentication information of a record sender by the record sender device, and wherein the agent-modified individual record is created by the agent device after receiving authentication information of an agent by the agent device.

In a 61st aspect, the method of any one of aspects 52-60, wherein verifying the original individual record comprises: using the sender public key to determine the signature of the original individual record is created using the sender private key; using the agent public key to determine the signature of the agent-modified individual record is created using the agent private key; and using the principal public key to determine the signature of the principal device is created using the principal private key.

In a 62nd aspect, the method of any one of aspects 52-61, further comprising providing common records to the record sender device, the agent device, and the principal device, wherein the common records comprise the sender public key and the principal public key.

In a 63rd aspect, the method of any one of aspects 52-61, further comprising providing common records to the record sender device, wherein the common records comprise the sender public key and the principal public key; and causing the record sender device to provide the common records to the agent.

In a 64th aspect, the method of any one of aspects 52-61, further comprising providing common records to the agent, wherein the common records comprise the sender public key and the principal public key; and causing the agent to provide the common records to the record sender device.

In a 65th aspect, the method of any one of aspects 52-61, further comprising providing common records to the principal device, wherein the common records comprise the sender public key and the principal public key; and causing the principal device to provide the common records to the agent.

In a 66th aspect, the method of aspect 65, further comprising causing the agent to provide the common records to the record sender device.

In a 67th aspect, the method of any one of aspects 62-66, wherein the common records further comprise a common records signature, wherein the common records signature is created using a processing platform private key of the processing platform, the method further comprises verifying the common records using a processing platform public key of the processing platform while not necessarily in communication with the processing platform, wherein the processing platform public key and the processing platform private key form a processing platform public-key cryptographic pair, and wherein verifying the common records comprises using the processing platform public key to determine the common records signature is created using the processing platform private key.

In a 68th aspect, the method of any one of aspects 62-67, further comprising: generating the common records from central records, wherein the central records comprise the sender public key, the principal public key, the agent public key, a user record status of the record sender device, and a user record status of the principal device.

In a 69th aspect, the method of any one of aspects 52-68, further comprising: charging the merchant for the agent public-key cryptographic pair or the principal cryptographic pair periodically or once.

In a 70th aspect, a method for securely exchanging of cryptographically signed records by agents is disclosed. The method is performed under control of a hardware processor and comprises: receiving a content request from an agent device; identifying the agent device; creating an original individual record, wherein the original individual record comprises a record content, a sender public key of a record sender device, a principal public key of a principal device, and a signature of the original individual record, wherein the signature of the original individual record is created using a sender private key of the record sender device, and wherein the sender public key and the sender private key form a sender public-key cryptographic pair; sending the original individual record to the agent device; receiving an indication of the agent device: receiving the original individual record; verifying the original individual record using the sender public key while not necessarily in communication with a processing platform; creating an agent-modified individual record, wherein the agent-modified individual record comprises the original individual record, an agent public key of the agent device, and a signature of the agent-modified individual record, wherein the signature of the agent-modified individual record is created using an agent private key of the agent device, and wherein the agent public key and the agent private key form an agent public-key cryptographic pair; and sending the agent-modified individual record to the principal device; and receiving an indication of the principal device: receiving the agent-modified individual record; creating a principal-modified individual record, wherein the principal-modified individual record comprises the agent-modified individual record and a signature of the principal-modified individual record, wherein the signature of the principal-modified individual record is created using a principal private key of the principal device, and wherein the principal public key and the principal private key form a principal public-key cryptographic pair; redeeming the principal-modified individual record with the processing platform; receiving a performance by the processing platform as instructed by the principal-modified individual record; and notifying the agent device of receiving the performance.

In a 71st aspect, the method of aspect 70, wherein the content request comprises the principal public key and a requested content, wherein the record content is related to the requested content.

In a 72nd aspect, the method of any one of aspects 70-71, wherein identifying the agent device comprises performing partner identification, wherein partner identification comprises payment authorization, knocking, physical indication, beam forming, prior arrangement, cursory validation, or any combination thereof.

In a 73rd aspect, the method of any one of aspects 70-72, wherein the original individual record further comprises a record identifier.

In a 74th aspect, the method of aspect 73, wherein the record identifier is a monotonically increasing number.

In a 75th aspect, the method of any one of aspects 70-74, wherein sending the original individual record to the agent device comprises sending the original individual record to the agent device via a short range link directly or through an intermediate device.

In a 76th aspect, the method of aspect 75, wherein the short range link is a peer-to-peer communication link.

In a 77th aspect, the method of any one of aspects 70-76, wherein agent-modified individual record further comprises a handled by endorsement, a query endorsement, a malicious record endorsement, or any combination thereof, and wherein the principal-modified individual record further comprises a for redemption only endorsement, a query endorsement, a malicious record endorsement, or any combination thereof.

In a 78th aspect, the method of any one of aspects 70-77, wherein creating the original individual record comprises receiving authentication information of a record sender by the record sender device, and wherein creating the agent-modified individual record comprises receiving authentication information of an agent by the agent device.

In a 79th aspect, the method of any one of aspects 70-78, wherein verifying the original individual record comprises using the sender public key to determine the signature of the original individual record is created using the sender private key.

In a 80th aspect, the method of any one of aspects 70-79, wherein the signature of the original individual record is created by a Secure Element of the record sender device using the sender private key, and wherein the sender private key is stored in the Secure Element of the record sender device.

In a 81st aspect, the method of any one of aspects 70-80, wherein the signature of the agent-modified individual record is created by a Secure Element of the agent device using the agent private key, and wherein the agent private key is stored in the Secure Element of the agent device.

In a 82nd aspect, the method of any one of aspects 70-81, further comprising receiving common records from the processing platform, wherein the common records comprise the sender public key and the principal public key.

In a 83rd aspect, the method of any one of aspects 70-81, further comprising receiving common records from the agent device, wherein the common records comprise the sender public key and the principal public key.

In a 84th aspect, the method of any one of aspects 82-83, wherein the common records further comprise a common records signature, wherein the common records signature is created using a processing platform private key of the processing platform, the method further comprises verifying the common records using a processing platform public key of the processing platform while not necessarily in communication with the processing platform, wherein the processing platform public key and the processing platform private key form a processing platform public-key cryptographic pair, and wherein verifying the common records comprises using the processing platform public key to determine the common records signature is created using the processing platform private key.

In a 85th aspect, a method for securely exchanging of cryptographically signed records by agents is disclosed. The method is performed under control of a hardware processor and comprises: sending a content request to a record sender device; receiving an original individual record from the record sender device, wherein the original individual record is created by the record sender device after receiving the content request from the record sender device and identifying the agent device, wherein the original individual record comprises a record content, a sender public key of a record sender device, a principal public key of a principal device, and a signature of the original individual record, wherein the signature of the original individual record is created using a sender private key of the record sender device, and wherein the sender public key and the sender private key form a sender public-key cryptographic pair; verifying the original individual record using the sender public key while not necessarily in communication with a processing platform; creating an agent-modified individual record, wherein the agent-modified individual record comprises the original individual record, an agent public key of the agent device, and a signature of the agent-modified individual record, wherein the signature of the agent-modified individual record is created using an agent private key of the agent device, and wherein the agent public key and the agent private key form an agent public-key cryptographic pair; sending the agent-modified individual record to the principal device; and receiving an indication of the principal device: receiving the agent-modified individual record; creating a principal-modified individual record, wherein the principal-modified individual record comprises the agent-modified individual record and a signature of the principal-modified individual record, wherein the signature of the principal-modified individual record is created using a principal private key of the principal device, and wherein the principal public key and the principal private key form a principal public-key cryptographic pair; redeeming the principal-modified individual record with the processing platform; and receiving a performance by the processing platform as instructed by the principal-modified individual record.

In a 86th aspect, the method of aspect 85, wherein the content request comprises the principal public key and a requested content, wherein the record content is related to the requested content.

In a 87th aspect, the method of any one of aspects 85-86, wherein identifying the agent device comprises performing partner identification, wherein partner identification comprises payment authorization, knocking, physical indication, beam forming, prior arrangement, cursory validation, or any combination thereof.

In a 88th aspect, the method of any one of aspects 85-87, wherein the original individual record further comprises a record identifier.

In a 89th aspect, the method of aspect 88, wherein the record identifier is a monotonically increasing number.

In a 90th aspect, the method of any one of aspects 85-89, wherein receiving the original individual record from the record sender device comprises receiving the original individual record from the record sender device via a short range link directly or through an intermediate device.

In a 91st aspect, the method of aspect 90, wherein the short range link is a peer-to-peer communication link.

In a 92nd aspect, the method of any one of aspects 85-91, wherein agent-modified individual record further comprises a handled by endorsement, a query endorsement, a malicious record endorsement, or any combination thereof, and wherein the principal-modified individual record further comprises a for redemption only endorsement, a query endorsement, a malicious record endorsement, or any combination thereof.

In a 93rd aspect, the method of any one of aspects 85-92, wherein creating the original individual record comprises receiving authentication information of a record sender by the record sender device, and wherein creating the agent-modified individual record comprises receiving authentication information of an agent by the agent device.

In a 94th aspect, the method of any one of aspects 85-93, wherein verifying the original individual record comprises using the sender public key to determine the signature of the original individual record is created using the sender private key.

In a 95th aspect, the method of any one of aspects 85-94, wherein the signature of the original individual record is created by a Secure Element of the record sender device using the sender private key, and wherein the sender private key is stored in the Secure Element of the record sender device.

In a 96th aspect, the method of any one of aspects 85-95, wherein the signature of the agent-modified individual record is created by a Secure Element of the agent device using the agent private key, and wherein the agent private key is stored in the Secure Element of the agent device.

In a 97th aspect, the method of any one of aspects 85-96, further comprising receiving common records from the processing platform, wherein the common records comprise the sender public key and the principal public key.

In a 98th aspect, the method of aspect 97, further comprising sending the common records to the record sender device.

In a 99th aspect, the method of any one of aspects 85-96, further comprising receiving common records from the principal device, wherein the common records comprise the sender public key and the principal public key.

In a 100th aspect, the method of any one of aspects 97-99, wherein the common records further comprise a common records signature, wherein the common records signature is created using a processing platform private key of the processing platform, the method further comprises verifying the common records using a processing platform public key of the processing platform while not necessarily in communication with the processing platform, wherein the processing platform public key and the processing platform private key form a processing platform public-key cryptographic pair, and wherein verifying the common records comprises using the processing platform public key to determine the common records signature is created using the processing platform private key.

In a 101st aspect, a computer system is disclosed. The computer system comprises: a processor; and non-transitory memory having instructions stored thereon, which when executed by the processor cause the processor to perform the method of any one of aspects 52-100.

In a 102nd aspect, the computer system of aspect 101, wherein the computer system is a mobile device.

In a 103rd aspect, the computer system of aspect 102, wherein the mobile device is a wearable display system.

Secure Exchange of Chains of Cryptographically Signed Records

In a 104th aspect, a method for securely exchanging chains of cryptographically signed records is disclosed. The method is performed under control of a hardware processor and comprises: receiving a subsequent receiver individual record from a subsequent record receiver device, wherein the subsequent receiver individual record comprises an original receiver individual record and a subsequent receiver signature of the subsequent receiver individual record, wherein the original receiver individual record comprises a sender individual record, a subsequent receiver public key of the subsequent record receiver device, and an original receiver signature of the original receiver individual record, wherein the sender individual record comprises a record content, a sender public key of a record sender device, an original receiver public key of an original record receiver device, and a sender signature of the sender individual record, wherein the sender individual record is created by the record sender device after receiving an original content request from the original record receiver device and identifying the original record receiver device, wherein the sender signature is created using a sender private key of the record sender device, and wherein the sender public key and the sender private key form a sender public-key cryptographic pair, wherein the original receiver individual record is created by the original record receiver device after receiving a subsequent content request from the subsequent record receiver device and identifying the subsequent record receiver device, wherein the original receiver signature is created using an original receiver private key of the original record receiver device, and wherein the original receiver public key and the original receiver private key form an original receiver public-key cryptographic pair, wherein the subsequent receiver signature is created using a subsequent receiver private key of the subsequent record receiver device, and wherein the subsequent receiver public key and the subsequent receiver private key form a subsequent receiver public-key cryptographic pair; verifying the subsequent receiver individual record; and performing for the subsequent record receiver as instructed by the subsequent receiver individual record.

In a 105th aspect, the method of aspect 104, wherein the original content request comprises the original receiver public key and an original content, wherein the record content is related to the original content, wherein the subsequent content request comprises the subsequent receiver public key and a subsequent content, wherein the original content is related to the subsequent content.

In a 106th aspect, the method of any one of aspects 104-105, wherein identifying the original content requester or identifying the subsequent content requester comprises performing partner identification, wherein partner identification comprises content authorization, knocking, physical indication, beam forming, prior arrangement, cursory validation, or any combination thereof.

In a 107th aspect, the method of any one of aspects 104-106, wherein the sender individual record further comprises a record identifier.

In a 108th aspect, the method of aspect 107, wherein the record identifier is a monotonically increasing number.

In a 109th aspect, the method of any one of aspects 104-108, wherein the sender individual record is sent by the record sender device to the original record receiver device via a first short range link directly or through an intermediate device, and wherein sending the original receiver individual record to the subsequent record receiver device comprises sending the original receiver individual record to the subsequent record receiver device via a second short range link directly or through an intermediate device.

In a 110th aspect, the method of aspect 109, wherein the first short range link is a peer-to-peer communication link or wherein the second short range link is a peer-to-peer communication link.

In a 111st aspect, the method of any one of aspects 104-110, wherein the subsequent receiver individual record further comprises a for redemption only endorsement, a query endorsement, a malicious record endorsement, or any combination thereof.

In a 112nd aspect, the method of any one of aspects 104-111, wherein the sender individual record is created by the record sender device after receiving authentication information of a record sender, wherein the original receiver individual record is created by the original record receiver device after receiving authentication information of an original record receiver device, and wherein the subsequent receiver individual record is created by the subsequent record receiver device after receiving authentication information of a subsequent record receiver device.

In a 113rd aspect, the method of any one of aspects 104-112, wherein verifying the subsequent receiver individual record comprises: using the sender public key to determine the sender signature is created using the sender private key; using the original receiver public key to determine the original receiver signature is created using the original receiver private key; and using the subsequent receiver public key to determine the subsequent receiver signature is created using the subsequent receiver private key.

In a 114th aspect, the method of any one of aspects 104-113, wherein the sender signature is created by a Secure Element of the record sender device using the sender private key, wherein the sender private key is stored in the Secure Element of the record sender device, wherein the original receiver signature is created by a Secure Element of the original record receiver device using the original receiver private key, wherein the original receiver private key is stored in the secure element of the original record receiver device, wherein the subsequent receiver signature is created by a Secure Element of the subsequent record receiver device using the subsequent receiver private key, and wherein the subsequent receiver private key is stored in the secure element of the subsequent record receiver device.

In a 115th aspect, a method for securely exchanging chains of cryptographically signed records is disclosed. The method is performed under control of a hardware processor and comprises: receiving an original content request from an original record receiver device; identifying the original record receiver device; creating a sender individual record, wherein the sender individual record comprises a record content, a sender public key of a record sender device, an original receiver public key of the original record receiver device, and a sender signature of the sender individual record, wherein the sender signature is created using a sender private key of the record sender device, and wherein the sender public key and the sender private key form a sender public-key cryptographic pair; sending the sender individual record to the original content requester; and receiving an indication of the original content requester: receiving the sender individual record; verifying the sender individual record using the sender public key while not necessarily in communication with a processing platform; receiving a subsequent content request from a subsequent record receiver device; identifying the subsequent record receiver device; creating an original receiver individual record, wherein the original receiver individual record comprises the sender individual record, a subsequent receiver public key of the subsequent record receiver device, and an original receiver signature of the original receiver individual record, wherein the original receiver signature is created using an original receiver private key of the original record receiver device, and wherein the original receiver public key and the original receiver private key form an original receiver public-key cryptographic pair;

sending the original receiver individual record to the subsequent record receiver device; and receiving an indication of the subsequent record receiver: receiving the original receiver individual record; verifying the original receiver individual record using the sender public key and original receiver public key while not necessarily in communication with the processing platform; creating a subsequent receiver individual record, wherein the subsequent receiver individual record comprises the original receiver individual record and a subsequent receiver signature of the subsequent receiver individual record, wherein the subsequent receiver signature is created using a subsequent receiver private key of the subsequent record receiver device, and wherein the subsequent receiver public key and the subsequent receiver private key form a subsequent receiver public-key cryptographic pair; redeeming the original receiver individual record with the processing platform; and receiving a performance by the processing platform as instructed by the subsequent receiver individual record.

In a 116th aspect, the method of aspect 115, wherein the original content request comprises the original receiver public key and an original content, wherein the record content is related to the original content, wherein the subsequent content request comprises the subsequent receiver public key and a subsequent content, wherein the original content is related to the subsequent content.

In a 117th aspect, the method of any one of aspects 115-116, wherein identifying the original content requester or identifying the subsequent content requester comprises performing partner identification, wherein partner identification comprises content authorization, knocking, physical indication, beam forming, prior arrangement, cursory validation, or any combination thereof.

In a 118th aspect, the method of any one of aspects 115-117, wherein the sender individual record further comprises a record identifier.

In a 119th aspect, the method of aspect 118, wherein the record identifier is a monotonically increasing number.

In a 120th aspect, the method of any one of aspects 115-119, wherein sending the sender individual record to the original record receiver device comprises sending the sender individual record to the original record receiver device via a first short range link directly or through an intermediate device, and wherein sending the original receiver individual record to the subsequent record receiver device comprises sending the original receiver individual record to the subsequent record receiver device via a second short range link directly or through an intermediate device.

In a 121st aspect, the method of aspect 120, wherein the first short range link is a peer-to-peer communication link or wherein the second short range link is a peer-to-peer communication link.

In a 122nd aspect, the method of any one of aspects 115-121, wherein the subsequent receiver individual record further comprises a for redemption only endorsement, a query endorsement, a malicious record endorsement, or any combination thereof.

In a 123rd aspect, the method of any one of aspects 115-122, wherein creating the sender individual record comprises receiving authentication information of a record sender by the record sender device, wherein creating the original receiver individual record comprises receiving authentication information of an original record receiver by the original record receiver device, and wherein creating the subsequent receiver individual record comprises receiving authentication information of a subsequent record receiver by the subsequent record receiver device.

In a 124th aspect, the method of any one of aspects 115-123, wherein verifying the sender individual record comprises using the sender public key to determine the sender signature is created using the sender private key, and wherein verifying the original receiver individual record comprises using the original receiver public key to determine the original receiver signature is created using the original receiver private key.

In a 125th aspect, the method of any one of aspects 115-124, wherein the sender signature is created by a Secure Element of the record sender device using the sender private key, wherein the sender private key is stored in the Secure Element of the record sender device, wherein the original receiver signature is created by a Secure Element of the original record receiver device using the original receiver private key, wherein the original receiver private key is stored in the secure element of the original record receiver device, wherein the subsequent receiver signature is created by a Secure Element of the subsequent record receiver device using the subsequent receiver private key, and wherein the subsequent receiver private key is stored in the secure element of the subsequent record receiver device.

In a 126th aspect, a method for securely exchanging chains of cryptographically signed records is disclosed. The method is performed under control of a hardware processor and comprises: sending an original content request to a record sender device; receiving a sender individual record from the record sender device, wherein the sender individual record comprises a record content, a sender public key of a record sender device, an original receiver public key of the original record receiver device, and a sender signature of the sender individual record, wherein the sender signature is created using a sender private key of the record sender device, and wherein the sender public key and the sender private key form a sender public-key cryptographic pair; verifying the sender individual record using the sender public key while not necessarily in communication with a processing platform; receiving a subsequent content request from a subsequent record receiver device; identifying the subsequent record receiver device; creating an original receiver individual record, wherein the original receiver individual record comprises the sender individual record, a subsequent receiver public key of the subsequent record receiver device, and an original receiver signature of the original receiver individual record, wherein the original receiver signature is created using an original receiver private key of the original record receiver device, and wherein the original receiver public key and the original receiver private key form an original receiver public-key cryptographic pair; sending the original receiver individual record to the subsequent record receiver device; and receiving an indication of the subsequent record receiver: receiving the original receiver individual record; verifying the original receiver individual record using the sender public key and original receiver public key while not necessarily in communication with the processing platform; creating a subsequent receiver individual record, wherein the subsequent receiver individual record comprises the original receiver individual record and a subsequent receiver signature of the subsequent receiver individual record, wherein the subsequent receiver signature is created using a subsequent receiver private key of the subsequent record receiver device, and wherein the subsequent receiver public key and the subsequent receiver private key form a subsequent receiver public-key cryptographic pair; redeeming the original receiver individual record with the processing platform; and receiving a performance by the processing platform as instructed by the subsequent receiver individual record.

In a 127th aspect, the method of aspect 126, wherein the original content request comprises the original receiver public key and an original content, wherein the record content is related to the original content, wherein the subsequent content request comprises the subsequent receiver public key and a subsequent content, wherein the original content is related to the subsequent content.

In a 128th aspect, the method of any one of aspects 126-127, wherein identifying the original content requester or identifying the subsequent content requester comprises performing partner identification, wherein partner identification comprises content authorization, knocking, physical indication, beam forming, prior arrangement, cursory validation, or any combination thereof.

In a 129th aspect, the method of any one of aspects 126-128, wherein the sender individual record further comprises a record identifier.

In a 130th aspect, the method of aspect 129, wherein the record identifier is a monotonically increasing number.

In a 131st aspect, the method of any one of aspects 126-130, wherein sending the sender individual record to the original record receiver device comprises sending the sender individual record to the original record receiver device via a first short range link directly or through an intermediate device, and wherein sending the original receiver individual record to the subsequent record receiver device comprises sending the original receiver individual record to the subsequent record receiver device via a second short range link directly or through an intermediate device.

In a 132nd aspect, the method of aspect 131, wherein the first short range link is a peer-to-peer communication link or wherein the second short range link is a peer-to-peer communication link.

In a 133rd aspect, the method of any one of aspects 126-132, wherein the subsequent receiver individual record further comprises a for redemption only endorsement, a query endorsement, a malicious record endorsement, or any combination thereof.

In a 134th aspect, the method of any one of aspects 126-133, wherein creating the sender individual record comprises receiving authentication information of a record sender by the record sender device, wherein creating the original receiver individual record comprises receiving authentication information of an original record receiver by the original record receiver device, and wherein creating the subsequent receiver individual record comprises receiving authentication information of a subsequent record receiver by the subsequent record receiver device.

In a 135th aspect, the method of any one of aspects 126-134, wherein verifying the sender individual record comprises using the sender public key to determine the sender signature is created using the sender private key, and wherein verifying the original receiver individual record comprises using the original receiver public key to determine the original receiver signature is created using the original receiver private key.

In a 136th aspect, the method of any one of aspects 126-135, wherein the sender signature is created by a Secure Element of the record sender device using the sender private key, wherein the sender private key is stored in the Secure Element of the record sender device, wherein the original receiver signature is created by a Secure Element of the original record receiver device using the original receiver private key, wherein the original receiver private key is stored in the secure element of the original record receiver device, wherein the subsequent receiver signature is created by a Secure Element of the subsequent record receiver device using the subsequent receiver private key, and wherein the subsequent receiver private key is stored in the secure element of the subsequent record receiver device.

In a 137th aspect, a method for securely exchanging chains of cryptographically signed records is disclosed. The method is performed under control of a hardware processor and comprises: sending a subsequent content request to an original record receiver device, receiving an original receiver individual record from the original record receiver device, wherein the original receiver individual record comprises a sender individual record, a subsequent receiver public key of a subsequent record receiver device, and an original receiver signature of the original receiver individual record, wherein the sender individual record comprises a record content, a sender public key of a record sender device, an original receiver public key of the original record receiver device, and a sender signature of the sender individual record, wherein the sender individual record is created by the record sender device after receiving an original content request from the original record receiver device and identifying the original record receiver device, wherein the sender signature is created using a sender private key of the record sender device, and wherein the sender public key and the sender private key form a sender public-key cryptographic pair, wherein the original receiver individual record is created by the original record receiver device after receiving the subsequent content request from the subsequent record receiver device and identifying the subsequent record receiver device, wherein the original receiver signature is created using an original receiver private key of the original record receiver device, and wherein the original receiver public key and the original receiver private key form an original receiver public-key cryptographic pair; verifying the original receiver individual record while not necessarily in communication with a processing platform; creating a subsequent receiver individual record, wherein the subsequent receiver individual record comprises the original receiver individual record and a subsequent receiver signature of the subsequent receiver individual record, wherein the subsequent receiver signature is created using a subsequent receiver private key of the subsequent record receiver device, and wherein the subsequent receiver public key and the subsequent receiver private key form a subsequent receiver public-key cryptographic pair; redeeming the subsequent receiver individual record with the processing platform; and receiving a performance by the processing platform as instructed by the subsequent receiver individual record.

In a 138th aspect, the method of aspect 137, wherein the original content request comprises the original receiver public key and an original content, wherein the record content is related to the original content, wherein the subsequent content request comprises the subsequent receiver public key and a subsequent content, wherein the original content is related to the subsequent content.

In a 139th aspect, the method of any one of aspects 137-138, wherein identifying the original content requester or identifying the subsequent content requester comprises performing partner identification, wherein partner identification comprises content authorization, knocking, physical indication, beam forming, prior arrangement, cursory validation, or any combination thereof.

In a 140th aspect, the method of any one of aspects 137-139, wherein the sender individual record further comprises a record identifier.

In a 141st aspect, the method of aspect 140, wherein the record identifier is a monotonically increasing number.

In a 142nd aspect, the method of any one of aspects 137-141, wherein receiving the original receiver individual record from the original record receiver device comprises receiving the original receiver individual record from the original record receiver device via a short range link directly or through an intermediate device.

In a 143rd aspect, the method of aspect 142, wherein the short range link is a peer-to-peer communication link.

In a 144th aspect, the method of any one of aspects 137-143, wherein the subsequent receiver individual record further comprises a for redemption only endorsement, a query endorsement, a malicious record endorsement, or any combination thereof.

In a 145th aspect, the method of any one of aspects 137-144, wherein the sender individual record is created by the record sender device after receiving authentication information of a record sender, wherein the original receiver individual record is created by the original record receiver device after receiving authentication information of an original record receiver device, and wherein creating the subsequent receiver individual record comprises receiving authentication information of a subsequent record receiver by the subsequent record receiver device.

In a 146th aspect, the method of any one of aspects 137-145, wherein verifying the original receiver individual record comprises: using the sender public key to determine the sender signature is created using the sender private key; and using the original receiver public key to determine the original receiver signature is created using the original receiver private key.

In a 147th aspect, the method of any one of aspects 137-146, wherein the sender signature is created by a Secure Element of the record sender device using the sender private key, wherein the sender private key is stored in the Secure Element of the record sender device, wherein the original receiver signature is created by a Secure Element of the original record receiver device using the original receiver private key, wherein the original receiver private key is stored in the secure element of the original record receiver device, wherein the subsequent receiver signature is created by a Secure Element of the subsequent record receiver device using the subsequent receiver private key, and wherein the subsequent receiver private key is stored in the secure element of the subsequent record receiver device.

Secure Exchange of Cryptographically Signed Digital Cheques

In a 148th aspect, a method for securely exchanging cryptographically signed digital cheques is disclosed. The method is performed under control of a hardware processor and comprises: receiving an endorsed digital cheque from a payee device, wherein the endorsed digital cheque comprises an original digital cheque and a payee signature of the endorsed digital cheque, wherein the original digital cheque is created by a payer after receiving a payment request from the payee and identifying the payee device, wherein the original digital cheque comprises a payment amount, a payer public key, a payee public key, and a payer signature of the original digital cheque, wherein the payer signature is created using a payer private key of the payer device, wherein the payer public key and the payee public key form a payee public-key cryptographic pair, wherein the endorsed digital cheque is created by the payee device after receiving the original digital cheque from the payer device and verifying the original digital cheque using the payer public key while not necessarily in communication with a processing platform, wherein the payee signature is created by the payee device using a payee private key, and wherein the payee public key and the payee public key form a payee public key cryptographic pair; verifying the endorsed digital cheque; and providing a payment of the payment amount to the payee.

In a 149th aspect, the method of aspect 148, wherein the payment request comprises the payee public key and a requested amount, and wherein the payment amount is related to the requested amount.

In a 150th aspect, the method of any one of aspects 148-149, wherein identifying the payee device comprises performing partner identification, wherein partner identification comprises content authorization, knocking, physical indication, beam forming, prior arrangement, cursory validation, or any combination thereof.

In a 151st aspect, the method of any one of aspects 148-150, wherein the original digital cheque further comprises a cheque identifier.

In a 152nd aspect, the method of aspect 151, wherein the cheque identifier is a monotonically increasing number.

In a 153rd aspect, the method of any one of aspects 148-152, wherein receiving the original digital cheque from the payer device comprises receiving the original digital cheque from the payer device via a short range link directly or through an intermediate device.

In a 154th aspect, the method of aspect 153, wherein the short range link is a peer-to-peer communication link.

In a 155th aspect, the method of any one of aspects 148-154, wherein the endorsed digital cheque further comprises a for redemption only endorsement, a query endorsement, a malicious cheque endorsement, or any combination thereof.

In a 156th aspect, the method of any one of aspects 148-155, wherein the original digital cheque is created after receiving authentication information of a payer by the payer device, and wherein the endorsed digital cheque is created after receiving authentication information of a payee by the payee device.

In a 157th aspect, the method of any one of aspects 148-156, wherein verifying the original digital cheque comprises: using the payer public key to determine the payer signature is created using the payer private key; and using the payee public key to determine the payee signature is created using the payee private key.

In a 158th aspect, the method of any one of aspects 148-157, further comprising providing a common ledger to the payer device and the payee device, wherein the common ledger comprises the payer public key and the payee public key.

In a 159th aspect, the method of any one of aspects 148-157, further comprising: providing a common ledger to the payer device, wherein the common ledger comprises the payer public key and the payee public key; and causing the payer device to provide the common ledger to the payee device.

In a 160th aspect, the method of any one of aspects 148-157, further comprising: providing a common ledger to the payee device, wherein the common ledger comprises the payer public key and the payee public key; and causing the payee device to provide the common ledger to the payer device.

In a 161st aspect, the method of any one of aspects 158-160, wherein the common ledger further comprises a common ledger signature, wherein the common ledger signature is created using a processing platform private key of the processing platform, the method further comprises verifying the common ledger using a processing platform public key of the processing platform while not necessarily in communication with the processing platform, wherein the processing platform public key and the processing platform private key form a public-key cryptographic pair of the processing platform, and wherein verifying the common ledger comprises using the processing platform public key to determine the common ledger signature is created using the processing platform private key.

In a 162nd aspect, the method of any one of aspects 158-161, further comprising: generating the central ledger from a common ledger, wherein the central ledger comprises a payer account of the payer device and a payee account of the payee device, wherein the payer account comprises the payer public key and an account balance of the payer account, and wherein the payee account comprises the payee public key and an account balance of the payee account.

In a 163rd aspect, the method of aspect 162, wherein providing the payment of the payment amount to the payee device comprises: determining the payer account has a sufficient balance to pay the payment amount; debiting the payer account by the payment amount; and crediting the payee account by the payment amount.

In a 164th aspect, the method of aspect 163, further comprising: receiving a request to transfer money out of the payee account from a payee device, wherein the request to transfer money out of the payee account comprises a transfer-out amount and a transfer-out method, wherein the transfer-out method is automated clearing house (ACH) transfer, wire transfer, or sending a physical check; debiting the payee account by the transfer-out amount; and sending the transfer-out amount using the transfer-out method.

In a 165th aspect, the method of aspect 164, further comprising: debiting the payee account by a transfer fee, wherein the fee is proportional to the transfer-out amount or fixed.

In a 166th aspect, the method of any one of aspects 162-165, wherein providing the payment of the payment amount to the payee device comprises: determining the payer account has an insufficient balance to pay the payment amount; debiting the payer account by a fee for the insufficient balance; and adding the payer device to a demerit list.

In a 167th aspect, the method of any one of aspects 162-166, wherein the original digital cheque further comprises a source account, wherein providing the payment of the payment amount to the payee device comprises: receiving the payment amount from the source account; and crediting the payee account by the payment amount.

In a 168th aspect, the method of any one of aspects 148-167, wherein the original digital cheque comprises a fee sharing policy.

In a 169th aspect, a method for securely exchanging cryptographically signed digital cheques, comprising: under control of a hardware processor: receiving a payment request from a payee device; identifying the payee device; creating an original digital cheque, wherein the original digital cheque comprises a payment amount, a payer public key of a payer device, a payee public key of the payee device, and a payer signature of the original digital cheque, wherein the payer signature is created using a payer private key of the payer device, and wherein the payer public key and the payer private key form a payer public-key cryptographic pair; sending the original digital cheque to the payee device; and receiving an indication of the payee device: receiving the original digital cheque; verifying the original digital cheque using the payer public key while not necessarily in communication with a processing platform; creating an endorsed digital cheque, wherein the endorsed digital cheque comprises the original digital cheque and a payee signature of the endorsed digital cheque, wherein the payee signature is created using a payee private key, and wherein the payee public key and the payee private key form a payee public-key cryptographic pair; redeeming the endorsed digital cheque with the processing platform; and receiving a payment of the payment amount from the processing platform.

In a 170th aspect, the method of aspect 169, wherein the payment request comprises the payee public key and a requested amount, and wherein the payment amount is related to the requested amount.

In a 171st aspect, the method of any one of aspects 169-170, wherein identifying the payee device comprises performing partner identification, wherein partner identification comprises payment authorization, knocking, physical indication, beam forming, prior arrangement, cursory validation, or any combination thereof.

In a 172nd aspect, the method of any one of aspects 169-171, wherein the original digital cheque further comprises a cheque identifier.

In a 173rd aspect, the method of aspect 172, wherein the cheque identifier is a monotonically increasing number.

In a 174th aspect, the method of any one of aspects 169-173, wherein sending the original digital cheque to the payee device comprises sending the original digital cheque to the payee device via a short range link directly or through an intermediate device.

In a 175th aspect, the method of aspect 174, wherein the short range link is a peer-to-peer communication link.

In a 176th aspect, the method of any one of aspects 169-175, wherein the endorsed digital cheque further comprises a for redemption only endorsement, a query endorsement, a malicious cheque endorsement, or any combination thereof.

In a 177th aspect, the method of any one of aspects 169-176, wherein creating the original digital cheque comprises receiving authentication information of a payer by the payer device, and wherein creating the endorsed digital cheque comprises receiving authentication information of a payee by the payee device.

In a 178th aspect, the method of any one of aspects 169-177, wherein verifying the original digital cheque comprises using the payer public key to determine the payer signature is created using the payer private key.

In a 179th aspect, the method of any one of aspects 169-178, wherein the payer signature is created by a Secure Element of the payer device using the payer private key, and wherein the payer private key is stored in the Secure Element of the payer device.

In a 180th aspect, the method of any one of aspects 169-179, wherein the payee signature is created by a Secure Element of the payee device using the payee private key, and wherein the payee private key is stored in the Secure Element of the payee device.

In a 181st aspect, the method of any one of aspects 169-180, further comprising receiving a common ledger from the processing platform, wherein the common ledger comprises the payer public key and the payee public key.

In a 182nd aspect, the method of any one of aspects 169-180, further comprising receiving a common ledger from the payee device, wherein the common ledger comprises the payer public key and the payee public key.

In a 183rd aspect, the method of any one of aspects 181-182, wherein the common ledger further comprises a common ledger signature, wherein the common ledger signature is created using a processing platform private key of the processing platform, the method further comprises verifying the common ledger using a processing platform public key of the processing platform while not necessarily in communication with the processing platform, wherein the processing platform public key and the processing platform private key form a public-key cryptographic pair of the processing platform, and wherein verifying the common ledger comprises using the processing platform public key to determine the common ledger signature is created using the processing platform private key.

In a 184th aspect, a method for securely exchanging cryptographically signed digital cheques is disclosed. The method is performed under control of a hardware processor and comprises: sending a payment request to a payer device; receiving an original digital cheque from the payer device, wherein the original digital cheque is created by the payer device after receiving the payment request from a payee device and identifying the payee device, wherein the original digital cheque comprises a payment amount, a payer public key of the payer device, a payee public key of the payee device, and a payer signature of the original digital cheque, wherein the payer signature is created using a payer private key of the payer device, and wherein the payer public key and the payee public key form a payer public-key cryptographic pair; verifying the original digital cheque using the payer public key while not necessarily in communication with a processing platform; creating an endorsed digital cheque, wherein the endorsed digital cheque comprises the original digital cheque and a payee signature of the endorsed digital cheque, wherein the payee signature is created using a payee private key of the payee device, and wherein the payee public key and the payee public key form a payee public key cryptographic pair; redeeming the endorsed digital cheque with the processing platform; and receiving a payment of the payment amount from the processing platform.

In a 185th aspect, the method of aspect 184, wherein the payment request comprises the payee public key and a requested amount, and wherein the payment amount is related to the requested amount.

In a 186th aspect, the method of any one of aspects 184-185, wherein identifying the payee device comprises performing partner identification, wherein partner identification comprises payment authorization, knocking, physical indication, beam forming, prior arrangement, cursory validation, or any combination thereof.

In a 187th aspect, the method of any one of aspects 184-186, wherein the original digital cheque further comprises a cheque identifier.

In a 188th aspect, the method of aspect 187, wherein the cheque identifier is a monotonically increasing number.

In a 189th aspect, the method of any one of aspects 184-188, wherein receiving the original digital cheque from the payer device comprises receiving the original digital cheque from the payer device via a short range link directly or through an intermediate device.

In a 190th aspect, the method of aspect 189, wherein the short range link is a peer-to-peer communication link.

In a 191st aspect, the method of any one of aspects 184-190, wherein the endorsed digital cheque further comprises a for redemption only endorsement, a query endorsement, a malicious cheque endorsement, or any combination thereof.

In a 192nd aspect, the method of any one of aspects 184-191, wherein creating the original digital cheque comprises receiving a payer authentication information by the payer device, and wherein creating the endorsed digital cheque comprises receiving a payee authentication information by the payee device.

In a 193rd aspect, the method of any one of aspects 184-192, wherein verifying the original digital cheque comprises using the payer public key to determine the payer signature is created using the payer private key.

In a 194th aspect, the method of any one of aspects 184-193, wherein the payer signature is created by a Secure Element of the payer device using the payer private key, and wherein the payer private key is stored in the Secure Element of the payer device.

In a 195th aspect, the method of any one of aspects 184-194, wherein the payee signature is created by a Secure Element of the payee device using the payee private key, and wherein the payee private key is stored in the Secure Element of the payee device.

In a 196th aspect, the method of any one of aspects 184-195, further comprising receiving a common ledger from the processing platform, wherein the common ledger comprises the payer public key and the payee public key.

In a 197th aspect, the method of aspect 196, further comprising sending the common records to the payer device.

In a 198th aspect, the method of any one of aspects 184-195, further comprising receiving a common ledger from the payer device, wherein the common ledger comprises the payer public key and the payee public key.

In a 199th aspect, the method of any one of aspects 196-198, wherein the common ledger further comprises a common ledger signature, wherein the common ledger signature is created using a processing platform private key of the processing platform, the method further comprises verifying the common ledger using a processing platform public key of the processing platform while not necessarily in communication with the processing platform, wherein the processing platform public key and the processing platform private key form a public-key cryptographic pair of the processing platform, and wherein verifying the common ledger comprises using the processing platform public key to determine the common ledger signature is created using the processing platform private key.

In a 200th aspect, a computer system is disclosed. The computer system comprises: a hardware processor; and non-transitory memory having instructions stored thereon, which when executed by the processor cause the processor to perform the method of any one of aspects 148-199.

In a 201st aspect, the computer system of aspect 200, wherein the computer system is a mobile device.

In a 202nd aspect, the computer system of aspect 201, wherein the mobile device is a wearable display system.

Validation of Cryptographically Signed Records

In a 203rd aspect, a method for validating cryptographically signed records is disclosed. The method is performed under control of a hardware processor and comprises: receiving a sender individual record from a record sender device, wherein the sender individual record comprises a record identifier, a record content, a sender public key, a receiver public key of the record receiver device, and a sender signature of the sender individual record, and wherein the sender individual record is created by the record sender device after receiving a content request from a record receiver device and identifying the record receiver device; determining the sender individual record is invalid while not necessarily in communication with a processing platform; creating a receiver individual record, wherein the receiver individual record comprises the sender individual record, a malicious record endorsement, and a receiver signature of the receiver individual record, wherein the receiver signature is created using a receiver private key of the record receiver device, and wherein the receiver public key and the receiver private key form a receiver public-key cryptographic pair; and sending the receiver individual record to the processing platform.

In a 204th aspect, the method of aspect 203, wherein determining the sender individual record is invalid comprises detecting sender cloning with a single receiver, detecting mousing, or detecting ghosting.

In a 205th aspect, the method of aspect 204, wherein the record identifier of the sender individual record is a monotonically increasing number, wherein the record receiver device maintains a highest record identifier of individual records previously received with the sender public key of the record sender device as sender public keys of the individual records previously received, and wherein detecting sender cloning comprises determining the record identifier of the sender individual record is not larger than the highest record identifier.

In a 206th aspect, the method of aspect 205, wherein the record identifier of the sender individual record is different for individual records created by the record sender device, wherein the record receiver device maintains record identifiers of individual records previously received from the record sender device, and wherein detecting sender cloning comprises determining the record identifier of the sender individual record is not in the record identifiers of all individual records previously received from the record sender device.

In a 207th aspect, the method of any one of aspects 205-206, wherein the sender public key is the sender public key of the record sender device, wherein the sender signature is created using a sender private key of the record sender device, and wherein the sender public key and the sender private key form a sender public-key cryptographic pair.

In a 208th aspect, the method of any one of aspects 204-207, wherein the sender public key is the sender public key of the record sender device, wherein detecting mousing comprises determining the sender signature is not created using a sender private key of the record sender device, wherein the sender public key and the sender private key form a sender public-key cryptographic pair, and wherein determining the sender signature is not created using the sender private key of the record sender device comprises using the sender public key to determine the sender signature is not created using the sender private key.

In a 209th aspect, the method of any one of aspects 204-208, wherein detecting ghosting comprises determining the sender public key is not a valid public key of a user device, wherein determining the sender public key is not a valid public key comprises: receiving common records from the processing platform, wherein the common records comprise valid public keys of user devices; and determining the common records comprise the sender public key of the record sender device.

In a 210th aspect, the method of aspect 209, wherein the sender signature is created using a sender private key, and wherein the sender public key and the sender private key form a sender public-key cryptographic pair.

In a 211st aspect, the method of any one of aspects 203-210, further comprising causing the processing platform to add the record sender device to a blacklist of malicious user devices.

In a 212nd aspect, a method for validating cryptographically signed records is disclosed. The method is performed under control of a hardware processor and comprises: receiving a sender individual record from a record sender device, wherein the sender individual record comprises a record content, a sender public key, a receiver public key, and a sender signature of the sender individual record, wherein the sender signature is created using a sender private key, wherein the sender public key and the sender private key form a sender public-key cryptographic pair, and wherein the individual record is sent by the record sender device after receiving a content request from the record receiver device and identifying the record receiver device; determining the sender individual record is invalid while not necessarily in communication with a processing platform; creating a receiver individual record, wherein the receiver individual record comprises the sender individual record, a malicious record endorsement, and a receiver signature of the receiver individual record, wherein the receiver signature is created using a receiver private key of the record receiver device, and wherein the receiver public key and the receiver private key form a receiver public-key cryptographic pair; and sending the receiver individual record to the processing platform.

In a 213rd aspect, the method of aspect 212, wherein determining the sender individual record is invalid comprises detecting sender cloning with multiple receivers or detecting forking.

In a 214th aspect, the method of aspect 213, wherein detecting sender cloning with multiple receivers comprises: determining the sender public key is the sender public key of the record sender device; and determining the receiver public key is not a public key of the record receiver device.

In a 215th aspect, the method of aspect 213, wherein detecting forking comprises: determining the sender public key is not a public key of the record sender device, determining the public key of the record receiver device is not in the in the sender individual record, and determining the receiver public key is not a public key of the record receiver device.

In a 216th aspect, the method of any one of aspects 214-215, wherein the sender signature is created using a sender private key, and wherein the sender public key and the sender private key form a sender public-key cryptographic pair.

In a 217th aspect, the method of any one of aspects 212-216, further comprising causing the processing platform to add the record sender device to a blacklist of malicious user devices.

In a 218th aspect, a method for validating cryptographically signed records is disclosed. The method is performed under control of a hardware processor and comprises: receiving a receiver individual record from a record receiver device, wherein the receiver individual record comprises a sender individual record, a for processing only endorsement, and a receiver signature of the receiver individual record, wherein the sender individual record comprises a record content, a sender public key, a receiver public key of the record receiver device, and a sender signature of the sender individual record, wherein the sender signature is created using a sender private key, wherein the sender public key and the sender private key form a sender public-key cryptographic pair, wherein the receiver individual record is created by the record receiver device after receiving the sender individual record from the record sender device and verifying the sender individual record using the sender public key while not necessarily in communication with a processing platform, wherein the receiver signature is created using a receiver private key of the record receiver device, and wherein the receiver public key and the receiver private key form a receiver public-key cryptographic pair; determining the receiver individual record to be invalid; and declining to perform for the record receiver device as instructed by the record content.

In a 219th aspect, the method of aspect 218, wherein determining the receiver individual record to be invalid comprises detecting receiver cloning or detecting ghosting.

In a 220th aspect, the method of aspect 219, wherein the sender individual record comprises a record identifier, wherein the sender public key is the sender public key of the record sender device, wherein the sender private key is the sender private key of the record sender device, and wherein detecting receiver cloning comprises determining an individual record comprising the sender public key and the record identifier has been received prior to receiving the receiver individual record.

In a 221st aspect, the method of aspect 220, wherein determining the individual record comprising the sender public key and the record identifier has been received prior to receiving the receiver individual record comprises: maintaining the record identifiers of previously received individual records with the sender public key of the record sender device as sender public keys of the previously received individual records; and determining the record identifier of the sender individual record is not in the record identifiers of previously received individual records with the sender public key of the record sender device as sender public keys of the previously received individual records.

In a 222nd aspect, the method of any one of aspects 219-221, wherein detecting ghosting comprises: determining the sender public key is an invalid public key.

In a 223rd aspect, the method of aspect 222, wherein determining the sender public key is an invalid public key comprises: maintaining valid sender public keys; and determining the valid sender public keys comprise the sender public key of the sender individual record.

In a 224th aspect, the method of any one of aspects 218-223, further comprising: adding the record sender device to a blacklist of malicious users if receiver cloning is detected; and adding the record receiver device to a blacklist of malicious users if ghosting is detected.

In a 225th aspect, a method of validating cryptographically signed records is disclosed. The method is performed under control of a hardware processor and comprises: receiving a receiver individual record from a record receiver device, wherein the receiver individual record comprises a sender individual record, an endorsement, and a receiver signature of the receiver individual record, wherein the endorsement is a malicious record endorsement or a for processing only endorsement, wherein the sender individual record comprises a record content, a sender public key of a record sender device, a receiver public key of the record receiver device, and a sender signature of the sender individual record, and wherein the sender signature is created using a sender private key of the record sender device, wherein the sender public key and the sender private key form a sender public-key cryptographic pair; determining the receiver individual record is invalid; and determining a cause of the receiver individual record being invalid.

In a 226th aspect, the method of aspect 225, wherein determining the cause of the receiver individual record being invalid comprises determining the cause of the receiver individual record being invalid using Boolean analysis.

In a 227th aspect, the method of aspect 225, wherein determining the cause of the receiver individual record being invalid comprises determining the cause of the receiver individual record being invalid using fuzzy ruling, comprising: maintaining a first probability of the record sender device being a first cause of any individual record being invalid; maintaining a second probability of the record receiver device being a second cause of any individual record being invalid; updating the first probability of the record sender device being the first cause of any individual record being invalid by multiplying the first probability with a third probability, wherein the third probability is a probability of the record sender device or the record receiver device being the cause of the receiver individual record being invalid; updating the second probability of the record receiver device being the second cause of any individual record being invalid by multiplying the second probability with a third probability; and determining the cause of the receiver individual record being invalid to be the record sender device if the first probability is greater than the second probability or the record receiver device if the second probability is greater than the first probability.

In a 228th aspect, the method of aspect 227, further comprising adding the cause of the receiver individual record being invalid to a blacklist of malicious user devices.

In a 229th aspect, a computer system is disclosed. The computer system comprises: a hardware processor; and non-transitory memory having instructions stored thereon, which when executed by the processor cause the processor to perform the method of any one of aspects 203-228.

In a 230th aspect, the computer system of aspect 229, wherein the computer system is a mobile device.

In a 231st aspect, the computer system of aspect 230, wherein the mobile device is a wearable display system.

Secure Exchange of Cryptographically Signed Digital Cheques—Financial Institution(s)

In a 232nd aspect, a method for securely exchanging cryptographically signed digital cheques is disclosed. The method is performed under control of a hardware processor and comprises: receiving an endorsed digital cheque from a payee device, wherein the endorsed digital cheque comprises an original digital cheque and a payee signature of the endorsed digital cheque, wherein the original digital cheque is created by a payer after receiving a payment request from the payee and identifying the payee device, wherein the original digital cheque comprises a payment amount, a payer public key, a payee public key, and a payer signature of the original digital cheque, wherein the payer signature is created using a payer private key of the payer device, wherein the payer public key and the payee public key form a payee public-key cryptographic pair, wherein the endorsed digital cheque is created by the payee device after receiving the original digital cheque from the payer device and verifying the original digital cheque using the payer public key while not necessarily in communication with a processing platform, wherein the payee signature is created by the payee device using a payee private key, and wherein the payee public key and the payee public key form a payee public key cryptographic pair; verifying the endorsed digital cheque; and causing a payment of the payment amount to be provided to the payee.

In a 233rd aspect, the method of aspect 232, wherein the payment request comprises the payee public key and a requested amount, and wherein the payment amount is related to the requested amount.

In a 234th aspect, the method of any one of aspects 232-233, wherein identifying the payee device comprises performing partner identification, wherein partner identification comprises content authorization, knocking, physical indication, beam forming, prior arrangement, cursory validation, or any combination thereof.

In a 235th aspect, the method of any one of aspects 232-234, wherein the original digital cheque further comprises a cheque identifier.

In a 236th aspect, the method of aspect 235, wherein the cheque identifier is a monotonically increasing number.

In a 237th aspect, the method of any one of aspects 232-236, wherein receiving the original digital cheque from the payer device comprises receiving the original digital cheque from the payer device via a short range link directly or through an intermediate device.

In a 238th aspect, the method of aspect 237, wherein the short range link is a peer-to-peer communication link.

In a 239th aspect, the method of any one of aspects 232-238, wherein the endorsed digital cheque further comprises a for deposit only endorsement, a query endorsement, a malicious cheque endorsement, or any combination thereof.

In a 240th aspect, the method of any one of aspects 232-239, wherein the original digital cheque is created after receiving an authentication information of a payer by the payer device, and wherein the endorsed digital cheque is created after receiving an authentication information of a payee by the payee device.

In a 241st aspect, the method of any one of aspects 232-240, wherein verifying the original digital cheque comprises: using the payer public key to determine the payer signature is created using the payer private key; and using the payee public key to determine the payee signature is created using the payee private key.

In a 242nd aspect, the method of any one of aspects 232-241, further comprising providing a common ledger to the payer device and the payee device, wherein the common ledger comprises the payer public key and the payee public key.

In a 243rd aspect, the method of any one of aspects 232-241, further comprising: providing a common ledger to the payer device, wherein the common ledger comprises the payer public key and the payee public key; and causing the payer device to provide the common ledger to the payee device.

In a 244th aspect, the method of any one of aspects 232-241, further comprising: providing a common ledger to the payee device, wherein the common ledger comprises the payer public key and the payee public key; and causing the payee device to provide the common ledger to the payer device.

In a 245th aspect, the method of any one of aspects 242-244, wherein the common ledger further comprises a common ledger signature, wherein the common ledger signature is created using a processing platform private key of the processing platform, the method further comprises verifying the common ledger using a processing platform public key of the processing platform while not necessarily in communication with the processing platform, wherein the processing platform public key and the processing platform private key form a public-key cryptographic pair of the processing platform, and wherein verifying the common ledger comprises using the processing platform public key to determine the common ledger signature is created using the processing platform private key.

In a 246th aspect, the method of any one of aspects 242-245, further comprising: generating the central ledger from a common ledger, wherein the central ledger comprises a payer account of the payer device and a payee account of the payee device, wherein the payer account comprises the payer public key and an account balance of the payer account, and wherein the payee account comprises the payee public key and an account balance of the payee account.

In a 247th aspect, the method of aspect 246, causing a payment of the payment amount to be provided to the payee comprises: causing to be determined the payer account has a sufficient balance to pay the payment amount; causing the payer account to be debited by the payment amount; and causing the payee account to be credited by the payment amount.

In a 248th aspect, the method of aspect 247, wherein causing the payer account to be debited by the payment amount comprises instructing a first financial institution to debit the payer account by the payment amount, and wherein causing the payee account to be credited by the payment amount comprises instructing the first financial institution to debit the payer account by the payment amount.

In a 249th aspect, the method of aspect 247, wherein causing the payer account to be debited by the payment amount comprises instructing a first financial institution to debit the payer account by the payment amount, and wherein causing the payee account to be credited by the payment amount comprises instructing a second financial institution to debit the payer account by the payment amount.

In a 250th aspect, the method of any one of aspects 247-249, further comprising: receiving a request to transfer money out of the payee account from a payee device, wherein the request to transfer money out of the payee account comprises a transfer-out amount and a transfer-out method, wherein the transfer-out method is automated clearing house (ACH) transfer, wire transfer, or sending a physical check; causing the payee account to be debited by the transfer-out amount; and causing the transfer-out amount to be sent using the transfer-out method.

In a 251st aspect, the method of aspect 250, further comprising: causing the payee account to be debited by a transfer fee, wherein the fee is proportional to the transfer-out amount or fixed.

In a 252nd aspect, the method of aspect 251, further comprising: receiving a request to transfer money in from the payee account from a payee device, wherein the request to transfer money in from the payee account comprises a transfer-in amount and a transfer-in method, wherein the transfer-in method is automated clearing house (ACH) transfer, wire transfer, or sending a physical check; causing the payee account to be debited by the transfer-in amount; and causing the transfer-in amount to be sent using the transfer-in method.

In a 253rd aspect, the method of aspect 252, further comprising: causing the payee account to be debited by a transfer fee, wherein the fee is proportional to the transfer-in amount or fixed.

In a 254th aspect, the method of any one of aspects 246-253, wherein causing a payment of the payment amount to be provided to the payee comprises: causing to be determined the payer account has an insufficient balance to pay the payment amount; causing the payer account to be debited by a fee for the insufficient balance; and adding the payer device to a demerit list.

In a 255th aspect, the method of any one of aspects 246-254, wherein the original digital cheque further comprises a source account, wherein causing a payment of the payment amount to be provided to the payee comprises: causing the payment amount to be received from the source account; and causing the payee account to be credited by the payment amount.

In a 256th aspect, the method of any one of aspects 232-255, wherein the original digital cheque comprises a fee sharing policy.

In a 257th aspect, the method of any one of aspects 232-256, wherein the original digital cheque comprises a transaction type.

In a 258th aspect, the method of aspect 257, wherein the transaction type comprises check-type transaction, a debit-type transaction, a credit card-type transaction, an ACH-type transaction, or a combination thereof.

Systems and Devices

In a 259th aspect, a system is disclosed. The system comprises non-transitory computer-readable memory storing executable instructions; and one or more hardware processors programmed by the executable instructions to perform the method of any one of aspects 1-259.

In a 260th aspect, a wearable display system is disclosed. The wearable display system comprises a display; non-transitory computer-readable storage medium storing executable instructions; and one or more hardware processors programmed by the executable instructions to perform the method of any one of aspects 1-259.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time. Further, the processing platform 124 of the service provider 104 may be in electronic communication with thousands or millions of user devices 116a, 116b and configured to handle the exchange of hundreds of thousands, millions, or hundreds of millions of cryptographically signed records, substantially in real time in many cases or when the user devices 116a, 116b are in electronic communication with the processing platform 124.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, cloud-based networks, and the World Wide Web. The network may be a wired or a wireless network, a satellite or balloon-based network, or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results. The following claims are hereby expressly incorporated by reference into this detailed description as additional aspects of the disclosure.

What is claimed is:

1. A method for validating cryptographically signed records, the method comprising:
    under control of a hardware processor:
        receiving, at a record receiver device, a sender individual record from a record sender device, wherein:
            the sender individual record comprises a record identifier, a record content, a sender public keys, a receiver public key of the record receiver device, and a sender signature of the sender individual record, and the sender individual record is created by the record sender device after receiving a content request from a record receiver device and after the record sender device identifies the record receiver device;

maintaining, at the record receiver device, record identifiers associated with sender individual records previously received from the record sender device;

attempting to decrypt the sender signature by using the sender public key;

detecting mousing by determining, via the record receiver device, that the sender individual record is invalid based at least in part on a failed attempt to decrypt the sender signature, wherein the detection of mousing further includes determining that the record identifier of the sender individual record is absent from the maintained record identifiers;

creating a receiver individual record, wherein:
the receiver individual record comprises the sender individual record, a malicious record endorsement, and a receiver signature of the receiver individual record, and
the receiver signature is created using a receiver private key of the record receiver device, and wherein the receiver public key and the receiver private key form a receiver public-key cryptographic pair; and
sending the receiver individual record to the processing platform.

2. The method of claim 1, wherein the determining the sender individual record is invalid comprises detecting sender cloning with a single receiver, mousing, or ghosting.

3. The method of claim 2, wherein:
the record identifier of the sender individual record is a monotonic ally increasing number,
the record receiver device maintains a highest record identifier of individual records previously received with the sender public key of the record sender device as sender public keys of the individual records previously received, and
detecting sender cloning comprises determining the record identifier of the sender individual record is not larger than the highest record identifier.

4. The method of claim 2, wherein:
the sender public key is the sender public key of the record sender device, wherein the sender signature is created using a sender private key of the record sender device, and
the sender public key and the sender private key form a sender public-key cryptographic pair.

5. The method of claim 2, wherein:
the sender public key is the sender public key of the record sender device,
the detecting mousing comprises determining the sender signature is not created using a sender private key of the record sender device, wherein the sender public key and the sender private key form a sender public-key cryptographic pair, and
the determining the sender signature is not created using the sender private key of the record sender device comprises using the sender public key to determine the sender signature is not created using the sender private key.

6. The method of claim 2, wherein:
detecting ghosting comprises determining the sender public key is not a valid public key of a user device, and
the determining the sender public key is not a valid public key comprises:

receiving common records from the processing platform, wherein the common records comprise valid public keys of user devices; and
determining the common records comprise the sender public key of the record sender device.

7. The method of claim 6, wherein:
the sender signature is created using a sender private key, and
the sender public key and the sender private key form a sender public-key cryptographic pair.

8. The method of claim 1, further comprising causing the processing platform to add the record sender device to a blacklist of malicious user devices.

9. A method for validating cryptographically signed records, the method comprising:
under control of a hardware processor:
receiving, at a record receiver device, a sender individual record from a record sender device, wherein:
the sender individual record comprises a record content, a sender public key, a receiver public key, and a sender signature of the sender individual record,
the sender signature is created using a sender private key, wherein the sender public key and the sender private key form a sender public-key cryptographic pair, and
the sender individual record is sent by the record sender device after receiving a content request from the record receiver device and identifying the record receiver device;
maintaining, at the record receiver device, record identifiers associated with sender individual records previously received from the record sender device;
attempting to decrypt the sender signature by using the sender public key;
determining, via the record receiver device, that the sender individual record is invalid based at least in part on a failed attempt to decrypt the sender signature, wherein the determination that the sender individual record is invalid further includes determining that the record identifier of the sender individual record is absent from the maintained record identifiers;
creating a receiver individual record, wherein:
the receiver individual record comprises the sender individual record, a malicious record endorsement, and a receiver signature of the receiver individual record,
the receiver signature is created based at least in part on receiver private key of the record receiver device, and
the receiver public key and the receiver private key form a receiver public-key cryptographic pair; and
sending the receiver individual record to the processing platform.

10. The method of claim 9, wherein the determining the sender individual record is invalid comprises detecting sender cloning with multiple receivers or detecting forking.

11. The method of claim 10, wherein the detecting sender cloning with multiple receivers comprises:
determining the sender public key is the sender public key of the record sender device; and
determining the receiver public key is not a public key of the record receiver device.

12. The method of claim 9, wherein detecting forking comprises:
determining the sender public key is not a public key of the record sender device;
determining the public key of the record receiver device is not in the in the sender individual record; and
determining the receiver public key is not a public key of the record receiver device.

13. The method of claim 10, wherein:
the sender signature is created based at least in part on a sender private key, and
the sender public key and the sender private key form a sender public-key cryptographic pair.

14. The method of claim 9, further comprising:
causing the processing platform to add the record sender device to a blacklist of malicious user devices.

15. A method for validating cryptographically signed records, the method comprising:
receiving a receiver individual record from a record receiver device, wherein:
the receiver individual record comprises a sender individual record, a for-processing-only endorsement, and a receiver signature of the receiver individual record, and
the sender individual record comprises a record identifier, a record content, a sender public key of the record sender device, a receiver public key of the record receiver device, and a sender signature of the sender individual record,
the record content including a request for content;
the sender signature is generated based at least in part on a sender private key of the record sender device, wherein the sender public key and the sender private key form a sender public-key cryptographic pair, wherein the sender public key and the sender signature are both out-of-date or invalid,
the receiver individual record is created by the record receiver device after receiving the sender individual record from the record sender device and verifying, via the record receiver device, the sender individual record based at least in part on the sender public key, wherein the verification is successful because the record receiver device comprises a copy of the sender public key that is out-of-date or invalid,
the receiver signature is created using a receiver private key of the record receiver device, and
the receiver public key and the receiver private key form a receiver public-key cryptographic pair;
maintaining, at the record receiver device, record identifiers associated with sender individual records previously received from the record sender device;
attempting, at the processing server, to decrypt the receiver signature by using the receiver public key, wherein the decryption of the receiver signature is successful;
creating, at the processing server, a modified individual record with the receiver signature based at least in part on the successful decryption;
detecting ghosting by determining, at the processing server, that the modified individual record is invalid based at least in part on a determination that the modified individual record includes the out-of-date or invalid sender public key, wherein the detection of ghosting further includes determining that the sender public key of the sender individual record is not present in the maintained record identifiers; and
suppressing transmission of the content to the record receiver that is requested via the record content.

16. The method of claim 15, wherein the determining the receiver individual record to be invalid comprises detecting receiver cloning or ghosting.

17. The method of claim 15, wherein detecting ghosting comprises:
determining the sender public key is an invalid public key by determining that the valid sender public keys comprise the sender public key of the sender individual record.

18. The method of claim 15, further comprising:
adding the record sender device to a blacklist of malicious users if receiver cloning is detected; and
adding the record receiver device to a blacklist of malicious users if ghosting is detected.

* * * * *

UNITED STATES PATENT AND TRADEMARK OFFICE
CERTIFICATE OF CORRECTION

| | |
|---|---|
| PATENT NO. | : 11,044,101 B2 |
| APPLICATION NO. | : 16/597437 |
| DATED | : June 22, 2021 |
| INVENTOR(S) | : Adrian Kaehler |

It is certified that error appears in the above-identified patent and that said Letters Patent is hereby corrected as shown below:

On the Title Page

On Page 2, Column 1, Item (56), Line 14, under U.S. Patent Documents, delete "Eversoli" and insert --Eversoll--.

On Page 3, Column 1, Item (56), Line 3, under Other Publications, delete "ehtereum" and insert --ethereum--.

On Page 3, Column 1, Item (56), Lines 7-8, under Other Publications, delete "E ecution" and insert --Execution--.

In the Specification

In Column 1, Line 35, delete "exchanges" and insert --exchanges.--.

In Column 4, Line 32, delete "FIG." and insert --FIGS.--.

In Column 4, Line 39, delete "chequce." and insert --cheques.--.

In Column 4, Line 42, delete "chequce" and insert --cheques.--.

In Column 39, Line 55, delete "M(Sender)" and insert --(M(Sender)--.

In Column 53, Line 58 (Approx.), delete "M(Buyer)" and insert --(M(Buyer)--.

In Column 60, Line 36, delete "(FPOE)" and insert --(FDOE)--.

In Column 62, Line 6, delete "(e.g.," and insert --e.g.,--.

In Column 89, Lines 18-19, delete "in the in the" and insert --in the--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*

In the Claims

In Column 96, Claim 1, Line 64, delete "keys," and insert --key,--.

In Column 97, Claim 3, Line 34, delete "monotonic ally" and insert --monotonically--.

In Column 98, Claim 12, Line 65, delete "in the in the" and insert --in the--.